US012699895B2

(12) United States Patent
Inghelbrecht et al.

(10) Patent No.: US 12,699,895 B2
(45) Date of Patent: *Aug. 4, 2026

(54) CLASSIFYING AND ORGANIZING DIGITAL CONTENT ITEMS AUTOMATICALLY UTILIZING CONTENT ITEM CLASSIFICATION MODELS

(71) Applicant: Dropbox, Inc., San Francisco, CA (US)

(72) Inventors: Tristan Inghelbrecht, East Richmond Heights, CA (US); Jongmin Baek, Foster City, CA (US); Ermo Wei, Milpitas, CA (US); Morgan Zerby, Kirkland, WA (US); Win Suen, Schuylkill Haven, PA (US); David Lichtenberg, San Francisco, CA (US); Thomas Berg, San Francisco, CA (US); Christopher Lesniewski-Laas, Oakland, CA (US); Brandon Obas, Miramar, FL (US); Mingming Liu, San Jose, CA (US); Zachary Smetana, San Francisco, CA (US); Bryan Guillemette, Palo Alto, CA (US); Panashe Machinda Fundira, Brooklyn, NY (US); Kevin Li, Brooklyn, NY (US); Vidit Bhargava, New York, NY (US); Shubham Goel, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 1109 days.

This patent is subject to a terminal disclaimer.

(21) Appl. No.: 17/548,519

(22) Filed: Dec. 11, 2021

(65) Prior Publication Data

US 2023/0186071 A1 Jun. 15, 2023

(51) Int. Cl.
G06N 3/08 (2023.01)
G06F 16/16 (2019.01)

(52) U.S. Cl.
CPC ............... *G06N 3/08* (2013.01); *G06F 16/16* (2019.01)

(58) Field of Classification Search
CPC .. G06N 3/08; G06N 5/00; G06F 16/16; G06F 16/35; G06F 16/93; G06F 18/23;
(Continued)

(56) References Cited

U.S. PATENT DOCUMENTS

| 1,809,374 A | * | 6/1931 | Meyer ........................... 246/126 |
| 7,849,141 B1 | | 12/2010 | Bellegarda et al. |

(Continued)

OTHER PUBLICATIONS

Zhu et al., Article: IBM Classification Module: Make It Work for You Oct. 29, 2009; International Technical Support Organization; IBM Redbooks available via https://www.redbooks.ibm.com/abstracts/SG247707.html (Year: 2009).*
(Continued)

*Primary Examiner* — Evan Aspinwall
(74) *Attorney, Agent, or Firm* — Keller Preece PLLC

(57) ABSTRACT

The present disclosure relates to systems, methods, and non-transitory computer-readable media that utilize machine-learning models to classify content items and automatically organize the content items within a file structure according to their content item classifications. For instance, a content item classification system generates one or more content item classification models to determine classifications for content items and/or folders. In some instances, the classification system detects when new content items are added to a smart folder, determines destination folders to which the content items belong based on classifying the content items, and automatically moves the content items accordingly. In various instances, the classification system generates and utilizes a classification model to organize content items into dynamically-generated folders. In example implementations, the classification system gener-
(Continued)

ates and utilizes a classification model to automatically organize existing content items into existing folders.

20 Claims, 36 Drawing Sheets

(58) Field of Classification Search
CPC .... G06F 16/906; G06F 21/6218; G06F 18/24; G06F 16/285; G06F 16/55
USPC ........................................................ 707/822
See application file for complete search history.

(56) References Cited

U.S. PATENT DOCUMENTS

| | | |
|---|---|---|
| 8,473,532 B1 | 6/2013 | Ben |
| 9,244,976 B1 | 1/2016 | Zhang et al. |
| 9,286,304 B2 | 3/2016 | Taljanovic |
| 9,378,265 B2 | 6/2016 | McHenry et al. |
| 9,805,042 B1 | 10/2017 | Meyer |
| 10,237,424 B2 | 3/2019 | Sato |
| 10,452,722 B2 | 10/2019 | Hong et al. |
| 10,713,306 B2 | 7/2020 | Cai et al. |
| 10,832,130 B2 | 11/2020 | Green et al. |
| 10,922,282 B2 | 2/2021 | Jalagam et al. |
| 10,963,503 B2 | 3/2021 | Skiles et al. |
| 10,970,293 B2 | 4/2021 | Bendersky et al. |
| 10,983,677 B2 | 4/2021 | Kleinpeter |
| 11,030,223 B2 | 6/2021 | Vikramaratne |
| 11,068,442 B1 | 7/2021 | Meyer |
| 11,087,222 B2 | 8/2021 | Kumar |
| 11,163,834 B2 | 11/2021 | De Vansa Vikramaratne et al. |
| 11,288,236 B2 | 3/2022 | Vibhor et al. |
| 11,809,374 B1* | 11/2023 | Meyer ..................... G06F 16/16 |
| 2006/0036568 A1 | 2/2006 | Moore et al. |
| 2007/0033200 A1 | 2/2007 | Gillespie |
| 2009/0228471 A1 | 9/2009 | Dawson et al. |
| 2009/0248615 A1 | 10/2009 | Drory et al. |
| 2010/0175032 A1 | 7/2010 | Ishiwata |
| 2012/0173533 A1* | 7/2012 | Ramarao ................ G06Q 10/00 |
| | | 707/E17.046 |
| 2013/0036095 A1 | 2/2013 | Titchener et al. |
| 2014/0181157 A1 | 6/2014 | Houston et al. |
| 2015/0331755 A1 | 11/2015 | Morgan |
| 2016/0370962 A1 | 12/2016 | Keohane et al. |
| 2017/0060892 A1 | 3/2017 | Vuppula |
| 2017/0237868 A1* | 8/2017 | Sato ..................... G06V 30/416 |
| | | 358/402 |
| 2018/0011868 A1 | 1/2018 | Allen et al. |
| 2018/0067957 A1 | 3/2018 | Paterson et al. |
| 2018/0075138 A1 | 3/2018 | Perram et al. |
| 2018/0096060 A1 | 4/2018 | Peled et al. |
| 2018/0129950 A1* | 5/2018 | Kumar ................... G06N 20/00 |
| 2019/0087395 A1 | 3/2019 | Priestas et al. |
| 2019/0089660 A1 | 3/2019 | Bellegarda |
| 2019/0163671 A1 | 5/2019 | Vengerov et al. |
| 2019/0266258 A1 | 8/2019 | Chen et al. |
| 2019/0332710 A1 | 10/2019 | Wei et al. |
| 2020/0034447 A1 | 1/2020 | LaPointe et al. |
| 2020/0034752 A1 | 1/2020 | Luo et al. |
| 2020/0174967 A1 | 6/2020 | Lee et al. |
| 2020/0204618 A1 | 6/2020 | Agarwal et al. |
| 2020/0341854 A1 | 10/2020 | Morton et al. |
| 2020/0372073 A1* | 11/2020 | Dahl ..................... G06V 10/48 |
| 2020/0387483 A1 | 12/2020 | Kumar et al. |
| 2021/0019622 A1 | 1/2021 | Green et al. |
| 2021/0064591 A1 | 3/2021 | Sun et al. |
| 2021/0064866 A1* | 3/2021 | Rezvani ............ G06F 18/24765 |
| 2021/0073034 A1 | 3/2021 | Bliesner et al. |
| 2021/0125108 A1 | 4/2021 | Metzler, Jr. et al. |
| 2021/0133145 A1 | 5/2021 | Gong et al. |
| 2021/0149839 A1 | 5/2021 | Paterson et al. |
| 2021/0182238 A1* | 6/2021 | Ichikawa .............. G06F 16/168 |
| 2021/0216763 A1 | 7/2021 | Dang et al. |
| 2021/0218809 A1 | 7/2021 | Mutreja et al. |
| 2021/0240845 A1 | 8/2021 | Thomas |
| 2021/0286763 A1 | 9/2021 | Lee et al. |
| 2021/0334238 A1 | 10/2021 | Bikumala et al. |
| 2021/0334589 A1 | 10/2021 | Plant et al. |
| 2021/0342088 A1 | 11/2021 | Gong et al. |
| 2021/0365418 A1 | 11/2021 | Kumar et al. |
| 2021/0365466 A1 | 11/2021 | Kleiner et al. |
| 2022/0277205 A1 | 9/2022 | Mahmood et al. |
| 2022/0327173 A1 | 10/2022 | Rajpara |
| 2022/0351139 A1 | 11/2022 | Mowatt |
| 2023/0017384 A1 | 1/2023 | Woodward et al. |
| 2023/0077858 A1 | 3/2023 | Chang et al. |
| 2023/0177004 A1* | 6/2023 | Kong ................... G06F 16/906 |
| | | 707/822 |
| 2023/0185769 A1 | 6/2023 | Lichtenberg et al. |

OTHER PUBLICATIONS

Final Office Action from U.S. Appl. No. 17/548,516, mailed Jan. 23, 2024, 22 pages.

Final Office Action from U.S. Appl. No. 17/548,520, mailed Jan. 22, 2024, 18 pages.

Qin Z., et al., "Matching Cross Network for Learning to Rank in Personal Search" Apr. 2020, The Web Conference 2020 (WWW) (2020), pp. 2835-2841.

Non-Final Office Action from U.S. Appl. No. 17/548,520, mailed Aug. 17, 2023, 13 pages.

Gao S., et al., "API Recommendation for the Development of Android App Features Based on the Knowledge Mined from App Stores," Science of Computer Programming, Oct. 12, 2020, vol. 202, 18 pages.

Gu., et al., "Deep API Learning," arXiv: 1605.08535v3, Jul. 14, 2017, 12 pages.

Narayanan A., et al., "apk2vec: Semi-Supervised Multi-view Representation Learning for Profiling Android Applications," arXiv: 1809.05693v1, Sep. 15, 2018, 11 pages.

Non-Final Office Action from U.S. Appl. No. 17/548,516, mailed Sep. 22, 2023, 24 pages.

Final Office Action from U.S. Appl. No. 17/548,516, mailed Jun. 8, 2022, 25 pages.

Sinha D., et al., "Gardener: A File Browser Assistant to Help Users Maintaining Semantic Folder Hierarchy"; Dec. 2012, 6 pages.

Ostendorff M., et al., "Pairwise Multi-Class Document Classification for Semantic Relations between Wikipedia Articles," EU-L-2: Document Classification, JCDL '20, Aug. 1-5, 2020, Virtual Event, China, pp. 127-136 pages.

Staar P W J., et al., "Corpus Conversion Service:A Machine Learning Platform to Ingest Documents at Scale," Applied Data Science Track Paper, KDD 2018, Aug. 19-23, 2018, London, United Kingdom, pp. 774-782.

Dinneen Jo., et al., "The Ubiquitous Digital File: A review of file management research," Journal of the Association for Information Science and Technology, Retrieved from the Internet: URL: https://arxiv.org/abs/2109.09668 Retrieved on Sep. 20, 2021, vol. 71, No. 1, 72 pages.

Final Office Action from U.S. Appl. No. 17/548,516, mailed May 4, 2023, 21 pages.

Brackenbury W., et al., "KondoCioud: Improving Information Management in Cloud Storage via Recommendation Based on File Similarity," UIST'21, Oct. 10, 2021, pp. 69-83.

Chen S.J., et al., "Improving Recommendation Quality in Google Drive," KDD'20, Aug. 23, 2020, pp. 2900-2908.

Fouche E., et al., "Mining Text Outliers in Document Directories," 2020 IEEE International Conference on Data Mining, Nov. 2020, pp. 152-161.

He Y., et al., "Dsync: a Lightweight Delta Synchronization Approach for Cloud Storage Services," Oct. 29, 2020, 14 pages.

Huang F., et al., "Creating User Interface Mock-ups from High-Level Text Descriptions with Deep-Learning Models," Oct. 14, 2021, arXiv: 2110.07775v1, pp. 1-20.

Li T.J., et al., "Screen2Vec: Semantic Embedding of GUI Screens and GUI Components," Jan. 11, 2021, arXiv: 2101.111 03v1, 15 pages.

(56) References Cited

OTHER PUBLICATIONS

Non-Final Office Action from U.S. Appl. No. 17/548,516, mailed Mar. 2, 2022, 29 pages.

Patra R., "Automated Document Categorization Model," Jul. 19, 2020, pp. 19-36.

Wang B., et al., "Screen2Words: Automatic Mobile UI Summarization with Multirnodal Learning," UIST'21, Oct. 10, 2021, pp. 489-510.

Fritsch C., et al., "The Benefits of a Feature Model in Banking," SPLC '20: Proceedings of the 24th ACM Conference on Systems and Software Product Line: vol. A—vol. A, Oct. 19, 2020, 11 pages, Retrieved from the Internet: URL: https://doi.org/10.1145/3382025.3414946.

Han S., et al., "Learning-To-Rank With Bert in TF-Ranking," arXiv:2004.08476v3, Jun. 8, 2020, 6 pages.

Jagerman R.,et al., "Improving Cloud Storage Search with User Activity," CCS Concepts, Proceedings of the 14th International Conference on Web Search and Data Mining (WSDM '21), ACM (2021), Mar. 8, 2021, Retrieved from the Internet: URL: https://dl.acm.org/doi/pdf/10.1145/3437963.3441780.

Kong W., et al., "Learning to Cluster Documents into Workspaces Using Large Scale Activity Logs," KDD '20: Proceedings of the 26th ACM SIGKDD International Conference on Knowledge Discovery Data Mining, Aug. 23, 2020, Retrieved from the Internet: URL: https://doi.org/10.1145/3394486.3403291.

Non-Final Office Action from U.S. Appl. No. 17/548,516, mailed Feb. 14, 2023, 25 pages.

Pasumarthi R.K., et al., "TF-Ranking: Scalable TensorFlow Library for Learning-to-Rank," arXiv:1812.00073v2 , May 17, 2019, 9 Pages.

Qin Z., et al., "Attribute-Based Propensity for Unbiased Learning in Recommender Systems: Algorithm and Case Studies," CCS Concepts, Aug. 23, 2020, 9 pages, Retrieved from the Internet: URL: https://dl.acm.org/doi/abs/10.1145/3394486.3403285.

Taylor J.G., et al., "Learning Using Unselected Features (LUFe)," IJCAI'16 Proceedings of the Twenty-Fifth International Joint Conference on Artificial Intelligence, Jul. 9, 2016, 7 pages, Retrieved from the Internet: URL: http://hdl.handle.net/10044/1/64204.

Zhuang H., et al., "Ensemble Distillation for BERT-Based Ranking Models," ICTIR '21: Proceedings of the 2021 ACM SIGIR International Conference on Theory of Information Retrieval, Jul. 21, 2021, 6 pages, Retrieved from the Internet: URL: https://doi.org/10.1145/3471158.3472238.

"2017 IEEE Taxonomy," IEEE Advancing Technology for Humanity, Version 1.0, 2017, 67 pages.

Minaee S., et al., "Deep Learning Based Text Classification: A Comprehensive Review," Jan. 4, 2021, vol. 1 (1), 43 pages.

Sanh V., et al., "DistilBERT, A Distilled Version of BERT: Smaller, Faster, Cheaper and Lighter," Mar. 1, 2020, 5 pages.

Office Action from U.S. Appl. No. 17/548,520, mailed Feb. 12, 2025, 18 pages.

Non-Final Office Action from U.S. Appl. No. 17/548,520, Mailed Mar. 29, 2024, 19 pages.

Final Office Action from U.S. Appl. No. 17/548,520 mailed Sep. 30, 2024, 19 pages.

Notice of Allowance for U.S. Appl. No. 17/548,520 mailed on Oct. 29, 2025, 2 pages.

Notice of Allowance for U.S. Appl. No. 17/548,516, mailed Oct. 1, 2025, 9 pages.

Notice of Allowance for U.S. Appl. No. 17/548,520, mailed Sep. 25, 2025, 8 pages.

Notice of Allowance from U.S. Appl. No. 17/548,516, mailed Aug. 21, 2025, 7 pages.

* cited by examiner

200

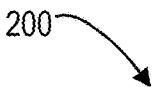

Generate A Content Item Classification Model That Classifies Content Items *202*

| Pre-Trained Model | + | Content Item Classifications | = | Content Item Classification Model |

Detect A Content Item Being Added To A Source Folder *204*

File A → Smart Folder

Classify The Content Item Utilizing The Content Item Classification Model *206*

File A → Content Item Classification Model → "Dogs" "Classification 2"

Move The Content Item To A Destination Folder Associated With The Classification Of The Content Item *208*

File A → Smart Folder → Dogs / Cats

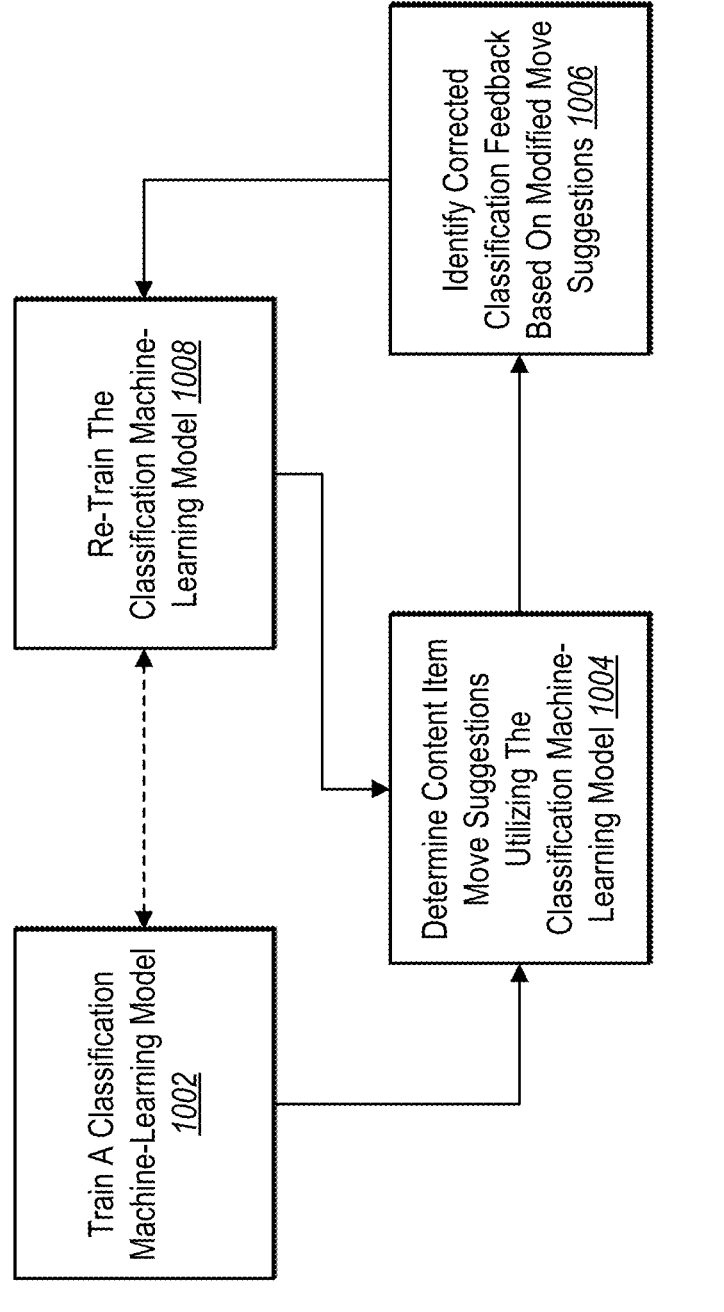
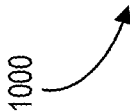
*Fig. 10*

1300

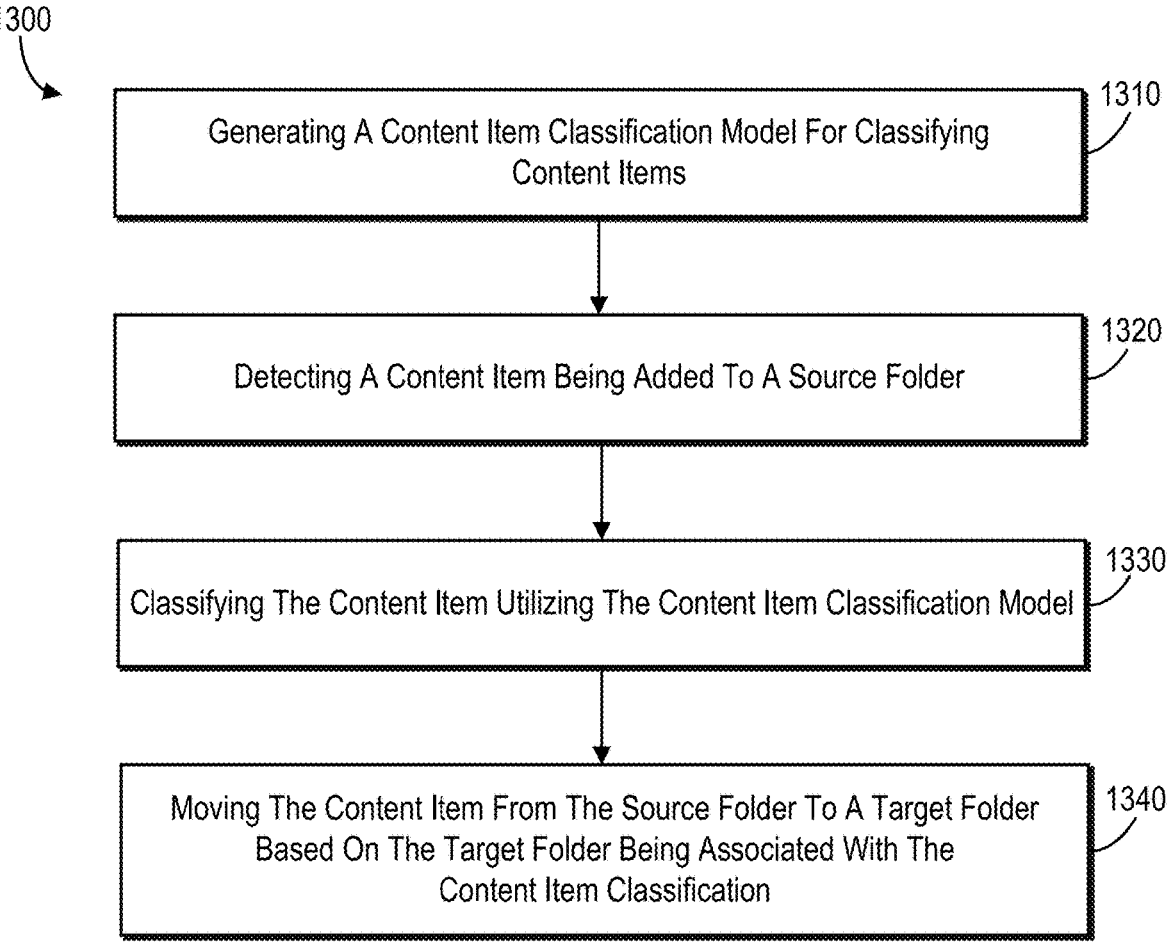

1310

Generating A Content Item Classification Model For Classifying Content Items

1320

Detecting A Content Item Being Added To A Source Folder

1330

Classifying The Content Item Utilizing The Content Item Classification Model

1340

Moving The Content Item From The Source Folder To A Target Folder Based On The Target Folder Being Associated With The Content Item Classification

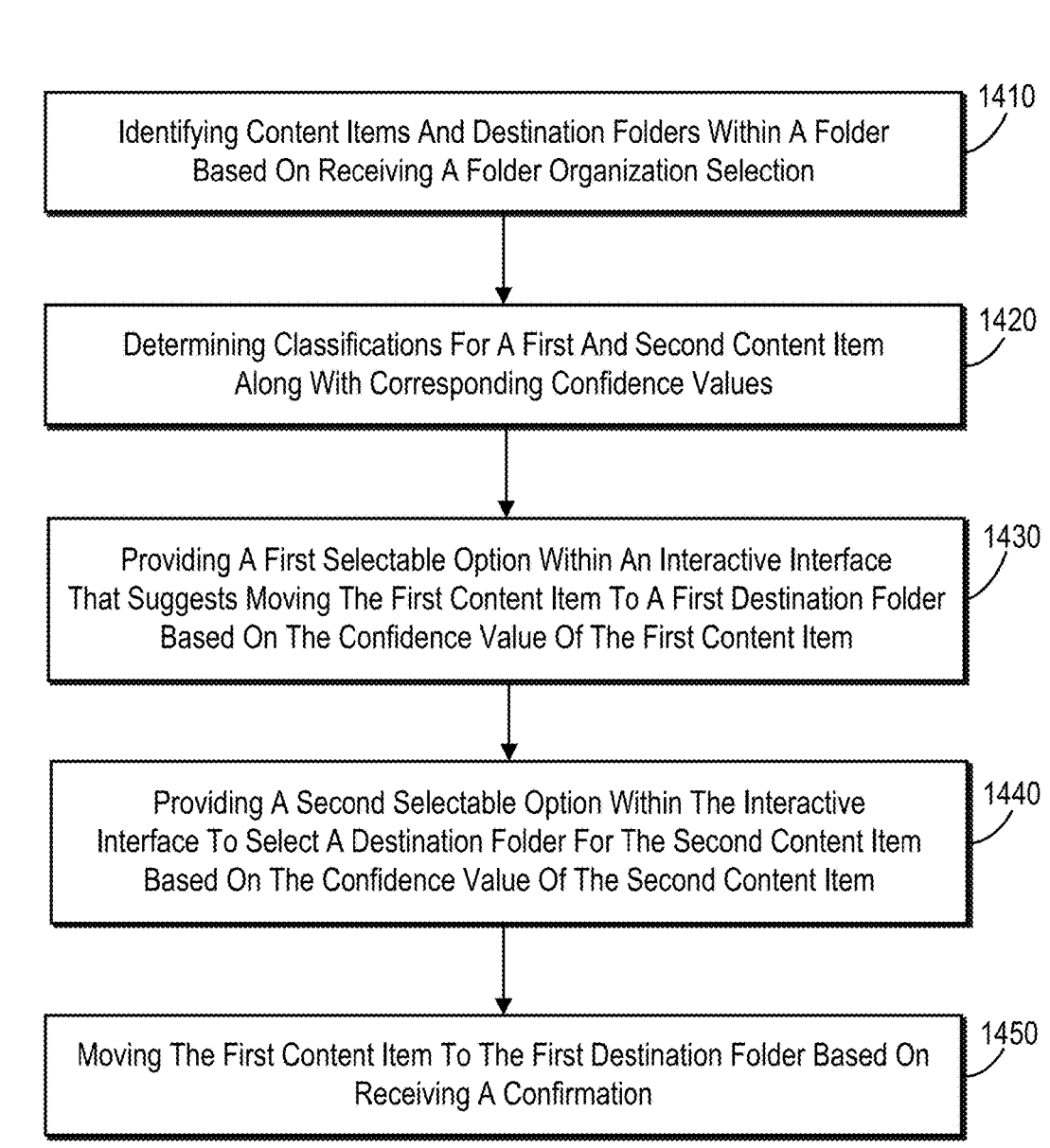

1410

Identifying Content Items And Destination Folders Within A Folder
Based On Receiving A Folder Organization Selection

1420

Determining Classifications For A First And Second Content Item
Along With Corresponding Confidence Values

1430

Providing A First Selectable Option Within An Interactive Interface
That Suggests Moving The First Content Item To A First Destination Folder
Based On The Confidence Value Of The First Content Item

1440

Providing A Second Selectable Option Within The Interactive
Interface To Select A Destination Folder For The Second Content Item
Based On The Confidence Value Of The Second Content Item

1450

Moving The First Content Item To The First Destination Folder Based On
Receiving A Confirmation

Identify Content Items Within A Source Folder                                              1510

Generate Content Item Classifications For The Content Items Utilizing A Classification Model                                              1520

Determine Destination Folders From The Subfolders For The Content Items                                              1530

Move The Content Items To Destination Folders That Correspond To The Content Item Classifications                                              1540

CLASSIFYING AND ORGANIZING DIGITAL CONTENT ITEMS AUTOMATICALLY UTILIZING CONTENT ITEM CLASSIFICATION MODELS

BACKGROUND

Recent years have seen significant improvements in computer systems regarding storing, managing, and synchronizing digital documents. For example, some existing document hosting systems (e.g., cloud storage systems) provide tools for users to create, modify, delete, and share digital documents within a digital document synchronization environment, which is accessible through mobile applications or other software applications. By providing web-based or app-based tools to perform digital document synchronization, existing document hosting systems often enable users to retrieve, view, and modify a number of digital documents, which are synchronized between multiple client devices of a user.

Despite advances in the areas of document management and synchronization, many existing document hosting systems face several technical shortcomings, particularly with regard to the accuracy, efficiency, and flexibility of implementing document management systems. To illustrate, many existing systems inaccurately organize digital documents among file structures. For instance, existing document hosting systems fail to provide the tools, capabilities, or operations that facilitate the correct and accurate organization of new and/or existing digital documents that the systems manage. As a result, digital documents added to the existing systems accumulate into large collections of unorganized content items unless a user performs potentially numerous manual steps and tedious user operations within a graphical user interface to organize the documents.

In addition, many existing systems are inefficient regarding organizing digital documents to separate folders. In particular, many existing document hosting systems require cumbersome navigation and menus that require multi-step inputs and multi-step navigation to organize digital documents into various folders in a file structure. Users must perform these tedious steps, otherwise, files accumulate to clutter folders and digital workspaces. By requiring user interactions to navigate through multiple and/or separate windows and menus, existing systems consume excessive computing resources, such as real-time memory.

Further, this problem is exacerbated on client devices (e.g., mobile devices) with smaller screens as the size of these smaller screens is limited. For example, many existing document hosting systems provide inefficient graphical user interfaces (GUIs) and/or tools that require numerous navigational steps to organize and manage digital documents through limited screen spaces of mobile devices and other computing devices. Indeed, many existing systems require an inefficient number of navigational steps to select a digital document, move the digital document, and locate a destination for the digital document-often in the limited screen spaces of mobile or other devices. In some instances, existing document hosting systems require devices to click through (or otherwise navigate) a hierarchy of multiple folders to find a destination for a document, which slows navigation and further consumes limited computing resources.

Moreover, existing systems are often rigid and inflexible. As noted above, existing systems often require an inefficient number of user inputs to move or otherwise reorganize digital documents. Indeed, many existing systems often require a series of clicks, swipes, or other user interactions for each individual digital document to reorganize the document within a folder hierarchy. Furthermore, many existing systems are inflexible in that they lack additional tools, capabilities, and operations to accurately and dynamically organize digital documents within a file structure, with minimal or no user input. Indeed, this rigidity only exacerbates the accuracy and efficiency problems outlined above.

BRIEF SUMMARY

Embodiments of the present disclosure provide benefits and/or solve one or more of the foregoing or other problems in the art with systems, non-transitory computer-readable media, and methods that utilize machine-learning models to automatically classify and organize digital content items within a file structure. For example, the disclosed systems can generate and utilize one or more content item classification machine-learning models to improve content item organization between source folders and destination folders. Indeed, the disclosed systems can automatically organize newly detected content items as well as existing content items within various folders and file structures.

To illustrate, the disclosed systems can detect when content items are added to a designated smart folder, classify the content items to determine one or more destination folders to which the content items belong, and automatically move the content items from the designated smart folder to the appropriate destination folders within the file structure. In some cases, the disclosed systems can generate a new or additional destination folder to correspond with a system-determined classification of a content item. In other cases, the disclosed systems automatically move the content items to existing user-based or user-defined folders. Accordingly, the disclosed systems can accurately, efficiently, and flexibly determine the appropriate content item classifications for content items and automatically move the content items to destination folders within a file structure that has corresponding classifications.

Additionally, the disclosed systems can provide content item move suggestions for moving content items in a source folder to one or more destination folders. For example, in some implementations, the disclosed systems can identify content items and destination folders within a folder based on receiving a folder organization request. The disclosed systems can then determine classifications for the content items along with corresponding classification confidence values. The disclosed systems further can provide an interactive user interface that includes one or more types of suggestions for moving content items to the destination folders based on the classification confidence values of the content items. Then, based on receiving a confirmation within the interactive user interface, the disclosed systems can move some or all of the content items in the source folder to corresponding destination folders.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIGS. 2A-2B illustrates an overview diagram of organizing digital content items into folders within a file structure utilizing a content item classification model in accordance with one or more embodiments.

FIG. 10 illustrates utilizing modified content item move suggestions as feedback to improve a classification model in accordance with one or more embodiments.

FIG. 13 illustrates a flowchart of a series of acts for automatically classifying and organizing content items within a file structure utilizing a content item classification model in accordance with one or more embodiments.

FIG. 14 illustrates a flowchart of a series of acts for organizing content items within a file structure based on an interactive user interface that utilizes a content item classification model in accordance with one or more embodiments.

DETAILED DESCRIPTION

Figure 1:
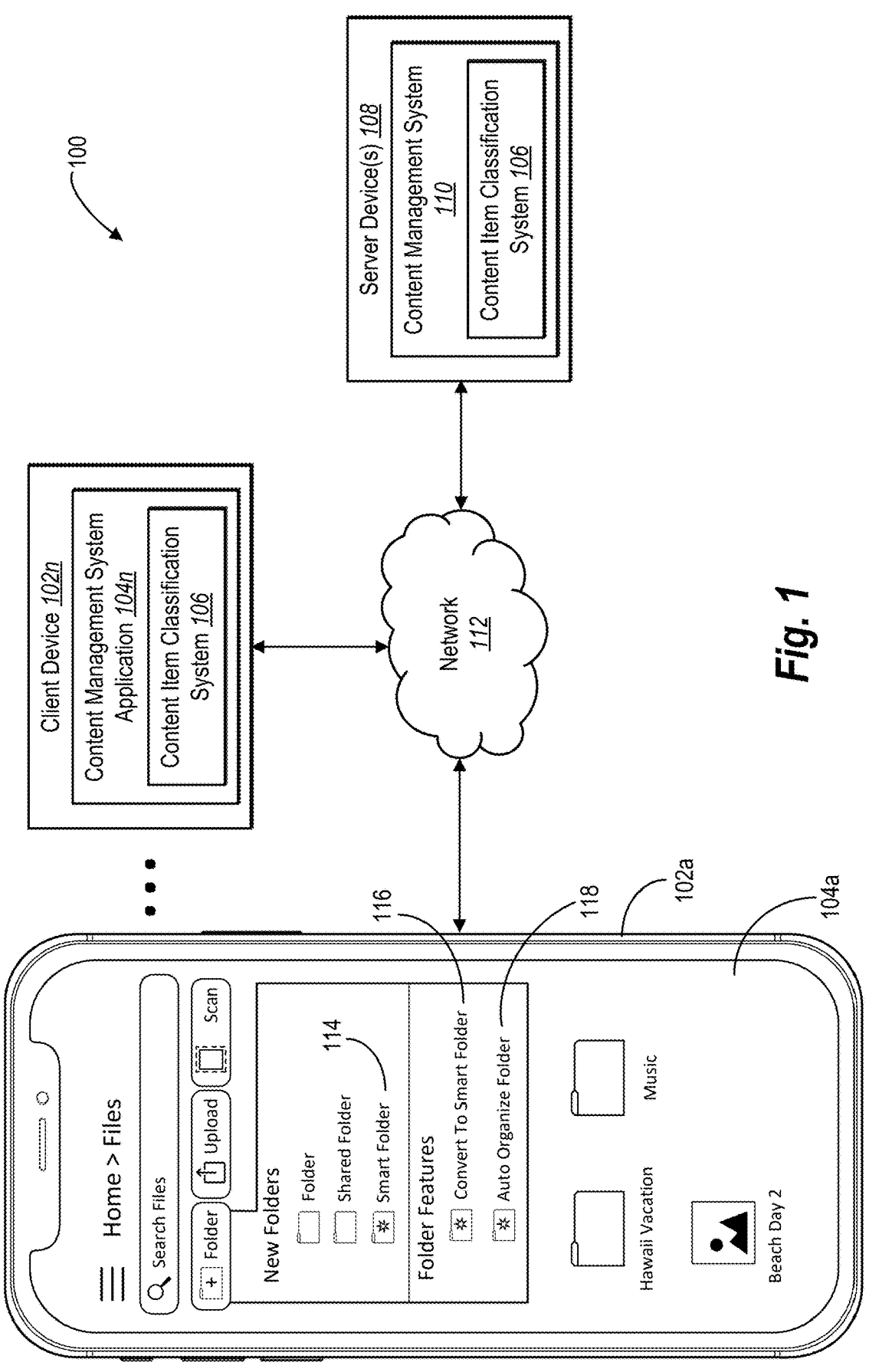
FIG. 1 illustrates a diagram of a computing system environment including a content item classification system in accordance with one or more embodiments.

One or more embodiments of the present disclosure relate to a content item classification system that uses machine-learning models to classify content items (e.g., electronic or data files) and automatically organize the content items within a file structure according to content item classifications. For instance, the content item classification system (or simply "classification system") generates a content item classification model (or simply "classification model") to determine content item classifications (or "classifications") for one or more content items within a file structure.

To illustrate, in some implementations, the classification system activates based on detecting a user request to automatically organize a folder that has content items and subfolders. For instance, in response to detecting a file organization request for a source folder, the classification system classifies the content items and the subfolders in the source folder utilizing a trained classification model. Further, based on determining correspondences between content items and destination folders selected from the subfolders, the classification system can provide an interactive user interface (or simply "interactive interface") that includes various levels of content item move suggestions based on classification confidence values of the content items. Then, based on confirmation and/or additional detected modifications to the content item move suggestions, the classification system moves selected content items to their suggested destination folders.

In one or more embodiments, the classification system is triggered when a content item is added to a designated folder. For example, based on a content item being added to the designated folder, the classification system automatically uses the classification model to determine a classification for the content item. In response to determining the classification for the content item, the classification system, without additional user input, moves the content item to a folder that corresponds to the determined classification. In addition, in some implementations, the classification system generates and utilizes a classification model to organize content items into dynamically-generated folders corresponding to dynamically recognized classifications, existing or user-defined folders corresponding to defined classifications, or a combination of existing folders corresponding to existing classifications as well as dynamically-generated folders corresponding to dynamically-determined classifications.

For instance, when content items are added to a smart folder (i.e., a designated "smart" folder associated with a classification model) or a user request for folder organization is detected, the classification system classifies the content items to classifications from a set of content item classifications. In addition, the classification system can identify, locate, or generate one or more destination folders associated with the classifications of the content items as well as move the newly classified content items to corresponding destination folders.

More specifically, in various implementations, the classification system can automatically move content items to a set of destination folders within a file structure (e.g., file hierarchy). For example, upon detecting the addition of one or more content items to a smart folder or a user request for folder organization (e.g., a smart move request), the classification system can use a trained classification model to classify the content items and then can dynamically generate (or locate) a destination folder for each classification (if there is not an existing destination folder corresponding to a determined classification). The classification system can then move classified content items to corresponding destination folders. As additional content items are added to the smart folder, the classification system can classify and move the additional content items to existing or newly-generated destination folders.

As another example, the classification system detects when content items are added to a smart folder having existing or pre-defined destination folders. In these implementations, the classification system can train a classification model to determine content item classifications by correlating existing content items to the existing destination folders in which the existing content items are located. Then, as unclassified and/or additional content items are added to the smart folder, the classification system automatically utilizes the trained classification model to classify and move the content items into the existing destination folders.

As a further example, the classification system detects when a folder organization request (e.g., from a user) is triggered for a source folder (e.g., an existing folder). In these implementations, the classification system can utilize a classification model (trained from organized folders and their enclosed content items) to determine content item classifications by correlating the existing content items to existing destination folders. Then, the classification system can generate content item move suggestions (or simply "move suggestions") that facilitate automatically organizing the content items into corresponding destination folders and provide the move suggestions within an interactive interface that facilitates user approval (e.g., confirmation) and/or modification of the move suggestions.

Additionally, the classification system can provide one or more types of move suggestions within the interactive interface. In some instances, move suggestion types are based on the classification confidence values (or simply "confidence values") of classified content items. For instance, in one or more implementations, the classification system provides a first type of move suggestion for a content item having a high confidence value to a given classification. To illustrate, the first type of move suggestion includes a selectable option (e.g., a dropdown folder menu or list) within the interactive interface that has been automatically selected with a suggested destination folder associated with the given classification. In these implementations, the classification system can also cause a selectable element associated with the content item to be selected (e.g., marks a checkbox linked to the selectable option), which indicates moving the content item to the destination folder indicated in the selectable option upon detecting user confirmation within the interactive interface.

In some implementations, the classification system provides a second type of move suggestion based on a content item having a middle confidence value. For instance, the second type of move suggestion includes the same selectable option introduced above (e.g., a dropdown folder list) within the interactive interface selected with a suggested destination folder. In these implementations, the classification system can also cause a selectable element associated with the content item to be unselected (e.g., uncheck a checkbox linked to the selectable option). Indeed, when the classification system has less confidence in a content item classification, the classification system can provide a helpful, but less automatic, move suggestion within the interactive interface.

Further, in some implementations, the classification system provides a third type of move suggestion based on a content item having a low confidence value. For instance, the third type of move suggestion includes a selectable option that prompts a user to select or otherwise provide the suggested destination folder for a content item. In these implementations, the classification system can also cause a selectable element associated with the content item to be unselected.

As mentioned above, the classification system can train a classification model from organized folders and their enclosed content items. To illustrate, the classification can identify sets of content items residing in sets of folders from user accounts of a content management system (e.g., group-based data). In various implementations, the classification system filters the folders based on one or more folder filtering metrics to determine whether a folder is an organized folder. Utilizing identified organized folders and their enclosed content items, the classification system can generate a set of training data (e.g., group-based training data) that includes the enclosed content items corresponding to organized folders (e.g., serving as group-based classification labels). Then, as mentioned above, the classification system utilizes the classification model trained on the group-based data to determine correlations between content items and destination folders.

As introduced above, the classification system can generate various classification models. For example, in various implementations, the classification system utilizes a content item classification machine-learning model to encode data and content from a content item (and in some cases a folder as well) into content item features and decodes the content item features to determine a classification for the content item (or the folder). In some implementations, the classification system determines and/or generates a set of classification labels (e.g., system-based classification labels) that the classification model uses during training and execution. In various implementations, the classification system utilizes a set of user-based classification labels based on existing content items and existing folders. In some implementations, the classification system utilizes a set of group-based classification labels based on existing content items and existing organized folders across one or more groups of user accounts of a content management system. Additionally, in example implementations, the classification system trains the classification model from a pre-trained machine-learning model, as described further below.

In one or more implementations, the classification system classifies content items (or folders) based on content item data (e.g., metadata) as well as the content of the content item (or the folder). As an example, the classification system uses content item data such as file name, file path, and file type (e.g., file extension). As another example, the classification system classifies a content item based on its contents, such as text, images, or layout included in the content of the content item. As a further example, the classification system classifies a folder based on folder name, enclosed content items, enclosed subfolders, etc.

As also mentioned above, in various implementations, the classification system detects or identifies unclassified content items, such as when a content item is added to a smart folder or a folder organization request is detected. For example, the classification system detects when a content item is added via user input to a smart folder. As another example, the classification system detects when unclassified content items are pushed into the smart folder by another system, model, or process. For instance, the classification system communicates with an automated workflow model to ingest content items to be organized into the file structure, such as content items attached to an email or other messages.

In various implementations, the classification system utilizes feedback to improve classification models. For example, based on detecting user input moving content items between destination folders, the classification system learns to better classify content items to accurately move and store content items in appropriate destination folders. As another example, the classification system provides a classification report or another listing that enables a user to verify the classification accuracy of a classification model. As a further example, the classification system identifies corrected classification feedback when modifications to move suggestions are detected within an interactive interface.

As also mentioned above, the content item classification system can provide several advantages over existing systems, particularly with regard to the accuracy, efficiency, and flexibility of implementing computer devices. For example, the classification system improves upon existing systems by generating and utilizing a classification model that accurately organizes content items within a file structure that includes multiple content items, folders, and/or subfolders. In particular, the classification system accurately classifies content items in an unorganized source folder based on their contents and/or data. Further, based on the classifications, the classification system organizes the content items by relocating or moving the classified content items to correct corresponding destination folders.

In addition to improved accuracy, the content item classification system can also improve efficiency relative to existing systems. For example, the classification system reduces user navigation and visual clutter of existing systems by automatically organizing content items utilizing a classification model and/or providing a streamlined interactive user interface to efficiently move multiple content items at once, as provided above. To elaborate, with little to no user interaction, the classification system automatically classifies and/or moves content items to their proper destinations. As a result, the classification system reduces the requirement of navigating through a number of steps and multiple graphical user interface menus, which in turn reduces computing resources and power consumption. Indeed, the classification system condenses if not eliminates navigational steps by automatically organizing and/or moving content items to their proper destination folders within a file structure. These efficiency benefits are further evidenced on client devices with smaller screens where computing and power resources are even more limited and where even more steps are required to move and organized content items into various destination folders and subfolders.

In addition, the system provides a more efficient graphical user interface that allows a user to organize and store content items within various levels of a file structure. As opposed to conventional systems where a user must take several steps to manually navigate through a file structure to locate a folder within which the user wants to save a file, the classification system described herein significantly reduces the number of steps. For example, in one implementation, a user simply moves multiple content items to a smart folder, and in response to this single user navigation step, the system automatically moves and stores the multiple content items in multiple different folders within the file structure. As another example, in example implementations, a user confirms content item move suggestions determined based on the classification model, which enables the classification system to automatically move some or all of the content items in the source folder to their proper destination folders with minimal user interaction. Accordingly, the number of steps a user must take in the graphical user interface described herein is significantly less than the number of steps required to perform the same function in conventional graphical user interfaces. Moreover, the graphical user interface provides a preview of where multiple content items will be sorted from a single interactive interface. Indeed, rather than navigating through multiple folders and interfaces, the graphical user interface enables a client device to preview, curate, modify, and control when each of a number of content items will be relocated from a single interface.

As mentioned, the content item classification system can also improve flexibility relative to existing systems. Indeed, in connection with utilizing the classification model, the content item classification system can dynamically move and sort content items into correct destination folders in an organized manner. Additionally, the classification system can flexibly train a classification model to adapt to different operations, such as moving and organizing content items within a file structure that includes system-generated destination folders, within a file structure that has existing destination folders, or a combination of both.

As illustrated by the above discussion, the present disclosure utilizes a variety of terms to describe features and advantages of the content item classification system. Additional detail is now provided regarding the meanings of some of these terms. For instance, as used herein, the term "content item" refers to a discrete digital data representation of a document, file, image, or another data structure having digital content. In particular, a content item can include, but is not limited to, an electronic document (e.g., text file, spreadsheet, PDF, webpage, presentation, list, table, form, workspace, template, playlist, post, calendar item, email message, etc.), a digital image, a digital video, and/or electronic communication.

In addition, a content item can include "content item data" (e.g., file data or document data) such as, but not limited to, content item a name (e.g., a file name), dates (e.g., creation, modifications, access), authors, content item type (e.g., file type), size, creation source, file path, tags, permissions, user settings, metadata, user activity (e.g., views, edits, shares, moves, access patterns) and/or content sharing settings. In addition, content item data can include the content within a content item, such as text (e.g., raw text), images, layout, visual features, font data, hidden information (e.g., headers, tags, document structure), and other file content.

As used herein, the term "file structure" refers to a collection of files and folders (or directories) that represent content items and storage locations for content items. For example, the file structure can include a hierarchical collection of directories (e.g., parent folders with nested child subfolders), one or more content items under the directories (e.g., files that represent content items), and/or metadata for the content items. Moreover, a file structure can represent a disk file system, flash file system, database file system, and/or network file system. Additionally, a file structure can represent a cloud-based service file system (e.g., a content management system) that synchronizes a collection of folders, one or more content items under the folders, and/or metadata for the content items across one or more server devices (e.g., cloud-computing devices) and/or one or more client devices.

Additionally, as used herein, the term "folder" refers to a discrete data representation of an organizational grouping of content items, nested folders (e.g., subfolders), or other data such as a directory that contains references to digital content item files and their locations in a file structure. The term "folder" can also refer to a collection, a workspace, a space, or any other type of a logical and/or visual grouping of content items. Indeed, a folder can include a cataloging structure that includes other folders (e.g., subfolders) and/or electronic files that represent data for content items. Furthermore, folders can include parent folders having and/or child folders (e.g., subfolders) as part of a hierarchical file structure. Moreover, folders can include smart folders and destination or target folders where the classification system classifies and moves unclassified content items in a smart folder to one or more destination folders. In various implementations, the term "folder data" refers to folder characteristics and attributes for a given folder (e.g., a subfolder of a folder). For example, folder data can include folder name, folder size, dates (e.g., creation, modifications, access), hierarchy position (e.g., parents, children, and sibling folders), enclosed content item (e.g., number, type, ration of content items to source folders), etc.

In addition, folders can be associated with the classification system and/or content item classifications. For example, the classification system can assign a folder as a smart folder that monitors incoming content items or other trigger events. Additionally, the classification system 106 can assign and/or dynamically generate folders corresponding to classifications of content items, referred to as destination folders. In some implementations, a destination folder is a subfolder of a smart folder. In alternative implementations, a destination folder is located outside of the smart folder but still accessible by the content management system.

As used herein, the term "machine-learning model" refers to a computer model or computer representation that can be tuned (e.g., trained) based on inputs to approximate unknown functions. For instance, a machine-learning model can include, but is not limited to, a transformer model, a sequence-to-sequence model, a natural language processing (NLP) model, a neural network (e.g., a convolutional neural network or deep learning model), a decision tree (e.g., a gradient boosted decision tree), a linear regression model, a logistic regression model, a random forest model, a clustering model, association rule learning, inductive logic programming, support vector learning, Bayesian network, regression-based model, principal component analysis, or a combination thereof. In some cases, a machine-learning model can be adjusted or trained to detect (or predict) a content item classification for a content item from a set of content item classifications (e.g., a learned set of content item labels).

Additionally, as used herein, the term "neural network" refers to a machine learning system or algorithm that can be tuned (e.g., trained) based on training inputs to estimate an unknown function. In particular, a neural network can include a plurality of interconnected artificial neurons that transmit data to other artificial neurons that generate outputs based on one or more inputs. More specifically, the plurality of interconnected neurons can learn to estimate complex elements by utilizing prior estimations and other training data. For example, a neural network can include deep neural networks, convolutional neural networks ("CNN"), fully convolutional neural networks ("FCN"), or recurrent neural networks ("RNN"). In other words, a neural network is a system or algorithm that implements deep learning techniques that utilize a set of learned parameters arranged in layers according to a particular architecture to attempt to model high-level abstractions in data.

Accordingly, the term "content item classification machine-learning model" (or simply "classification machine-learning model") refers to a machine-learning model trained to generate one or more content item embeddings (e.g., content item feature vectors), which in turn, generate one or more content item classifications. In particular, a classification machine-learning model can include encoding content items (e.g., content item data and/or content) into content item embeddings or feature vectors, then decoding the embeddings or feature vectors to determine a content item classification for the content item. In certain implementations, in addition to content items, a classification machine-learning model can also generate classifications for folders. For instance, given folder data as input, the classification machine-learning model determines one or more classifications (e.g., from the same set of learned classifications as content items). In various implementations, a classification machine-learning model includes a transformer machine-learning model or an NLP machine-learning model.

Similarly, the term "content item classification model" (or simply "classification model") refers to a content item classification machine-learning model and/or a content item classification neural network for determining content item classifications of content items (and folders in some instances). In some implementations, a classification model includes a folder generation classification model that determines classifications for content items based on system-based classifications. In various implementations, a classification model includes an existing folder classification model that determines classifications for content items based on user-generated classifications (e.g., based on existing folders within a smart folder). In example implementations, a classification model includes a group-based folder classification model that determines classifications for content items based on group-based classifications (e.g., based on content items within organized folders belonging to users across the content management system) or another set of user accounts from another file structure system. Additionally, a classification model can determine confidence values when determining classifications for a content item (or folder). In a number of implementations, the classification model includes a hybrid classification model, as described below.

Additional detail regarding the content item classification system is now provided with reference to the figures. For example, FIG. 1 illustrates a schematic diagram of a digital medium system environment 100 (or simply "environment 100") for implementing a content item classification system 106 in accordance with one or more embodiments. As shown in FIG. 1, the environment 100 includes client devices 102a-102n (collectively referred to as client devices 102) and a server device(s) 108 connected via a network 112. Additional detail regarding these computing devices and networks is provided below in connection with FIGS. 10-11.

As mentioned, the environment 100 includes the server device(s) 108. In some embodiments, the server device(s) 108 comprises content servers and/or a data collection server. As shown, the server device(s) 108 includes a content management system 110 having a content item classification system 106. The content management system 110 can organize, manage, and/or execute tasks associated with user accounts, cloud storage, file synchronization, data security/encryption, smart workspaces, etc. In one or more implementations, the content management system 110 facilitates generating, managing, and/or storing content items associated with accounts of users within the content management system 110 (i.e., a "user account").

In at least one embodiment, the content management system 110 organizes digital content items and stores changes made to the digital content items in response to various user activities. For example, a user can generate a new content item using the client device 102a. Subsequently, the content management system 110 hosted on the server device 108 via the network 112 detects and stores the content item and/or distributes the content item (or a placeholder of the content item) to other client devices 102 associated with the account of the user. Additional detail regarding the content management system 110 is provided below with FIG. 17.

As shown, the content management system 110 includes the content item classification system 106 (or simply "classification system 106"). In one or more implementations, the classification system 106 facilitates the organization and management of content items within a file structure associated with the content management system 110. For example, the classification system 106 automatically organizes content items added to a smart folder associated with an account of a user (e.g., on one of the client devices 102 and/or on a network storage device). Additional detail regarding the classification system 106 is provided below in the subsequent figures.

As shown in FIG. 1, the environment 100 includes the client devices 102. The client devices 102 can be one of a variety of computing devices, including a smartphone, tablet, mobile device, smart television, desktop computer, laptop computer, virtual reality device, augmented reality device, and/or another computing device as described with FIG. 17. For example, the client devices 102 can be operated by users to perform various functions (e.g., via content management system applications 104a-104n) such as, but not limited to, creating, receiving, viewing, modifying, and/or transmitting content items, configuring user account or application settings of a content management system, and/or electronically communicating with other user accounts of a content management system. Although FIG. 1 illustrates multiple client devices 102, in some embodiments the environment 100 can include just one of the client devices 102.

To access the functionalities of the content management system 110 (and the classification system 106), users can interact with the content management system applications 104a-104n (collectively referred to as content management system application 104) via the client devices 102. The content management system application 104 can include one or more software applications installed on the client devices 102. In some implementations, the content management system application 104 can include one or more software applications that are downloaded and installed on the client devices 102 to include an implementation of the classification system 106. In some embodiments, the content management system application 104 is hosted on the server device 108 and accessed by the client devices 102 through a web browser and/or another online platform. Moreover, the content management system application 104 can include functionalities to access or modify a file structure stored locally on the client devices 102 and/or hosted on the server device 108.

As just mentioned, in some embodiments, the client devices 102 include the classification system 106 (through the content management system application 104). In particular, as shown in FIG. 1, the first client device 102a implements the classification system 106 through a first content management system application 104a. As shown, the first client device 102a displays (e.g., via the content management system application 104a) a file structure and menu options for implementing the classification system 106 to automatically organize content items. Indeed, the first content management system application 104a includes a first menu option 114 to generate a new smart folder (i.e., "smart folder") that automatically detects and organizes incoming content items into dynamically-generated destination folders. In addition, the first content management system application 104a includes a second menu option 116 to convert an existing folder to a smart folder that automatically detects and organizes incoming content items based on existing subfolders and their existing content items. Further, the first content management system application 104a includes a third menu option 118 to automatically organize an existing folder that has unorganized content items and subfolders via an interactive user interface (or simply ("interactive interface").

To briefly illustrate, the classification system 106 detects selection of the second menu option 116 to convert the existing folder (i.e., "Files") into a smart folder. Subsequently, the classification system 106 identifies an image (i.e., "Beach Day 2") being added to the smart folder. In response, the classification system automatically classifies and moves the image into the "Hawaii Vacation" subfolder.

Additionally, or in the alternative, the classification system 106 detects a selection of the third menu option 118 to automatically organize the existing folder. In response, the classification system 106 utilizes a trained classification model to determine that the "Hawaii Vacation" subfolder (e.g., a destination folder) and the image (i.e., "Beach Day 2") correspond to the same classification. Further, the classification system 106 provides an interactive interface that suggests automatically moving the image into the Hawaii Vacation" subfolder. Additional examples and implementations of the classification system 106 are provided below with respect to subsequent figures.

While FIG. 1 illustrates the classification system 106 being implemented by a particular component and/or device within the client devices 102, in some embodiments, the classification system 106 is implemented, in whole or part, by other computing devices and/or components in the environment 100. For example, as also shown, in some implementations, the classification system 106 is implemented on the server device 108 within the content management system 110. More specifically, in some embodiments, some or all of the classification system 106 is implemented by the server device 108 and accessed by the client devices 102 through the content management system application 104, web browsers, and/or other online platforms (as described above).

Figure 2B:
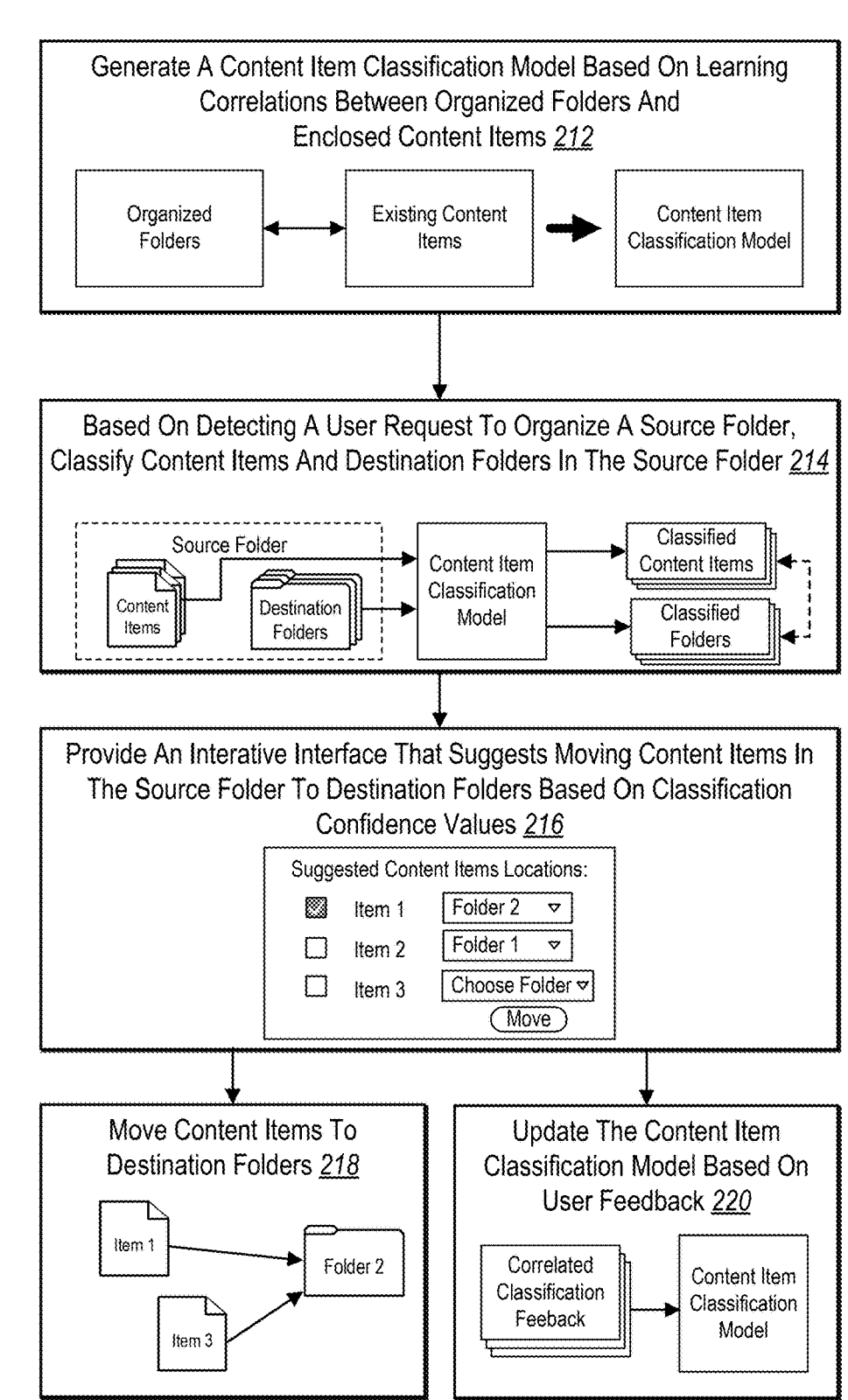

As mentioned above, subsequent figures correspond to the classification system 106 automatically classifying content items from a smart folder into destination subfolders. To illustrate, FIGS. 2A-2B show an overview diagram of organizing digital content items into folders (e.g., destination folders) within a file structure utilizing a content item classification model in accordance with one or more embodiments. In particular, FIGS. 2A-2B include a first series of acts 200 and a second series of acts 210 performed by the classification system 106 for organizing content items.

As shown in FIG. 2A, the first series of acts 200 includes an act 202 of generating a content item classification model (or simply "classification model") that classifies content items. For example, in certain implementations, the classification system 106 generates a classification model by tuning a pre-trained machine-learning model based on a set of classifications, which is further described below with FIG. 6A and FIG. 12. In some implementations, the set of classifications are system-based, while in other implementations, the set of classifications are user-based, which is further described below with FIG. 8.

The first series of acts 200 also includes an act 204 of detecting a content item being added to a smart folder. For example, in various implementations, the classification system 106 receives input designating a folder as a smart folder managed (e.g., select the folder as a source folder to be organized), in part, by the classification system 106. In some implementations, the smart folder is a newly created folder.

In other implementations, the smart folder is an existing folder that includes subfolders and/or content items.

As described below, in various implementations, the smart folder is a designated folder within which a user can place unorganized content items to be organized automatically by the classification system 106. Indeed, when content items are added to the smart folder, the classification system 106 detects the content item being added (e.g., by a user or from an automated workflow). Additional detail regarding detecting the addition of content items to a smart folder is provided below in connection with FIGS. 3A-4E and 4C.

As shown in FIG. 2A, the first series of acts 200 includes an act 206 of classifying the content item utilizing the content item classification model in response to detecting the addition of a content item to the smart folder. For instance, in various implementations, the classification system 106 utilizes the classification model to determine a classification for one or more content items added to the designated smart folder. Additional detail regarding classifying content items is provided below in connection with FIG. 6B.

Further, the first series of acts 200 includes an act 208 of moving the content item to a destination folder associated with the classification of the content item. For example, in various implementations, the classification system 106 moves the content item to a destination folder corresponding to its classification. If a destination folder does not yet exist, the classification system 106 can dynamically generate one. Additional detail regarding moving content items into destination folders is provided below in connection with FIGS. 3E-3G and 4C-4D.

As shown in FIG. 2B, the second series of acts 210 includes an act 212 of generating a content item classification model based on learning correlations between organized folders and their enclosed content items. For instance, in various implementations, the classification system 106 identifies sets of content items and corresponding folders (i.e., sets of folders) from user accounts of a content management system. In some implementations, the classification system 106 utilizes one or more organized content metrics to determine which of the identified folders satisfy an organized threshold. Further, upon identifying which folders are organized, the classification system 106 can generate group-based training data and train a classification model (e.g., a content item classification model) to classify content items to align with the organized folder in which they reside. Additional detail regarding training a classification model trained based on group-based data is provided in connection with FIG. 6A. Additional detail regarding generating group-based training data is provided in connection with FIG. 7.

In addition, the second series of acts 210 includes an act 214 of detecting a user request to organize a source folder and, in response, classifying content items and destination folders in a source folder. For instance, the classification system 106 detects a user requesting that the classification system 106 automatically organize a folder (e.g., a source folder) that has content items and subfolders (e.g., destination folders). In response, the classification system 106 can utilize the trained classification model to determine classifications for each content item and each subfolder in the source folder. In addition, in one or more implementations, the classification system 106 can determine correspondences between the content items and destination folders (selected from the subfolders) based on their respective classifications. Additional detail regarding utilizing a classification model trained based on group-based data is provided in connection with FIG. 6D.

As shown in FIG. 2B, the second series of acts 210 includes an act 216 of providing an interactive interface that suggests moving content items in the source folder to destination folders based on classification confidence values. For instance, in one or more implementations, the classification system 106 generates and provides an interactive interface that includes different types of moving suggestions for organizing some or all of the content items into destination folders. As mentioned, in various implementations, the classification system 106 can change the suggestion type based on the confidence value of a content item with respect to a corresponding destination folder. For example, the classification system 106 can provide more-efficient moving suggestions for content items that have higher confidence values while providing moving suggestions in the interactive interface needing more interaction for content items with lower confidence values. Additional detail regarding the interactive interface is provided below in connection with FIGS. 5A-5G.

The second series of acts 210 also includes an act 218 of moving content items to destination folders. For instance, in various implementations, the interactive interface generated by the classification system 106 includes moving suggestions for a number of content items that are ready to move to their suggested destination folders. In some implementations, the classification system 106 updates the moving suggestions for one or more other content items based on user interactions with these content items. Upon detecting the user confirming one or more content items selected to be moved, the interactive interface moves the selected content item to their suggested destination folders. Additional detail regarding moving content items based on moving suggestions within the interactive interface is provided below in connection with FIGS. 5B-5E.

In some implementations, the second series of acts 210 includes an act 220 of updating the content item classification model based on user feedback. For example, in some instances, the classification system 106 detects user interactions with content items in the interactive interface, such as moving content items having low confidence values to a destination folder in the source folder. Each of these interactions can correspond to correcting a missed content item (or destination folder) classification. Accordingly, the classification system 106 can utilize modifications to move suggestions as corrected classification feedback to further tune and train the content item classification model. Additional detail regarding the re-training of the classification model is provided below in connection with FIG. 10.

Example Graphical User Interfaces for Automated Folders of the Classification System As mentioned above, the classification model can generate different versions of the content item classification model corresponding to classifying and organizing content items to suit different scenarios of file organization and management. As a first example, in one or more implementations, the classification system 106 generates a classification model associated with a newly created folder where content items are to be added. As a second example, the classification system 106 generates a classification model associated with an existing folder having existing folders in content items. In this second example, the classification system 106 can generate a classification model based on the existing files and folders (e.g., the existing folders in a smart folder become the destination folders). In a third example, the classification system 106 can generate a classification model that facilitates organizing existing content items in a source folder to destination folders. In this example, the classification system 106 can provide an interactive interface to streamline folder organization and significantly reduce the number of steps needed to accurately move content items to corresponding destination folders.

To further illustrate, FIGS. 3A-3G provide a graphical user interface (GUI) flow of the classification system 106 operating a classification model based on the first example in the previous paragraph. FIGS. 4A-4D provide a GUI flow of the classification system 106 operating a classification model based on the second example in the previous paragraph. FIGS. 5A-5G provide a GUI flow of the classification system 106 operating a classification model based on the third example in the previous paragraph.

For context, FIGS. 3A-5G include a client device 300 having a graphical user interface 302 (or simply "GUI 302"). In various implementations, the client device 300 is an example of one of the client devices 102 introduced above in connection with FIG. 1. Further, in various implementations, the GUI 302 is generated by a content management system application 104, which is also introduced above.

Figure 3A:
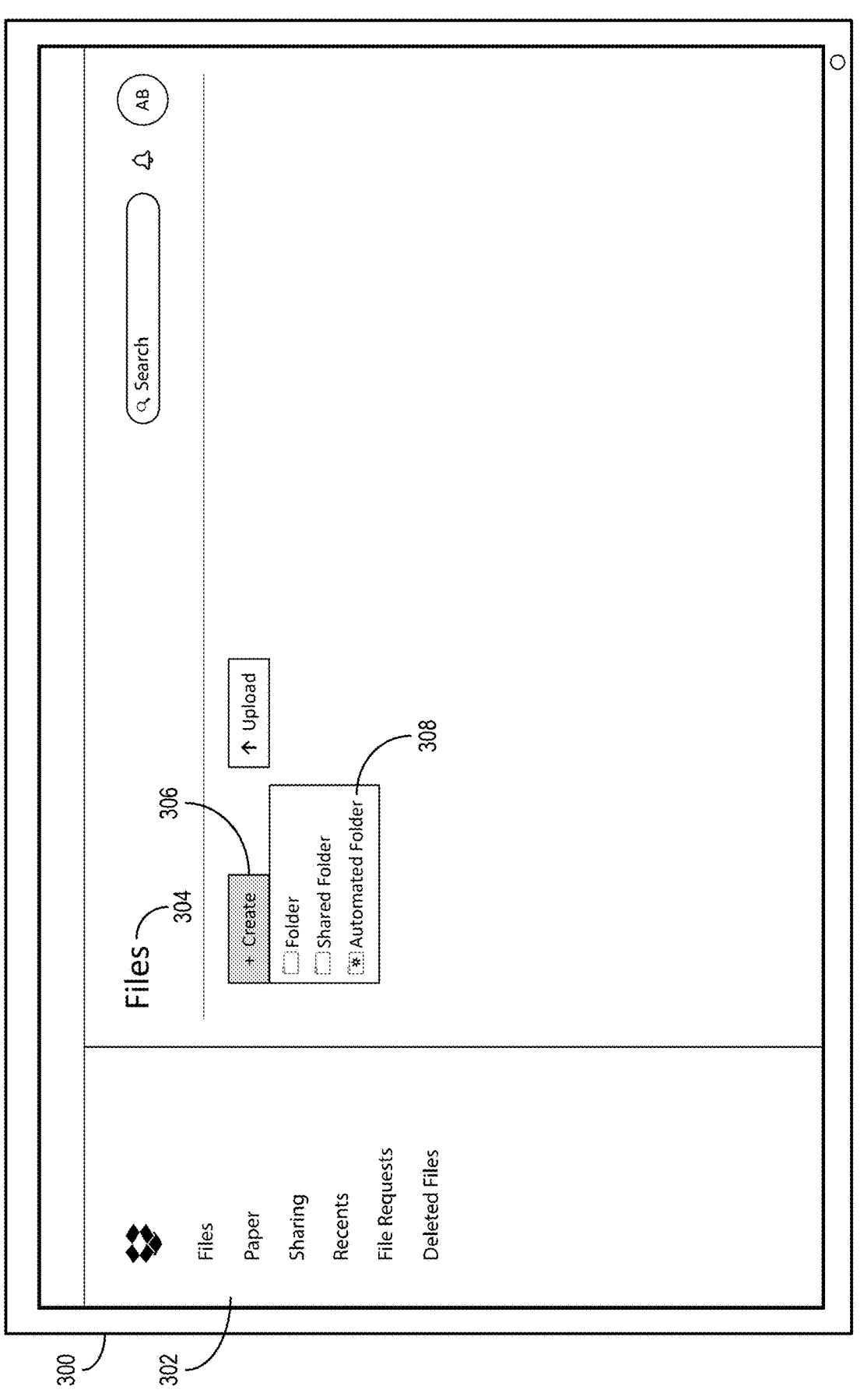
FIGS. 3A-3G illustrate organizing content items into newly generated folders in a file structure based on content item classifications in accordance with one or more embodiments.

More specifically, FIGS. 3A-3G show the classification system 106 organizing new content items into new folders in a file structure based on content item classifications in accordance with one or more embodiments. To illustrate, FIG. 3A shows the GUI 302 of a file structure 304 along with various menus, tools, links, and graphical elements. In particular, the file structure 304 (e.g., "Files") shows an initially empty file structure. In various implementations, the file structure 304 represents any folder or directory on a client device or managed by a content management system.

As shown, the GUI 302 in FIG. 3A includes a folder creation element 306 (i.e., "+Create") for creating new folders in the file structure 304. As shown, the folder creation element 306 includes various options for generating folders including an automated folder option 308 to generate an automated folder within the folder creation element 306. In various implementations, the classification system 106 detects a selection of the automated folder option 308 based on user input. In some implementations, the classification system 106 detects the selection of the automated folder option 308 as part of an automated workflow (e.g., the classification system 106 automatically generates an automated folder as part of a workflow).

Figure 3B:
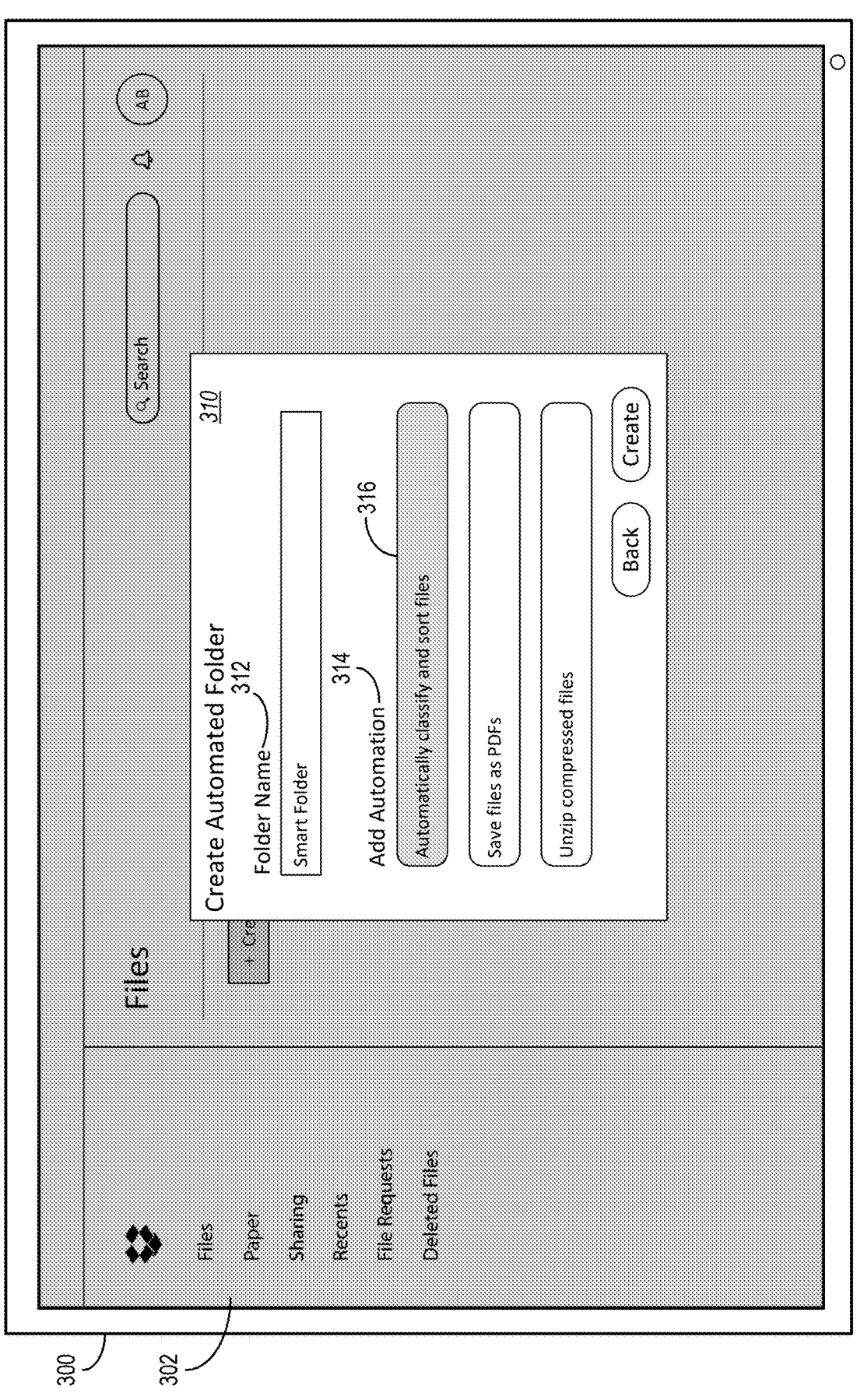

In one or more implementations, an automated folder includes multiple types of automated folders. Accordingly, upon detecting the selection of the automated folder option 308, the classification system 106 prompts the user to select an automated folder type. To illustrate, FIG. 3B shows an automated folder creation interface 310 for selecting and customizing the automated folder type. As shown, the automated folder creation interface 310 includes a naming option 312 to name the automated folder being created (e.g., the folder is being named "Smart Folder").

Additionally, the automated folder creation interface 310 includes a list 314 of automated folder types, including a first automated folder type 316 of automatically classifying and sorting files (referred to herein as a "smart folder"). The list 314 of automated folder types can include other types of automated folders such as the other types shown as well as types not shown. Further, the automated folder creation interface 310 can include other customization options, such as indicating a file path for a new automated folder.

Notably, for ease of explanation, the terms "automated folder" and "smart folder" will be used interchangeably going forward to refer to a folder for which the classification system 106 classifies and sorts content items. In some implementations, the classification system 106 automatically classifies, sorts, and/or automatically organizes content items. In alternative implementations, the classification system 106 classifies content items, provides sorting suggestions (e.g., content item move suggestions), and sorts the content item upon user confirmation.

In various implementations, the classification system 106 detects confirmation of the user requesting to create a smart folder via the automated folder creation interface 310. In some implementations, the classification system 106 creates a smart folder with bypassing the automated folder creation interface 310. For example, the classification system 106 generates a smart folder in response to the user selecting a smart folder creation menu option from the folder creation element 306.

Figure 3C:
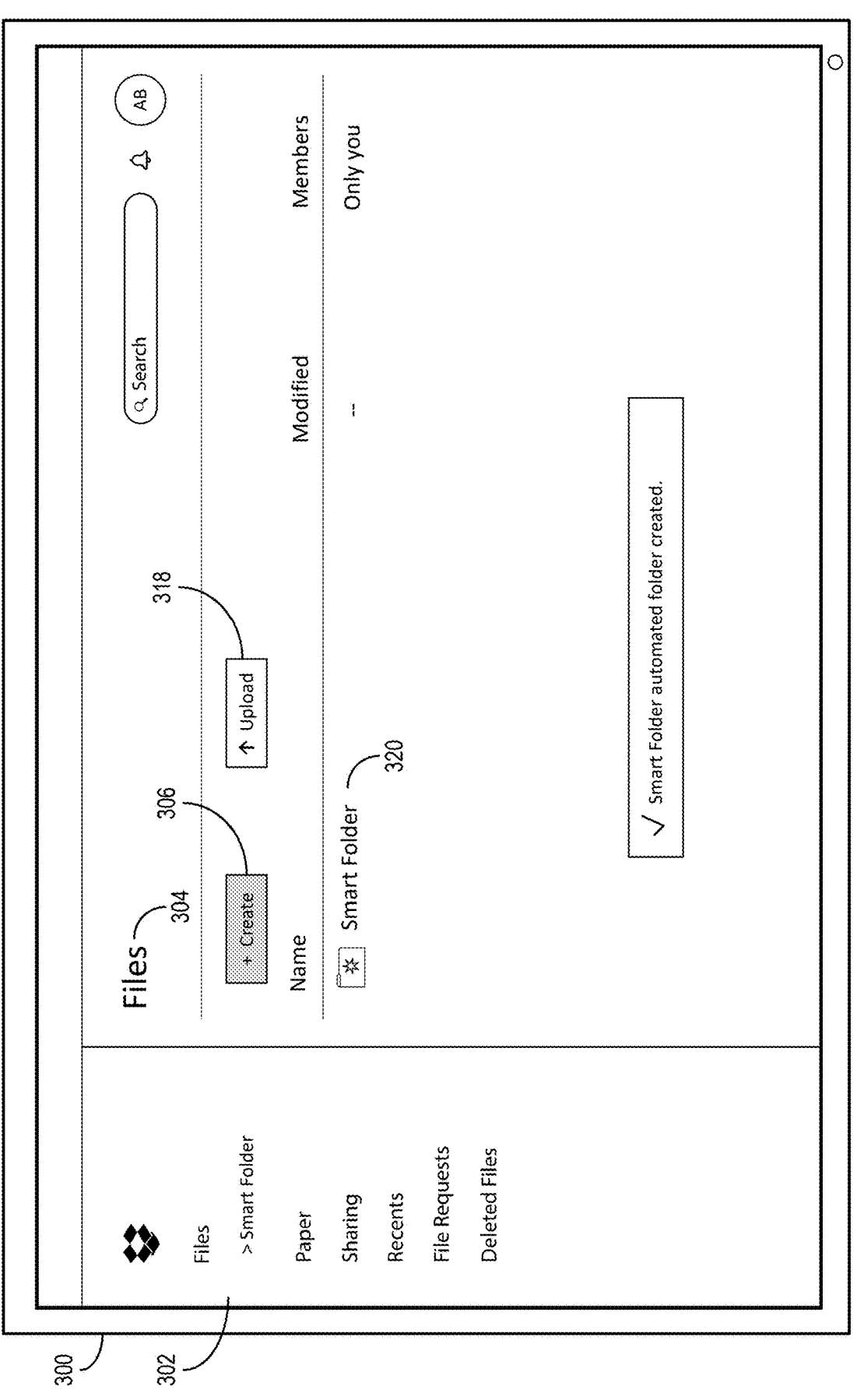

As shown in FIG. 3C, the file structure 304 includes the classification system 106 creating a smart folder 320. As part of creating the smart folder 320, in one or more implementations, the classification system 106 generates and/or obtains a classification model that is trained and tuned to classify content items to a classification (i.e., content item classification) from a set of classifications (e.g., predetermined or system-generated classifications). Further, in some implementations, the classification system 106 connects the classification model with the smart folder 320 (e.g., enables the classification system 106 to manage the smart folder 320). Accordingly, a user account may include multiple smart folders, where each smart folder is associated with a different classification model. For instance, a first smart folder is associated with a classification model trained to classify accounting documents (receipts, tax documents, invoices, etc.), while a second smart folder is associated with a classification model trained to classify human resource documents (resumes, ID verification documents, W4 tax documents, etc.).

As shown in FIG. 3C, the GUI 302 also includes a content item upload element 318. In various implementations, the classification system 106 can facilitate a user uploading content items via the content item upload element 318 (e.g., by selecting content items to add to the file structure 304 within a selection interface). In some implementations, the classification system 106 facilitates content item uploads through other means, such as dragging and dropping files into the file structure 304.

Figure 3D:
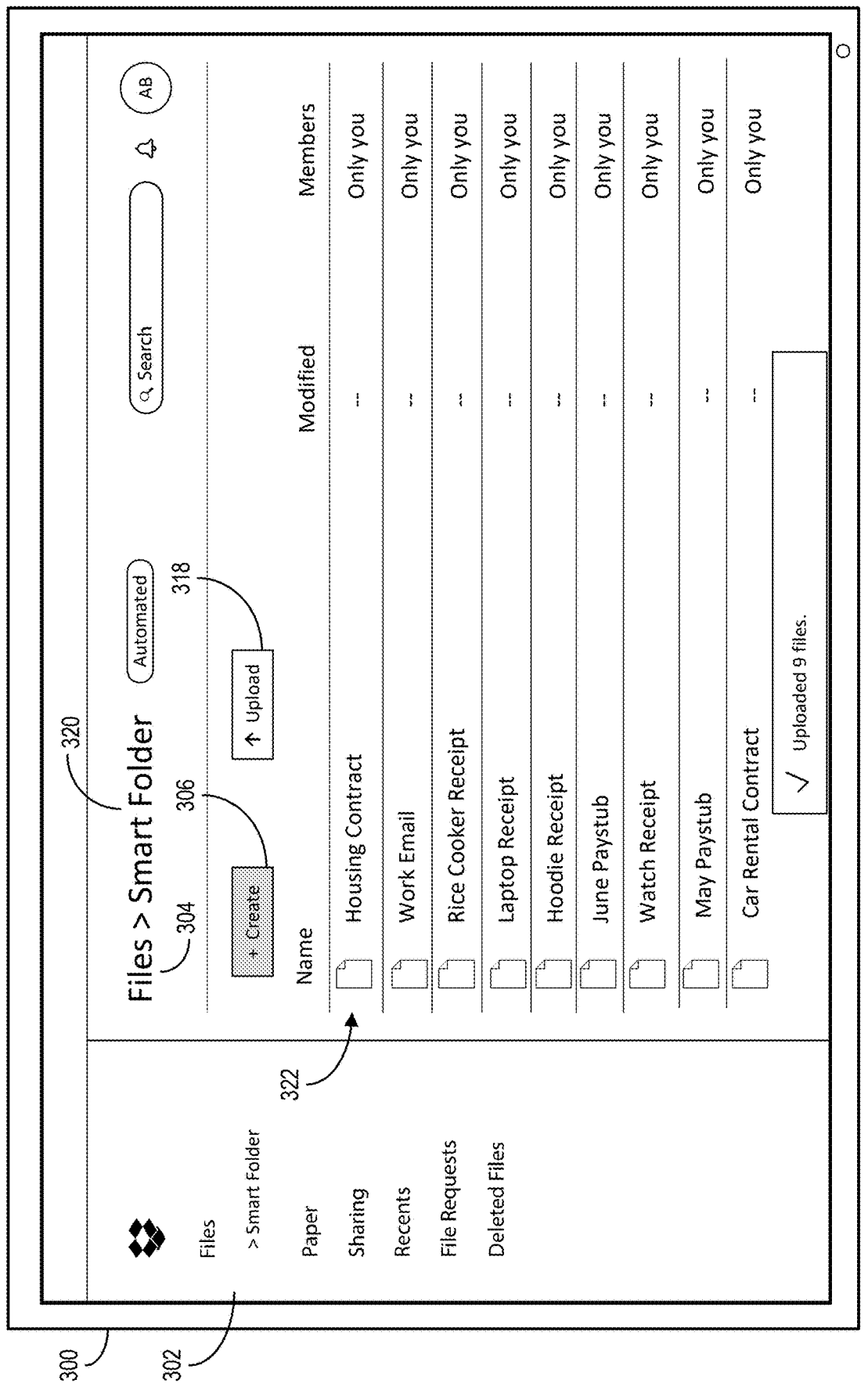

For instance, utilizing the classification system 106 and/or the content item upload element 318, a user uploads multiple content items to the smart folder 320. To illustrate, FIG. 3D shows multiple content items 322 added to the smart folder 320, which serves as a smart folder (i.e., an automated folder). In particular, the GUI 302 in FIG. 3D shows the contents of the smart folder 320 within the file structure 304. As indicated by their names (e.g., file names), the multiple content items 322 correspond to different subjects or categories. Further, the content items can represent different content item types (e.g., documents, images, videos, webpages, etc.).

As mentioned above, in response to detecting content items being added to the smart folder 320 (e.g., a smart folder), the classification system 106 begins automatically (e.g., on the fly and/or in real-time) classifying, moving, and organizing the content items 322. For example, the classification system 106 utilizes the classification model to classify the first content item (i.e., "Housing Contract") of the content items to the classification of "contracts" and the second content item (i.e., "Work Email") of the content items to the classification of "emails," which are both classes from the set of content item classifications.

Figure 3E:
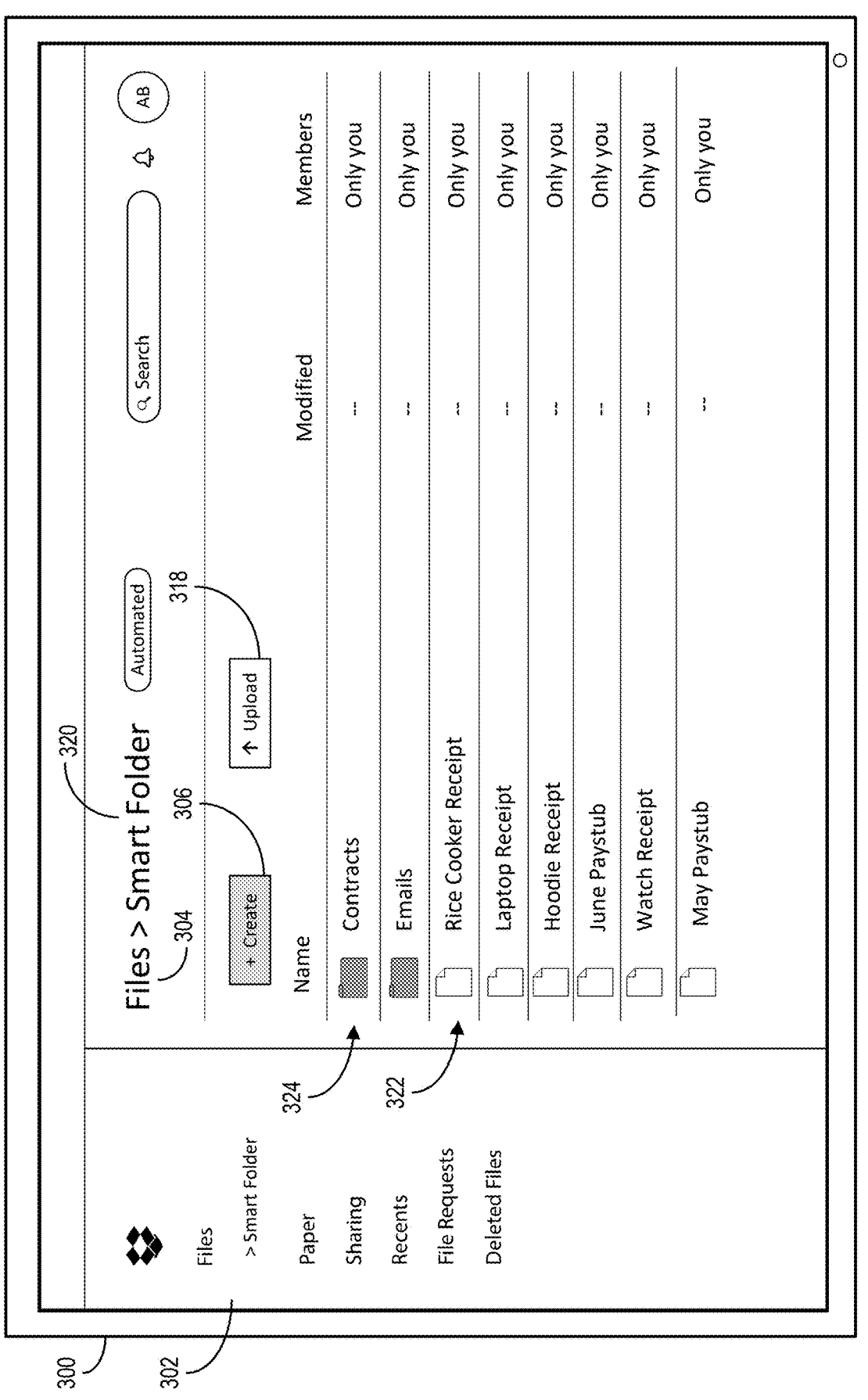

Based on classifying one or more of the content items 322, the classification system 106 can move the classified content items into one or more destination folders. To illustrate, FIG. 3E shows the first and second content items from FIG. 3D moved out of the smart folder 320 and into one or more of the destination folders 324 (e.g., subfolders of the smart folder 320) corresponding to the content item classifications. For example, upon classifying the first content item (i.e., "Housing Contract") to the classification of "contracts," the classification system 106 moves it to a contracts subfolder (i.e., a destination folder 324), which is associated with the classification of "contracts."

In various implementations, the classification system 106 first determines whether a corresponding destination folder exists in the file structure 304. For instance, the classification system 106 looks up folders of the file structure 304 to determine whether a destination folder is included. If yes, the classification system 106 can identify where the destination folder resides. For example, the destination folder resides as a subfolder within the smart folder, nested multiple subfolders deep within the smart folder, or located outside of the smart folder (but within the file structure 304).

Otherwise, if the destination folder is not included in the file structure 304, the classification system 106 can dynamically (e.g., automatically) generate and/or add the destination folder into the smart folder (e.g., as a subfolder in the smart folder 320) or elsewhere within the file structure 304. Indeed, the classification system 106 generates and adds destination folders 324 to the file structure 304 upon one or more content items being added to the destination folder. In this manner, the classification system 106 does not clutter or confuse users with empty and unnecessary subfolders. In alternative implementations, the classification system 106 generates one or more destination folders for one or more classifications upon generating the smart folder.

To illustrate dynamically generating destination folders 324, upon classifying the first content item (i.e., "Housing Contract") to the classification of "contracts," the classification system 106 determines that there does not exist a corresponding destination folder within the smart folder 320 (e.g., the corresponding destination folder of "Contracts" does not exist the file structure 304). Accordingly, the classification system 106 generates a destination folder called "Contracts" in the smart folder 320 and associates the classification of "contracts" with the newly generated folder. Then, the classification system 106 moves the classified first content item into the contracts subfolder, as shown in FIG. 3E.

Figure 3F:
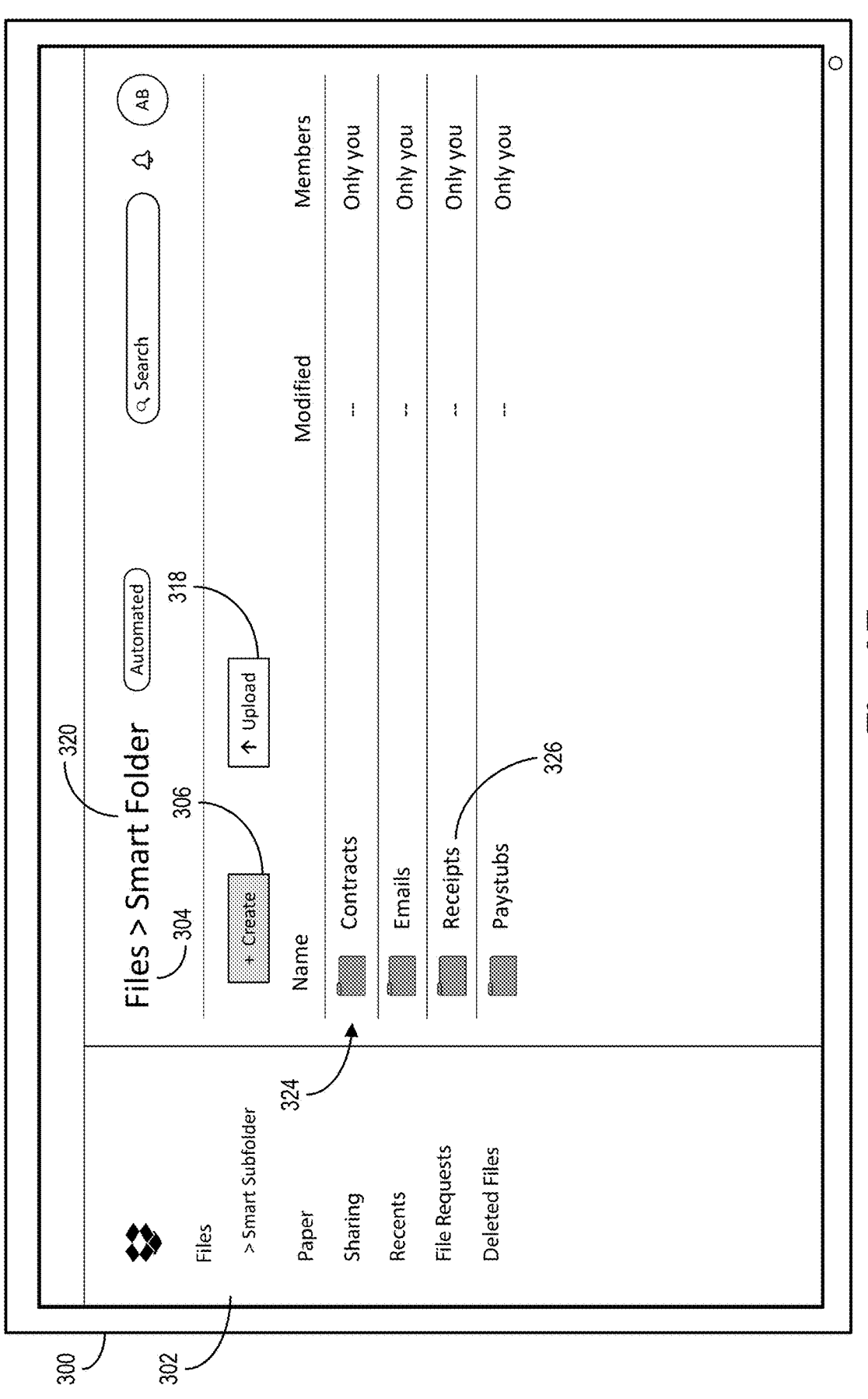

Looking now at FIG. 3F, the classification system 106 moves the content items from the smart folder 320 (e.g., smart folder) into the destination folders 324. Thus, upon classifying each of the content items, the classification system 106 automatically moves the classified content items to corresponding destination folders 324. Indeed, in response to detecting several new content items being added to a smart folder, the classification system 106 utilizes a classification model to automatically classify each of the content items and automatically move the content items to appropriate destination folders 324, without further user interaction or input.

In some implementations, the classification system 106 is unable to classify a content item (e.g., the content item does not correspond to any of the listed classifications). In these implementations, the classification system 106 can move the content item to an "Other," "Miscellaneous," or "Unclassified" destination folder. In various implementations, the classification system 106 leaves the content item within the smart folder. In certain implementations, the classification system 106 prompts the user for a classification of the content item (which the classification system 106 can utilize as feedback to properly classify like content items in the future).

Figure 3G:
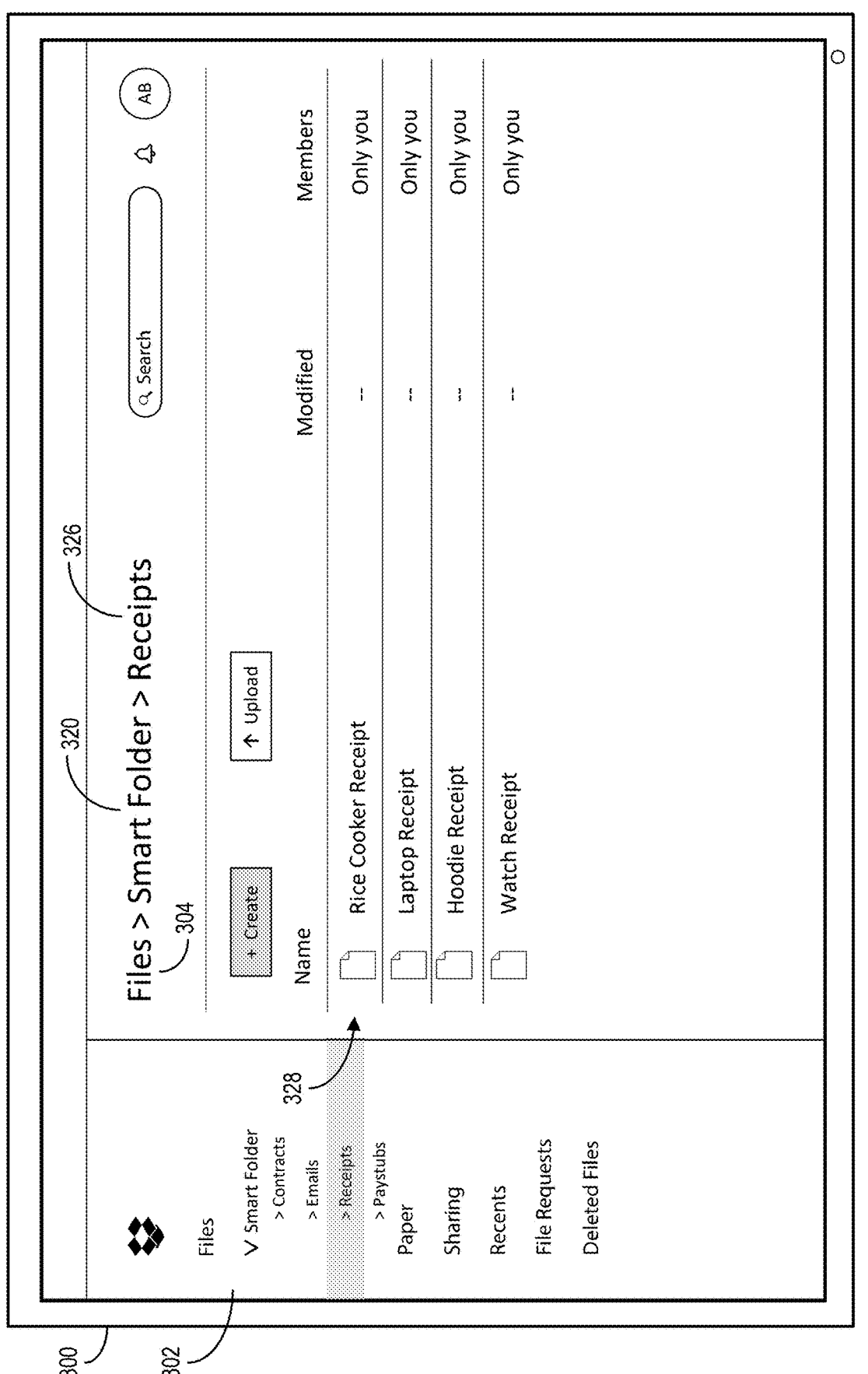

Returning to FIG. 3F, as mentioned above, the classification system 106 moves the content items from the smart folder 320 (e.g., a smart folder) into the destination folders 324. To illustrate, upon detecting the selection of the "Receipts" destination folder 326, the classification system 106 updates the GUI 302 to show the content items classified as "receipts" moved into the Receipts destination folder 326, which is further shown in FIG. 3G. In particular, FIG. 3G shows the Receipts destination folder 326 having corresponding classified content items 328. Indeed, upon identifying added content items, the classification system 106 automatically determines which content items correspond to the classification of receipts and automatically sorts those content items into the receipts destination folder 326.

While FIGS. 3A-3G correspond to the classification system 106 generating a new automated smart folder for organizing and sorting content items, in various implementations, the classification system 106 organizes and relocates content items within an existing file structure and among existing content items. Accordingly, FIGS. 4A-4D illustrate organizing new content items into existing folders in a file structure based on content item classifications in accordance with one or more embodiments.

Figure 4A:
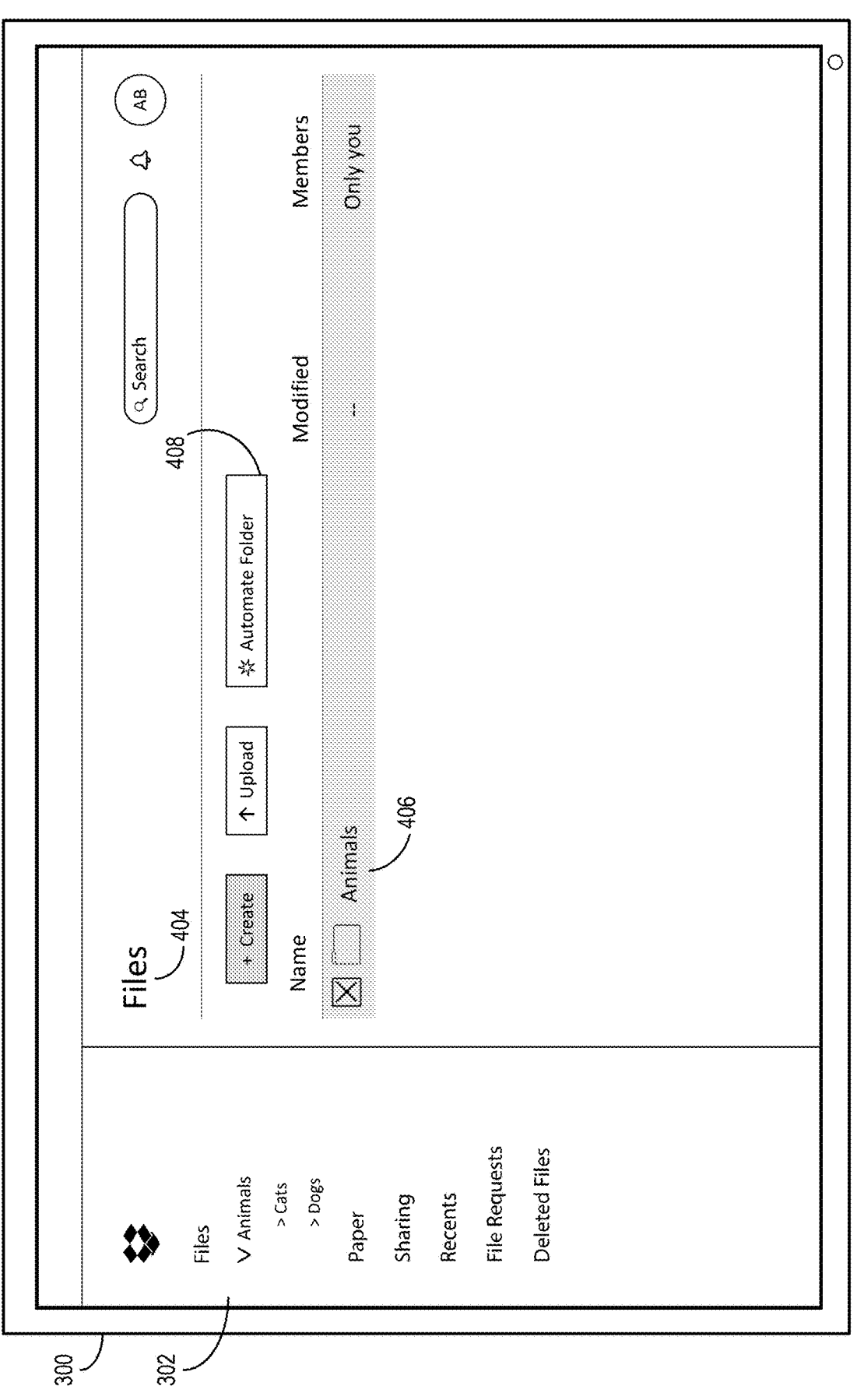
FIGS. 4A-4D illustrate organizing content items into existing folders in a file structure based on content item classifications in accordance with one or more embodiments.

To illustrate, FIG. 4A shows the GUI 302 of the client device 300 having a file structure 404, which includes an existing folder 406. For example, the existing folder 406 can include multiple subfolders having content items within the subfolders. While the file structure 404 shows one existing folder 406, in various implementations, the file structure 404 includes any number of folders.

As shown, the GUI 302 also includes a folder automation element 408. For example, in one or more implementations, the classification system 106 provides the folder automation element 408 to facilitate the conversion of an existing folder 406 to an automated folder (e.g., a smart folder). For instance, in some implementations, upon selecting the existing folder 406, the classification system 106 causes the folder automation element 408 to appear within the GUI 302 (or to become selectable).

Further, upon detecting the selection of the folder automation element 408, the classification system 106 can convert the existing folder 406 to an automated folder or smart folder. For example, in one or more implementations, the classification system 106 provides an interface similar to the automated folder creation interface described above that enables the selection of a type of automated folder from a list of automated folder types. In some implementations, the classification system 106 converts the existing folder 406 to an automated folder that automatically classifies and sorts incoming content items (e.g., a smart folder). Accordingly, upon selecting the folder automation element 408, the classification system 106 automates the existing folder 406.

Figure 4B:
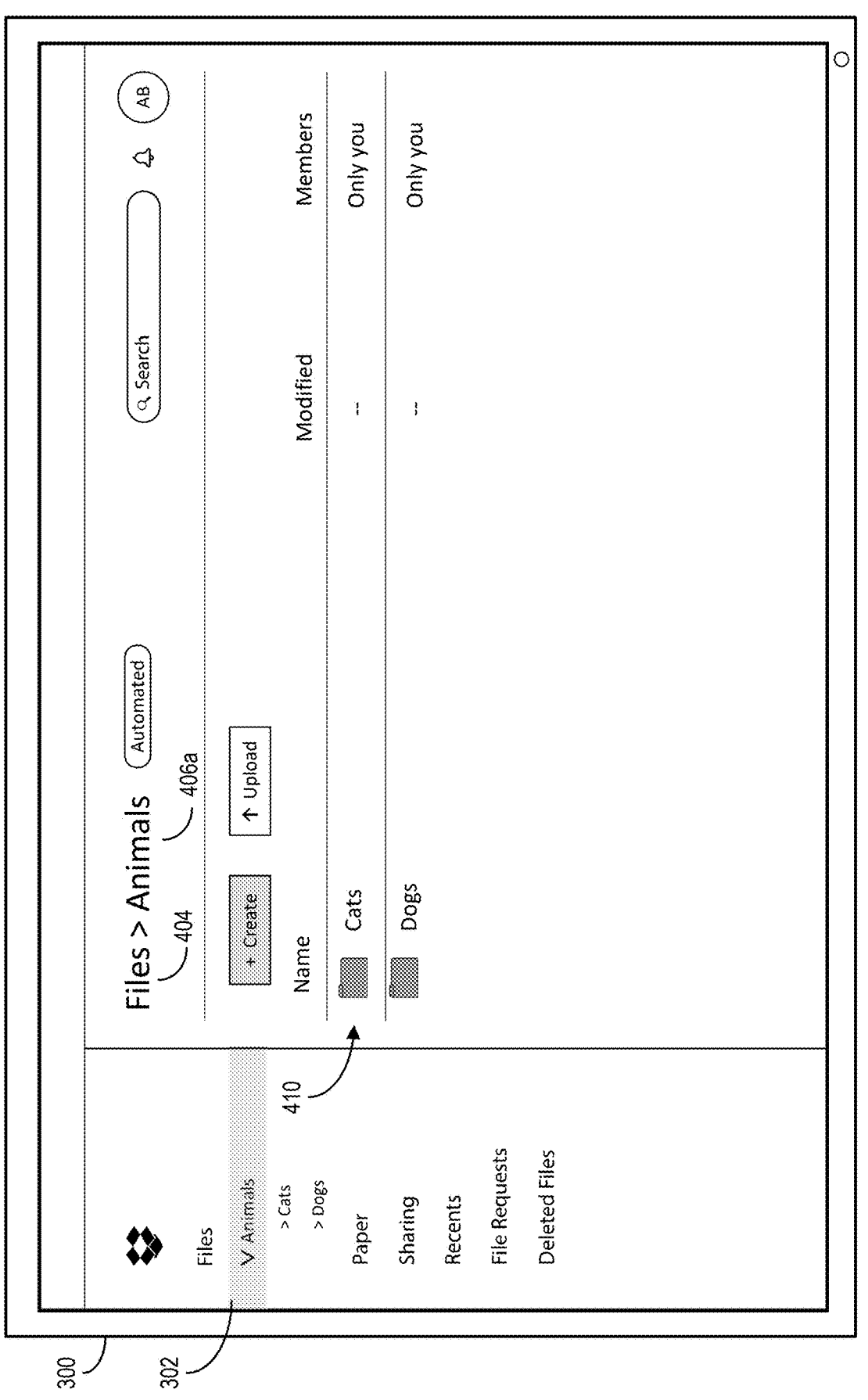

To further illustrate, FIG. 4B displays the GUI 302 showing two subfolders 410 within the now automated existing folder 406a (as indicated by the "Automated" graphic at the top of the GUI 302). In various implementations, upon converting the existing folder 406 to an automated existing folder 406a, the classification system 106 generates a new, customized classification model (i.e., an existing folder content item classification model) based on the subfolders 410 and their contents. For instance, the classification system 106 determines a set of classifications (i.e., classification labels) for the classification model, in part, from the subfolders 410 and the contents of the subfolders. In this manner, in these implementations, the classification system 106 utilizes user-based classifications to generate and tune a classification model based on existing content in the file structure 404. Furthermore, the classification system 106 can convert the subfolders 410 into destination folders to align with the classification labels. As used herein, the terms "user-based classifications" and "user-based classification labels" refer to classifications based on existing content items and/or existing folders in a file structure. For example, in some implementations, the classification system 106 generating user-based classification labels from subfolder names or concepts in a file structure. Additional detail regarding generating a classification model based on existing content is provided below with respect to FIGS. 6A and 8.

Figure 4C:
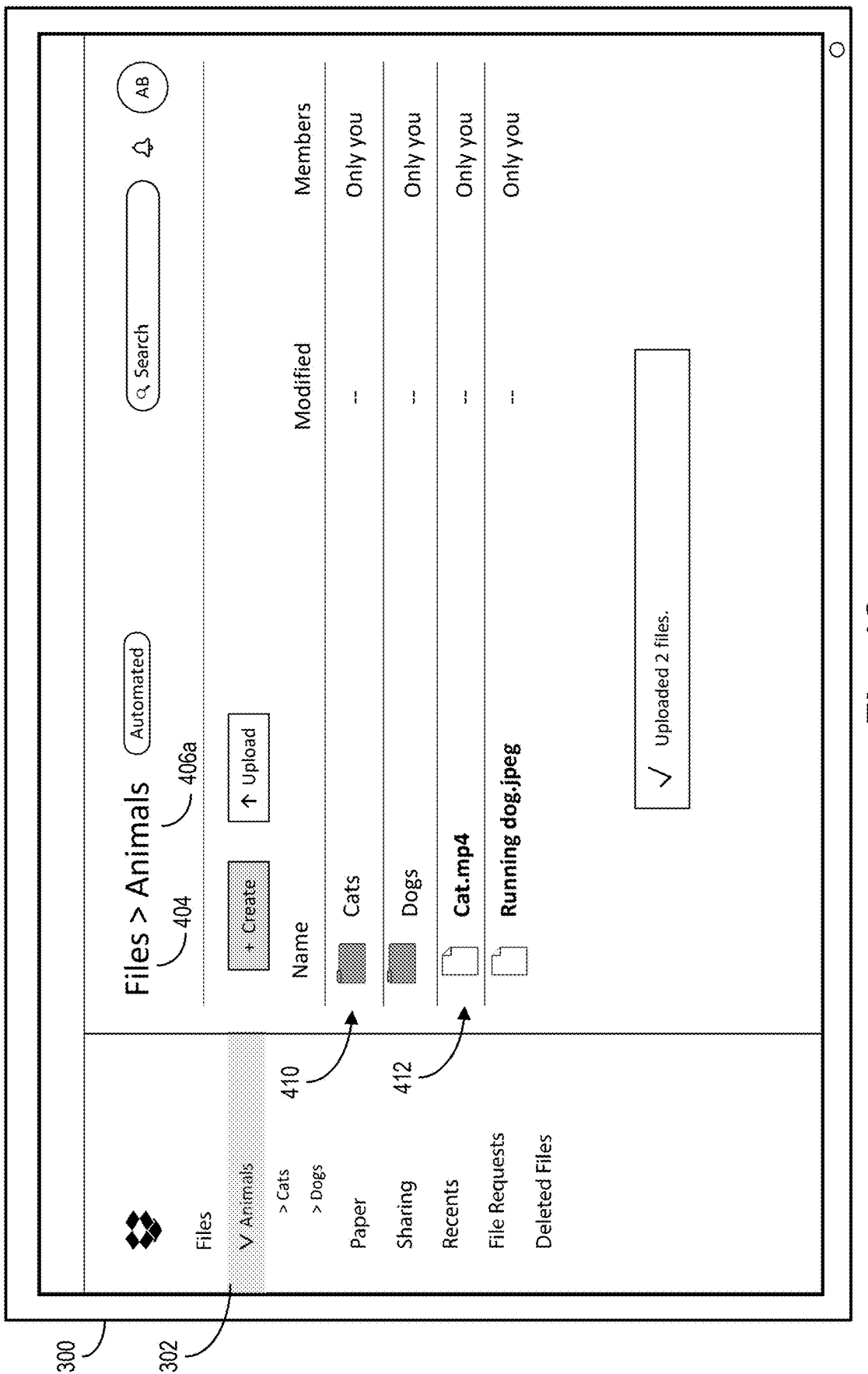

Once the classification system 106 converts the automated existing folder 406a into a smart folder and generates a customized classification model, the classification system 106 can automatically organize incoming content items. For example, the automated existing folder 406a becomes a smart folder that detects incoming content items. To illustrate, FIG. 4C shows two new content items 412 being added to the automated existing folder 406a (i.e., "Cats.mp4" and "Running dog.jpg").

In response to detecting the new content items 412 being added to the automated existing folder 406a (e.g., a source folder), in one or more implementations, the classification system 106 classifies and organizes the new content items 412. For example, the classification system 106 classifies each of the new content items 412 to one of the subfolders 410 of the automated existing folder 406a. Indeed, the classification system 106 utilizes the customized classification model to match the new content items 412 to existing content items within the subfolders 410.

Figure 4D:
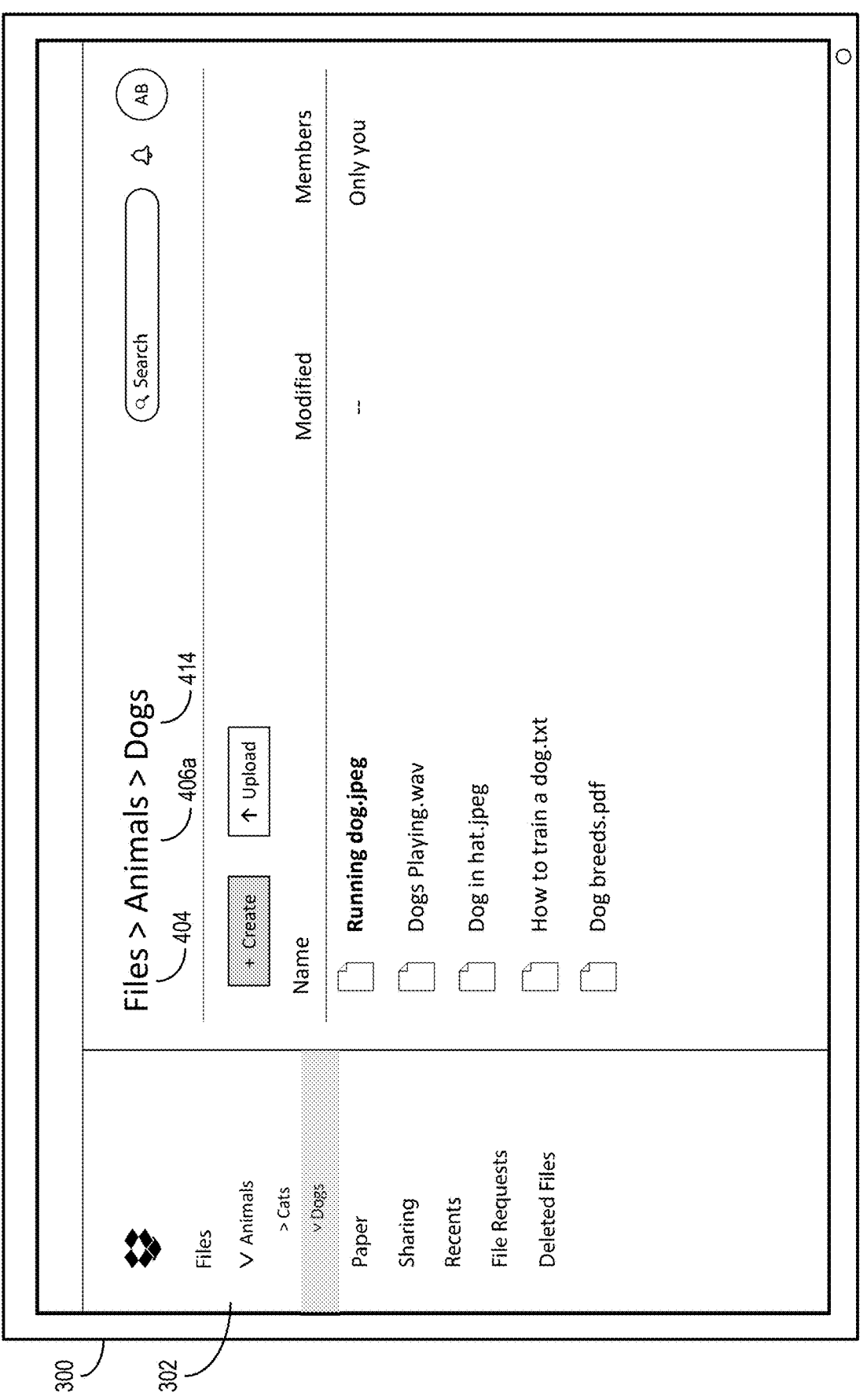

To illustrate, FIG. 4D shows that one of the content items (i.e., "Running dog.jpg") has been classified and moved to the dog destination folder 414 and is included along with other content items that were previously included in the destination folder. Indeed, due to a high correlation between the existing content items in the dog destination folder 414 and the newly added content item named "Running dog.jpg," the classification system 106 classifies the newly added content item as "dog" and automatically moved it to the dog destination folder 414. In this manner, the classification system 106 capitalizes on the organization of established the file structure 404 such that new content items are automatically relocated and organized within the file structure 404 established by a user.

In some implementations, the classification system 106 determines that an incoming content item does not correlate (e.g., does not correlate to a sufficient degree) to any of the subfolders within the automated existing folder 406a. In these implementations, the classification system 106 can sort these content items into an "Other" folder, as described above. In some implementations, the classification system 106 leaves a newly detected content item in the source folder where the content item was imported. In some implementations, the classification system 106 prompts the user for input regarding how the content item should be classified and to where it should be moved.

In example implementations, the classification system 106 can provide notifications to the user when a content item is moved. For example, in various implementations, when the classification system 106 relocates a content item to a destination folder, the classification system 106 can provide a notification to the user indicating the move. In some implementations, the notification is a popup window. In various implementations, the notification is added to an activity log. In this manner, the classification system 106 enables the user to track how the classification system 106 is organizing the user's content items.

Figure 5A:
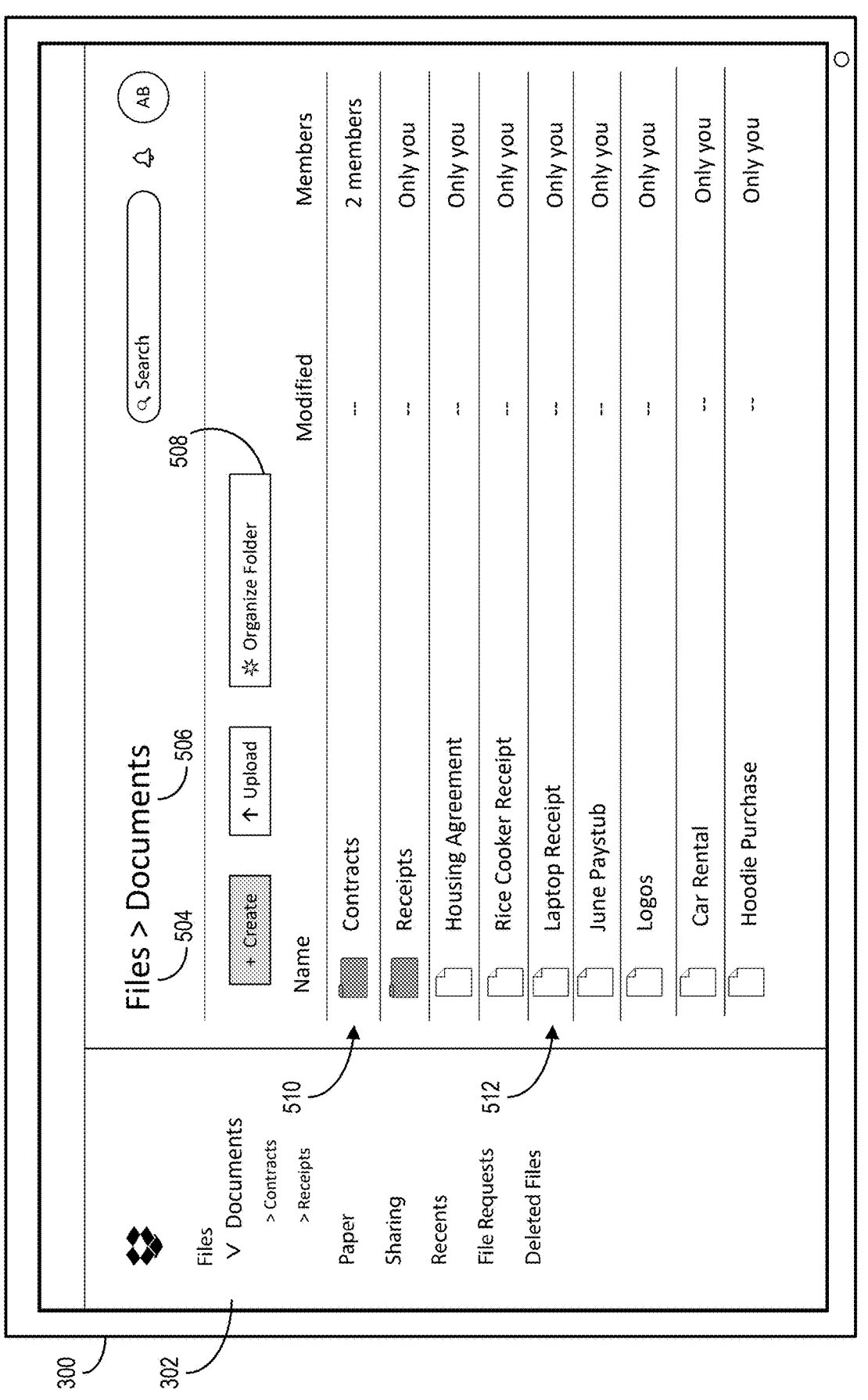
FIGS. 5A-5G illustrate utilizing an interactive user interface to organize content items into existing folders in a file structure based on content item classifications in accordance with one or more embodiments.

FIGS. 5A-5G illustrate organizing existing content items into existing folders in a file structure based on content item classifications in accordance with one or more embodiments. In particular, FIG. 5A shows the GUI 302 of the client device 300 having a file structure 504, which includes an existing folder 506 (e.g., "documents"). As also shown, the existing folder 506 includes existing subfolders 510 as well as existing content items 512. In various implementations, the file structure 504 and/or existing folder 506 can include any number of folders and/or existing content items.

As shown, the GUI 302 in FIG. 5A includes an organize folder element 508 in connection with displaying the existing folder 506. In one or more implementations, the classification system 106 provides the organize folder element 508 to facilitate intelligently organizing the existing folder 506. In some implementations, the organize folder element 508 is provided as an option within a folder menu. For example, the classification system 106 provides a folder menu that, when selected, expands to show the folder automation element (described in FIG. 4A above), the organize folder element 508, and/or other folder options for the existing folder 506. In various implementations, the classification system 106 provides access to the organize folder element 508 in other locations.

Upon detecting a selection of the organize folder element 508 (or receiving a selection indication), the classification system 106 can initiate organizing the content items 512 in the existing folder 506 into the subfolders 510. In various implementations, the existing folder 506 becomes a source folder and the subfolders 510 becomes potential destination folders for the content items 512. In some implementations, upon detecting a selection of the organize folder element 508, the classification system 106 first provides additional automated folder organization options, as further provided below in connection with FIG. 5G.

As part of organizing the existing folder 506 (e.g., a source folder), the classification system 106 can classify the subfolders 510 and the content items 512. For example, in various implementations, the classification system 106 utilizes a trained classification model to determine classifications for the content items 512 along with confidence values for the classifications (or simply "confidence values"). Similarly, the classification system 106 can utilize the trained classification model to classify the subfolders 510 along with confidence values.

Additionally, the classification system 106 can determine move suggestions (i.e., content item move suggestions) based on the content item and subfolder classifications and their confidence values. To briefly illustrate, the classification system 106 can determine one or more classification labels associated with the destination folders based on classifying the subfolders 510. Further, the classification system 106 generates move suggestions based on correlating the classifications for one or more content items to the classification labels associated with the destination folders (e.g., move Content Item A to Destination Folder B based on both items being associated with Classification Label C). Additional details regarding classifying subfolders, content items, and correlating their respective classifications to generate move suggestions are provided below in connection with FIG. 6D.

Figure 5B:
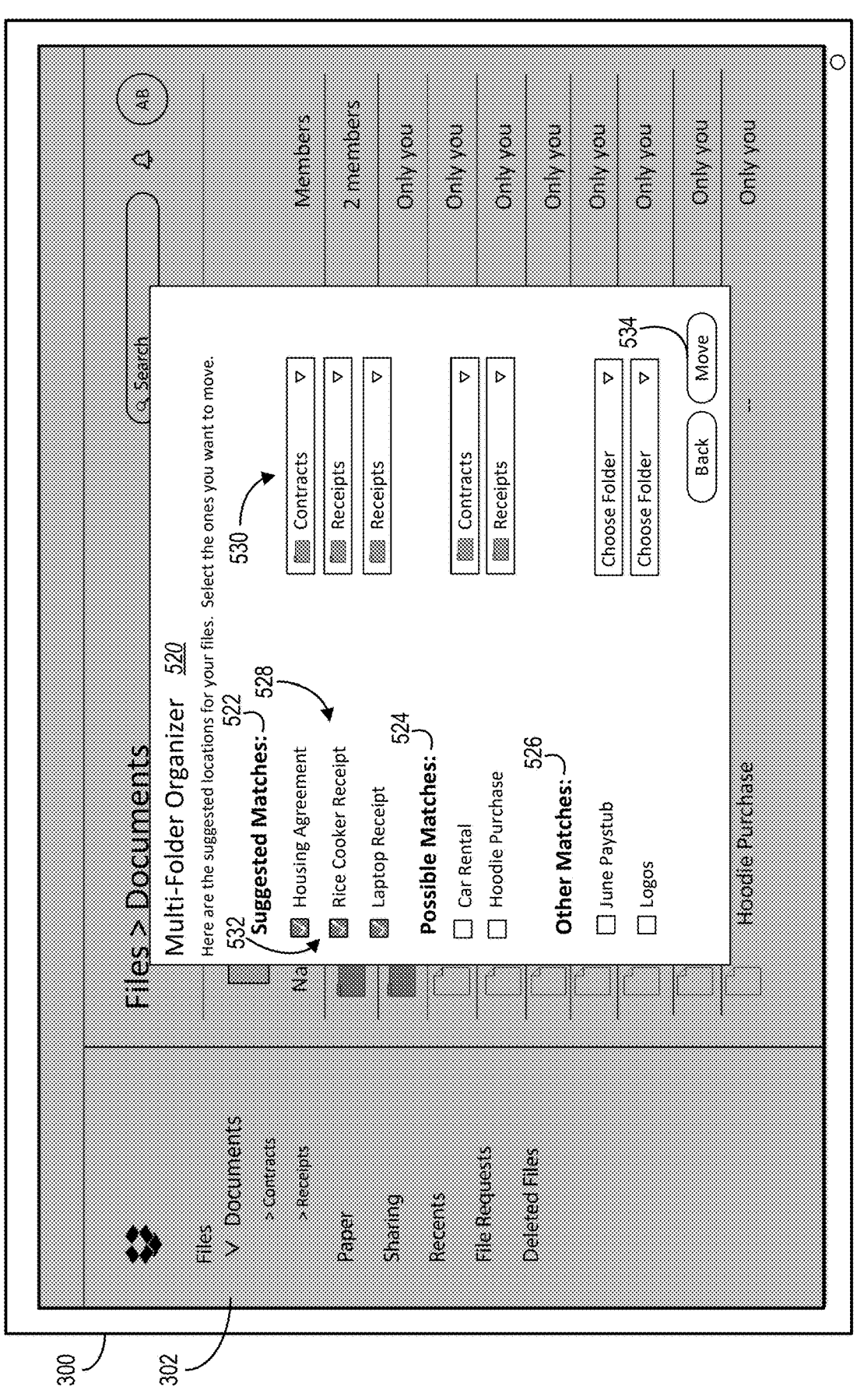

In some implementations, the classification system 106 categorizes move suggestions based on confidence values of the content items to their assigned classification, as shown in FIG. 5B. To illustrate, FIG. 5B shows the classification system 106 providing an interactive interface 520 for organizing the existing folder 506 (e.g., organizing content items from a source folder to destination folders). In various implementations, the classification system 106 provides the interactive interface 520 (i.e., "Multi-Folder Organizer") in response to detecting selection of the existing folder 506 and after classifying the subfolders 510 and the content items 512 to generate content item move suggestions, as described above. As described below, in many implementations, the classification system 106 populates various options, elements, and fields within the interactive interface 520 to enable efficient navigation and minimal interaction by a user while also providing the user with full control over where content items are moved, stored, and organized.

As also shown, the interactive interface 520 includes various move suggestion sections. For example, the interactive interface 520 includes a first match section (i.e., the "suggested match section" 522), a second match section (i.e., the "possible match section" 524, and a third match section (i.e., the "other match section" 526. In some implementations, the different move suggestion sections correspond to different types of moving suggestions initially provided by the classification system 106. In addition, the interactive interface 520 includes a confirmation element 534 along with other graphical elements and components, which are not labeled for simplicity.

As noted above, the move suggestion sections (e.g., move suggestion types) can correspond to the confidence values and/or quality of a move suggestion. For example, the classification system 106 assigns a content item having a confidence value above a first matching threshold (e.g., upper matching threshold) to the suggested match section 522, where the confidence value corresponds to a classification matching that of a destination folder. As another example, the classification system 106 assigns a content item having a confidence value above a second matching threshold (e.g., a lower or minimum matching threshold) and below the first matching threshold to the possible match section 524. As an additional example, the classification system 106 assigns remaining content items and/or content items having confidence values that do not satisfy the second matching threshold (e.g., the minimum matching threshold) to the other match section 526. Indeed, in example implementations, the suggested match section 522 corresponds to content items that have high confidence values, the possible match section 524 corresponds to content items that have medium confidence values, and the other match section 526 corresponds to content items that have low confidence values.

In various implementations, the classification system 106 determines the first and second matching thresholds (e.g., upper and lower matching thresholds) in connection with generating the classification model and applies them for multiple users of the content management system. In some implementations, the classification system 106 provides user preferences set to allow users to set or influence the matching thresholds. In certain implementations, the classification system 106 modifies the moving thresholds based on user action (e.g., how active the is the user within the existing folder 506) and/or folder contents (e.g., the ratio of content items to destination folders).

In various implementations, the interactive interface 520 omits one or more of the move suggestion sections. For example, if the classification system 106 determines that none of the content items meets a minimum destination folder matching threshold, the classification system 106 provides only the other match section 526 within the interactive interface 520. In some implementations, the classification system 106 provides the suggested match section 522 while also including, but minimizing, the possible match section 524 and/or the other match section 526. In alternative implementations, the classification system 106 provides only the suggested match section 522 for all content items in the existing folder 506 regardless of their confidence values. In some implementations, the interactive interface 520 includes additional move suggestion sections, such as a section suggesting new destination folders not present in the file structure 504 (e.g., file system) or destination folders located outside of the existing folder 506.

As shown in the interactive interface 520, each of the move suggestion sections includes content items 528, selectable options 530 (e.g., drop-down menus), and selectable elements 532 (called out only in one or the move suggestion sections for simplicity). In various implementations, the drop-down menu to the right of a content item indicates a suggested destination folder for the content item and the checkbox to the left of the content item indicates whether the classification system 106 is to move the content item to the suggested destination folder upon the user confirming the interactive interface 520 (e.g., selecting the confirmation element 534).

In one or more implementations, the term "selectable option" refers to a graphical component, field, or element associated with a content item that includes a menu, list, form, hierarchical structure, or set of destination folders from which a destination folder can be selected. In some instances, the classification system 106 sets or prepopulates the destination folder for a selectable option of a content item. For instance, the classification system 106 sets the selectable option for a content item based on a default value, a null or blank value, or a destination folder based on a move suggestion identified for the content item. In various instances, a user interacts with a selectable option to select a destination folder. Further examples of selectable options and their functions are provided below.

Similarly, in various implementations, the term "selectable element" refers to a graphical element, component, or field that visually indicates a selection or non-selection of a corresponding component. For instance, in one or more implementations, a selectable element can be associated, connected, and/or linked to a selectable option of a content item where the selectable element indicates an activation state of the selectable option. For example, a selectable element is a check box, radio button, menu option, or another element that indicates by its state whether a corresponding selectable option is active or inactive. In many implementations, the selectable element provides a binary indicator (e.g., checked or unchecked, Option A or Option B, State 1 or State 2, or Selection 1 or Selection 2); however, in some implementations, the selectable element includes additional selectable states (e.g., State 1, State 2, or State 3). In various implementations, the classification system 106 initially sets the value of a selectable element based on move suggestion identified for the content item, which a user can modify via interacting with the selectable option. Further examples of selectable elements and their functions are provided below.

As mentioned previously, the classification system 106 can set a selectable option and a selectable element for a content item based on several factors, such as a move suggestion identified for the content item and/or the corresponding classification confidence value. To illustrate, in one or more implementations, for content items 528 in the suggested match section 522 (e.g., content items having confidence values that satisfy both the lower and upper matching thresholds), the classification system 106 sets initial values for both the selectable options 530 and the selectable elements 532. For instance, if a move suggestion for a content item indicates a destination folder for the content item, the classification system 106 automatically sets the initial value for the selectable option of the content item to the destination folder. Further, based on a content item having a confidence value that satisfies the upper matching threshold, the classification system 106 can automatically set the initial value of the selectable element to true (e.g., check the checkbox) for the content item.

In some implementations, the classification system 106 automatically sets the initial value for the selectable option of a content item to the destination folder but does not automatically set the initial value of the selectable element to true for the content item. For example, in these implementations, the classification system 106 sets the initial value for the selectable option of a content item to the destination folder based on the content item having a confidence value that satisfies the lower matching threshold, but the classification system 106 does not set (or causes to be marked as false (e.g., unchecked) the selectable element based on the content item having a confidence value that does not satisfy the upper matching threshold.

To illustrate, the content items 528 in the possible match section 524 follow the above pattern, where the selectable options 530 (e.g., dropdown menus) indicate destination folders for corresponding content items, while the selectable elements 532 (e.g., checkboxes) are not automatically selected. Indeed, in these implementations, based on the confidence value of a content item indicating a moderate correlation between the content item and the destination folder, the classification system 106 can positively recommend moving a content item to a suggested destination folder for a content item. However, because the content item is not strongly correlated to the disclosed systems, the classification system 106 sets the selectable element to unchecked such that a user can quickly check the selectable element in the suggested destination folder is correct.

Moreover, in some implementations, the classification system 106 does not set the initial values (or sets to default negative values) for the selectable option and the selectable element of a content item. For example, FIG. 5B shows the other match section 526 having neither the selectable options 530 nor the selectable elements 532 selected when the interactive interface 520 is first provided to a client device for display. In some implementations, such as shown in the other match section 526, the content items 528 have confidence values that do not satisfy either the upper or the lower matching thresholds. Accordingly, in these implementations, the classification system 106 does not provide a suggested destination folder for the content item nor does the classification system 106 select the checkbox to activate the suggested destination folder.

As shown, the selectable options 530 for the content items 528 in the other match section 526 are initially set to "Choose Folder." For instance, in various implementations, when the classification system 106 does not determine a classification for a content item having a strong or moderate correlation to a destination folder (e.g., the content item is deemed unclassified or the content item is classified but no correlating destination folder exists in the existing folder 506), the classification system 106 can provide an option for a user to select a destination folder for a content item. As further described below in connection with FIG. 5C, the user can select a destination folder for the content item or choose to skip organizing the content item into a destination folder for the moment.

As mentioned above, in many implementations, the classification system 106 provides the interactive interface 520 for display on the client device 300 with one or more of the selectable options 530 and/or selectable elements 532 selected for the content items 528. In various implementations, the classification system 106 facilitates user interaction with the interactive interface 520. For example, the classification system 106 enables a user to modify, change, select, deselect, etc. one or more of the selectable options 530 and/or selectable elements 532 initially set by the classification system 106.

As mentioned above, the interactive interface 520 includes the confirmation element 534. In various implementations, upon detecting selection of the confirmation element 534, the classification system 106 can close the interactive interface 520 and move each content item having its selectable element (e.g., checkbox) selected from the existing folder 506 (e.g., the source folder) to the destination folder suggested in the selectable option (as chosen by the classification system 106 or the user). Further, the classification system 106 can leave content items with their selectable elements unselected in the existing folder 506.

Figure 5C:
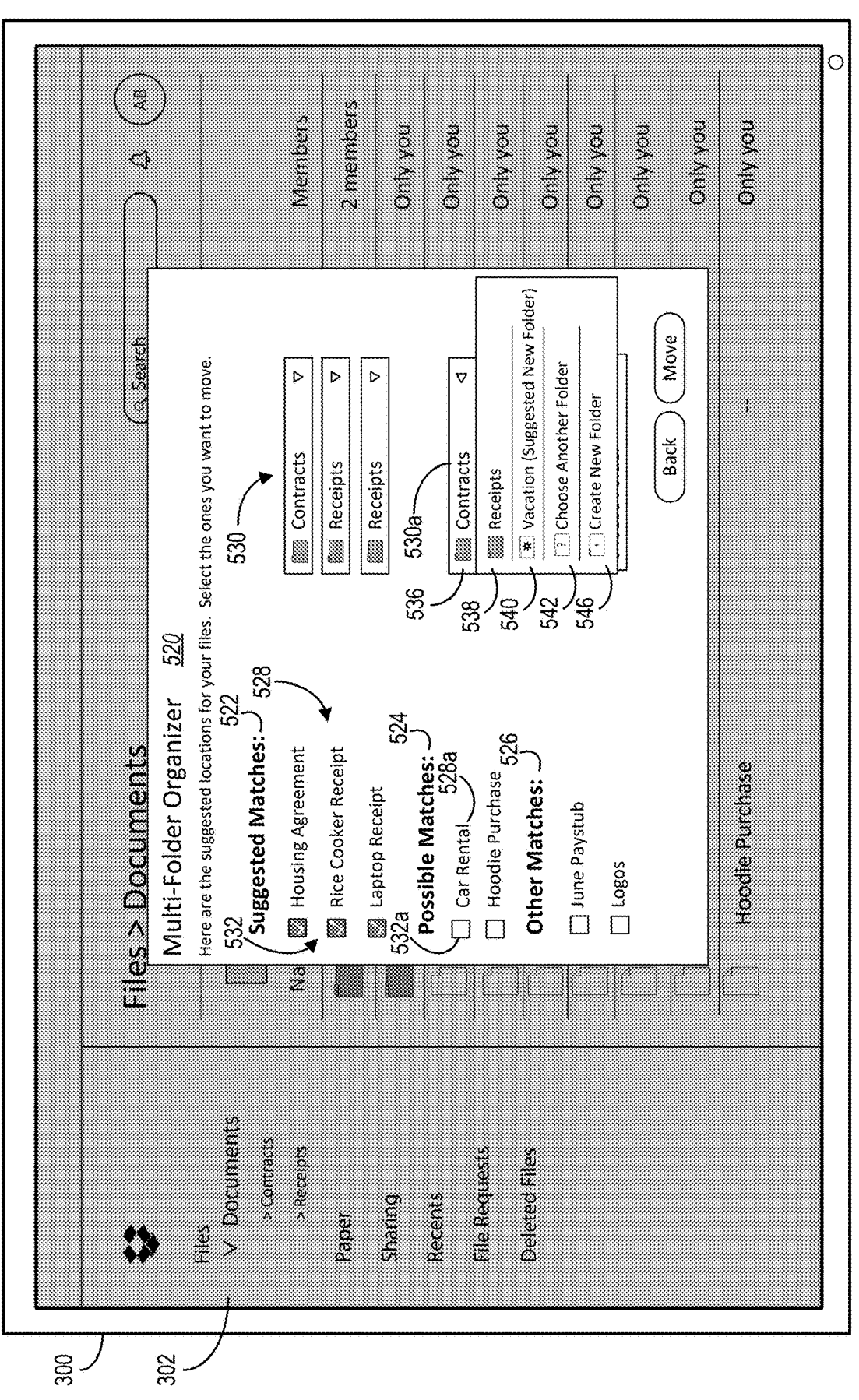

As just mentioned above, in various implementations, the classification system 106 facilitates user interaction via the interactive interface 520. To further illustrate, FIG. 5C shows various interactive features that the classification system 106 provides via the interactive interface 520. In particular, while the interactive interface 520 includes the content items 528 having corresponding selectable options 530 and selectable elements 532, as described above, FIG. 5C calls attention to a target content item 528a along with a target selectable option 530a and a target selectable element 532a that correspond to the target content item 528a.

As shown, the classification system 106 provides a suggested destination folder of "Contracts" (i.e., a first destination folder 536 within the target selectable option 530a) for the target content item 528a named "Car Rental." Additionally, in some implementations, because the classification system 106 determines a medium or moderate confidence value for the target content item 528a, the classification system 106 can cause the checkbox for the content item (i.e., the target selectable element 532a) to be unselected. As described above, this action corresponds to the classification system 106 placing the target content item 528a in the possible match section 524.

In some implementations, a user desires to change the initially suggested destination folder in the target selectable option 530a. For example, upon detecting the selection of the 530a, the classification system 106 expands the target selectable option 530a to show additional selectable choices, such as both the first destination folder 536 and a second destination folder 538 (i.e., Receipts) as well as other available folders. For instance, in one or more implementations, the classification system 106 provides a list of the destination folders in the existing folder 506. In various implementations, the classification system 106 provides a list of the subfolders 510 on the existing folder 506, including those subfolders that were not made into destination folders.

When showing a list of destination folders or subfolders, the classification system 106 can order the folders each of the selectable options 530 similarly (e.g., alphabetically, by folder activity, by folder size, etc.) to maintain consistency for a user navigating across multiple dropdown menus. In alternative implementations, the classification system 106 sorts the list of destination folders based on confidence values corresponding to each destination folder. For example, the classification system 106 first lists the destination folder having the largest correlation to the content item followed by the destination folder having the next largest correlation to the content item, etc. In this manner, the list of destination folders for each selectable option may differ. In some implementations, the classification system 106 utilizes a hybrid approach where the classification system 106 first lists the top two, three, etc., correlated destination folders followed by the static list of destination folders and/or subfolders. In this manner, the classification system 106 can suggest the next most-likely destination folder while also maintaining consistency within a selectable option.

In some implementations, the list of destination folders includes nested folders. In some implementations, the classification system 106 shows the nested folders in a hierarchical tree structure. In various implementations, the classification system 106 lists the nested folder along with the top-level destination folder from the existing folder 506 (e.g., a source folder).

In various implementations, the classification system 106 provides an option within the target selectable option 530a to create a new destination folder 540. For example, in one or more implementations, the classification system 106 classifies one or more content items within the existing folder 506 for a given classification. However, there is no subfolder in the existing folder 506 that corresponds to the given classification. In some implementations, the classification system 106 may suggest creating a new destination folder 540 for the target content item 528a. For instance, if the target content item 528a is an image of a car rented on vacation, the classification system 106 may suggest creating a new destination folder called "Vacation," as shown.

In some implementations, the classification system 106 provides an option within the target selectable option 530a to choose another folder 542. For instance, the classification system 106 can allow a user to select other folders located outside of the existing folder 506. In one or more implementations, the classification system 106 provides an option within the target selectable option 530a to create a new folder 546.

Figure 5D:
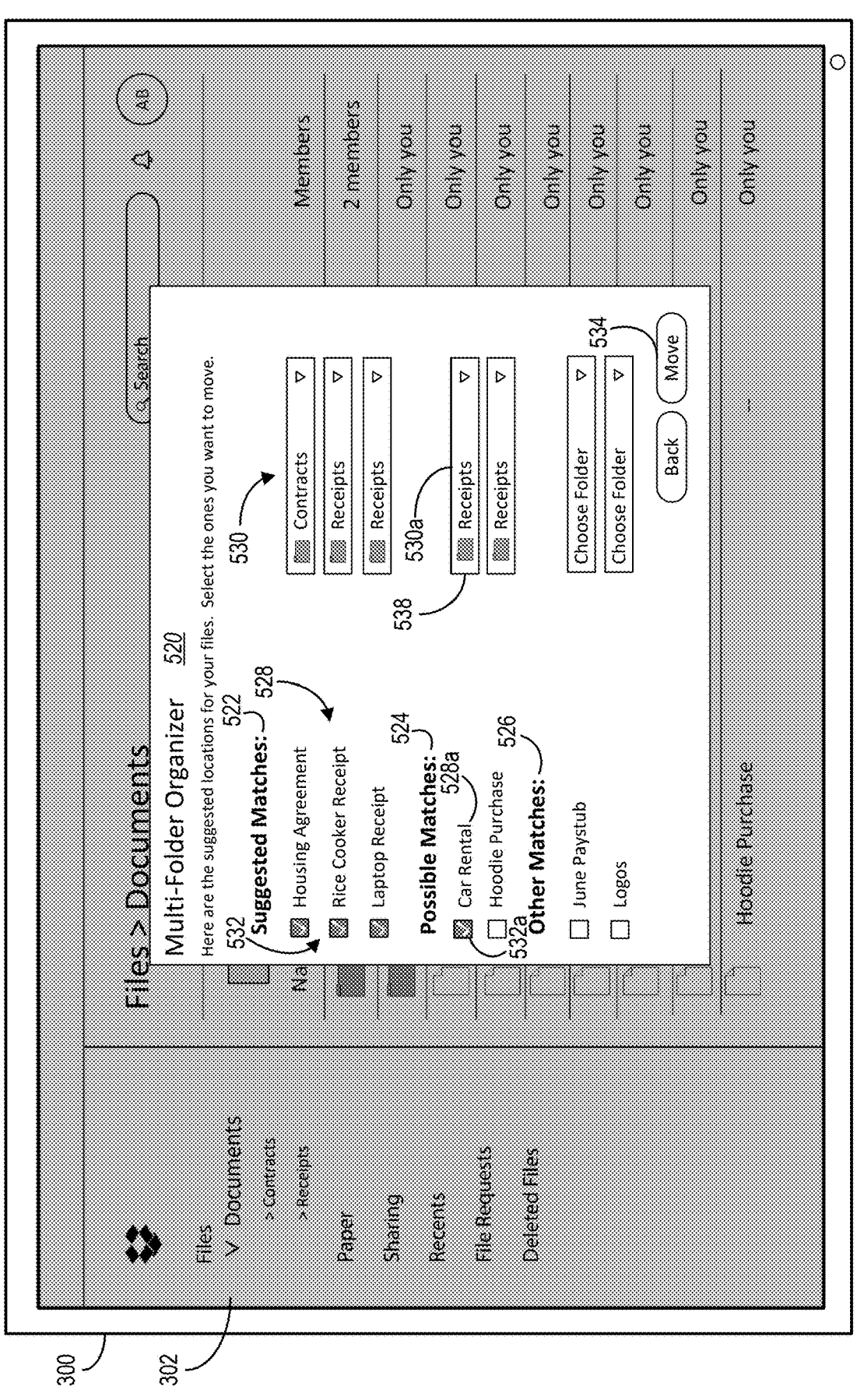

The classification system 106 can detect one of the options selected by a user from the target selectable option 530a. For example, if the target content item 528a/is a receipt rather than a contract, the user may select the second destination folder 538 as the new destination folder. In response, the classification system 106 can update the target selectable option 530a to move the target content item 528a accordingly. To illustrate, FIG. 5D shows the classification system 106 updating the interactive interface 520 to show the second destination folder 538 (i.e., "Receipts") selected for the 528a.

In some implementations, the classification system 106 may also perform additional actions based on detecting a user selection. For example, in connection with updating the interactive interface 520 to indicate moving the target content item 528a to the new destination folder 540, the classification system 106 can also cause the target selectable element 532a to be selected (e.g., checked), as shown. Indeed, based on detecting a user interaction selecting a destination folder for a content item, the classification system 106 can selectively and automatically activate the content item to be moved to the selected destination folder upon selection of the confirmation element 534.

To illustrate, upon detecting selection of the confirmation element 534, the classification system 106 can automatically move each of the activated content items (e.g., content items with their selectable elements selected) to their corresponding destination folder. Indeed, by providing the interactive interface and having the confirmation element 534 to confirm the interactive interface 520, the classification system 106 works as an efficient tool for automatically folder organizing while still providing full control to the user over where content items are moved.

In one or more implementations, the interactive interface 520 can include additional graphical elements to provide context to a user. For example, for each content item to which the classification system 106 applies a move suggestion, the classification system 106 can provide a corresponding information element, such as a selectable circled "i" adjacent to its selectable element preselected by the classification system 106. In various implementations, the information element displays what factors most influenced a move suggestion for the content item (e.g., A popup that says the move suggestion for a content item was based on detecting matching file names, file types, file content, keywords, etc.). As noted below, the classification model may provide this information as an output when classifying a content item.

Figure 5E:
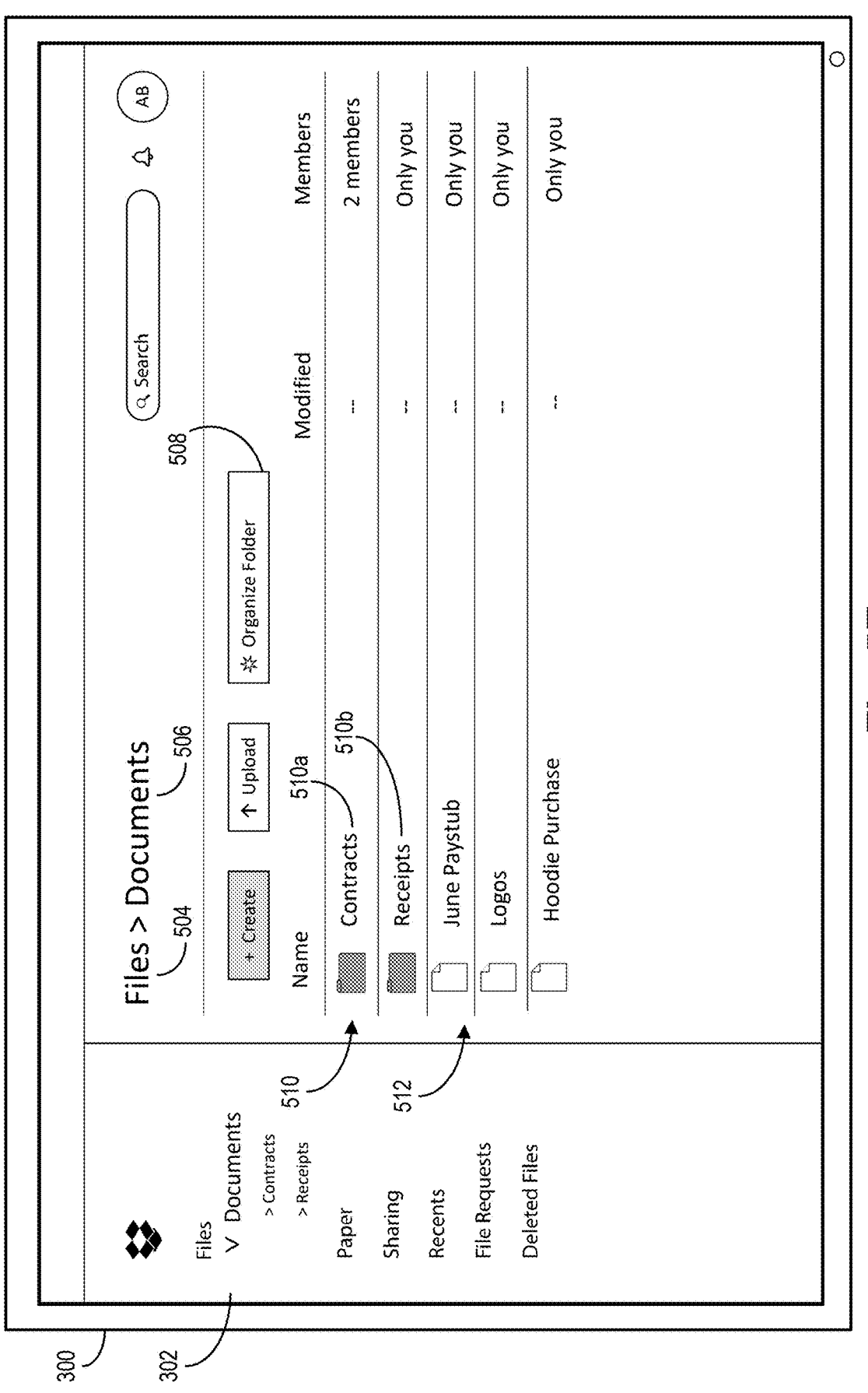

FIG. 5E shows the GUI 302 on the client device 300 after the classification system 106 performs the content item moves upon confirmation of the selections in the interactive interface 520 shown in FIG. 5D. For example, while the existing folder 506 within file structure 504 still includes the subfolders 510 (e.g., destination folders), the classification system 106 has automatically moved many of the content items 512 to destination folders. For example, the classification system 106 has moved the four content items selected in FIG. 5D to either the first destination folder 510a (e.g., "Contracts") or the second destination folder 510b (e.g., "Receipts").

In various implementations, the classification system 106 detects an additional user interaction selecting the organize folder element 508. In these implementations, the classification system 106 can repeat the process of automatically organizing the remaining content items (and any newly added unorganized content item) in the existing folder 506 utilizing the classification model, as previously described. Additionally, or in the alternative, the classification system 106 can detect and apply other folder automations, such as converting the existing folder 506 (e.g., source folder) to another type of automated folder, as described above.

While FIGS. 5A-5E correspond to organizing an existing folder, in some implementations, the classification system 106 expands to additional folders. For example, in one or more implementations, the classification system 106 organizes multiple selected folders in the file structure corresponding to a user account of the content management system. As another example, the classification system 106 can organize all folders within the file structure (e.g., organize all content for the user account). In example implementations, the classification system 106 expands to folders and file structures to outside the content management system, such as an external content management system, messaging system (e.g., an email system), or another content item management system that is connected to the content management system (e.g., via an API).

Figure 5F:
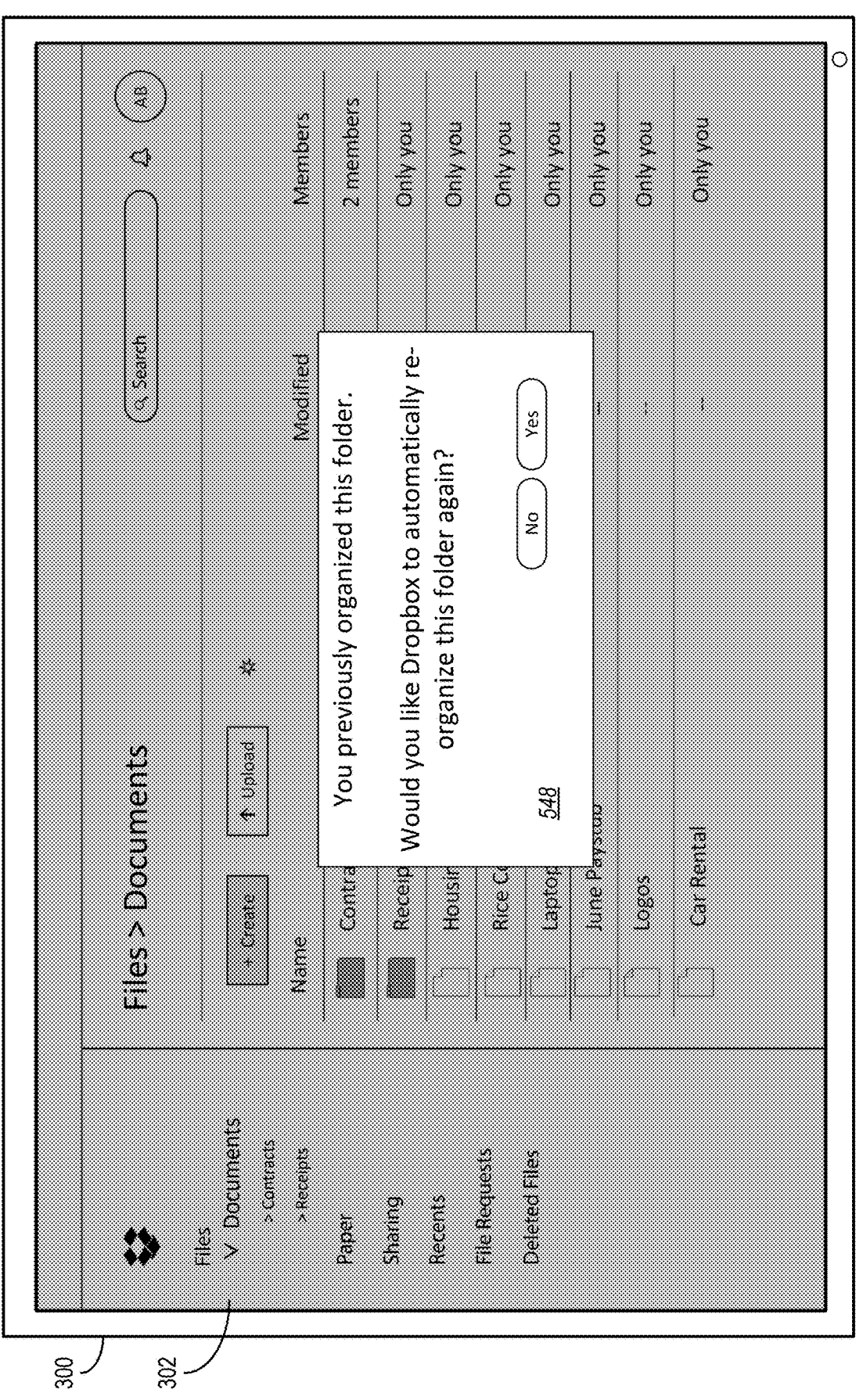

As mentioned above, in some implementations, the classification system 106 detects a user interaction requesting the classification system 106 re-organize an existing folder. In some implementations, the classification system 106 can display a prompt to again automatically organize an existing folder, if desired. To illustrate, FIG. 5F shows the classification system 106 provided a reminder prompt 548 to re-organize the existing folder 506. In one or more implementations, the classification system 106 provides a prompt similar to the reminder prompt 548 for a folder that has not yet been organized. For example, when the classification system 106 detects a large number of content items within a folder having multiple subfolders, the classification system 106 displays a prompt to automatically organize the folder. In this manner, the classification system 106 actively detects and prompts to organize folders that would benefit from automatically organization.

In some implementations, the reminder prompt 548 is triggered after an elapsed time (e.g., two weeks, three months, a year). In one or more implementations, the reminder prompt 548 is triggered when new content items and/or subfolders are added to the existing folder 506. For instance, after the classification system 106 detects at least ten new content items being added to the existing folder 506, the classification system 106 provides the reminder prompt 548.

Figure 5G:
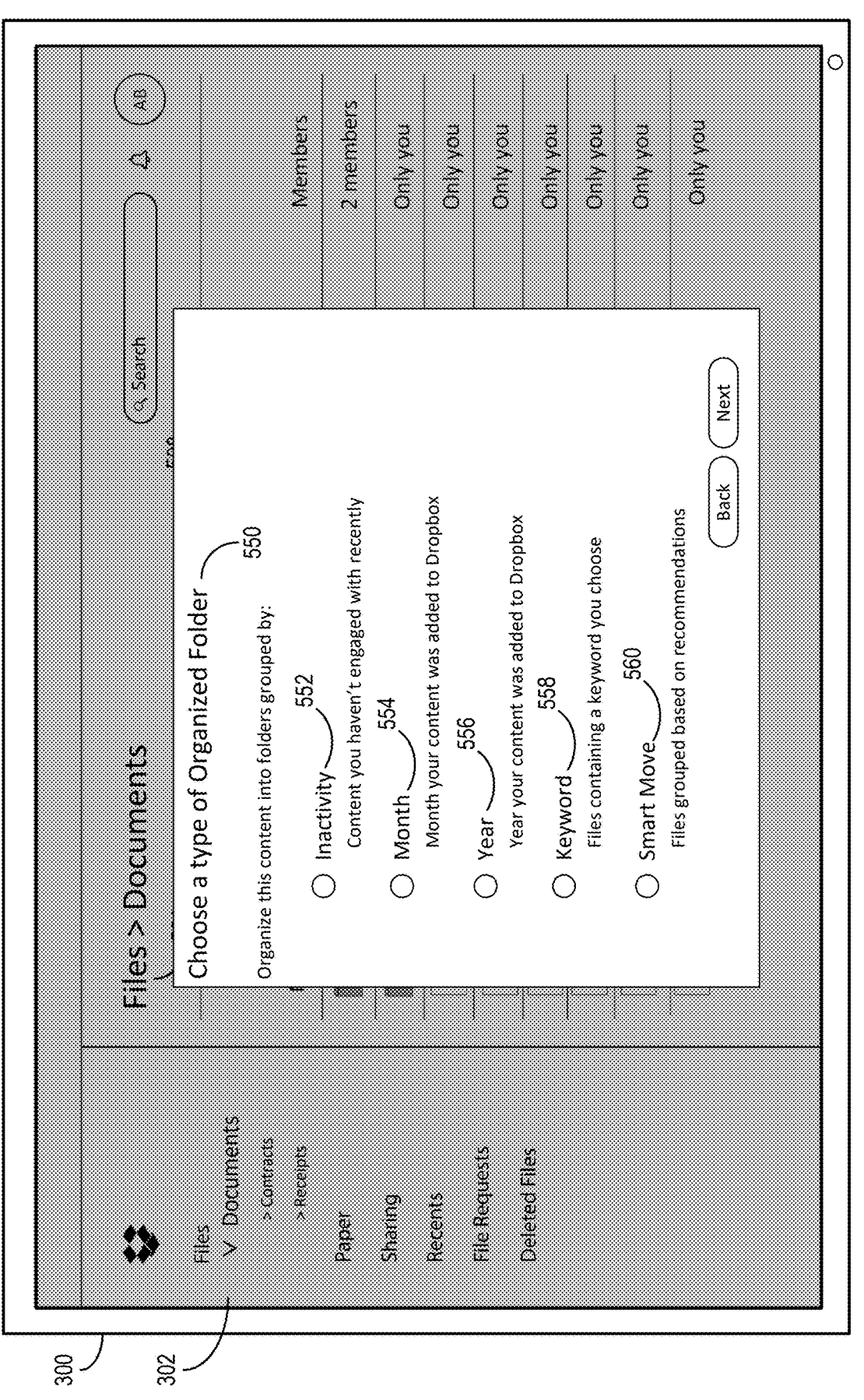

In various implementations, the classification system 106 provides additional organization features for automatically organizing a folder. For example, upon detecting the selection of the organize folder element 508, the classification system 106 provides various approaches to organize the folder. To illustrate, FIG. 5G shows a folder organization feature interface 550. As shown, in FIG. 5G, the folder organization feature interface 550 includes an option to organize content items within the existing folder 506 by inactivity 552. For instance, in one or more implementations, the classification system 106 identifies content items within the existing folder 506 that are inactive based on an inactivity metric (e.g., time since last opened, viewed, shared, modified, or accessed) and an inactivity time (e.g., 30 days, 6 months, 1 year, etc.). In various implementations, the classification system 106 groups, moves, archives, removes, or otherwise organizes the inactive content items in response to detecting a selection request to organized by inactivity 552.

In one or more implementations, the folder organization feature interface 550 includes options to organize content items within the existing folder 506 by set time intervals, such as by month 554 or year 556. For instance, the classification system 106 identifies content items in the existing folder 506 that meet a time metric (e.g., date added, first accessed, last accessed, modified, or found in the name and/or content of the content item) corresponding to a month 554 or year 556. To illustrate, upon detecting a selection of the option to organize by month 554, the classification system 106 can automatically group and organize the content items by month. For example, the classification system 106 moves content items into existing and/or newly generated subfolders corresponding to the months in a year. In some implementations, the classification system 106 provides a further option to exclude selected time intervals, such as the current month (or the current year when organizing by year).

As also shown, the folder organization feature interface 550 includes an option to organize content items within the existing folder 506 by keyword 558. For example, in one or more implementations, the classification system 106 identifies, groups, and/or moves content items that correspond to a keyword, such as a user-provided keyword or a keyword provided by another system. For instance, upon detecting the selection to organize the existing folder 506 by keyword, the classification system 106 further prompts the user to provide one or more keywords. In some instances, the classification system 106 also prompts the user to select a destination folder. In other instances, the classification system 106 classifies the keyword within the classification model to suggest a destination folder. Then, the classification system 106 can move each content item that correlates to the keyword to the indicated destination folder.

Further, the folder organization feature interface 550 includes an option to organize content items within the existing folder 506 based on move suggestions 560 provided by the classification system 106. Various implementations of the classification system 106 organizing based on move suggestions 560 are described above, such as in connection with FIGS. 5A-5G. Additionally, the classification system 106 can include additional organizational options for automatically organizing content items in the folder organization feature interface 550 or enable the selection of a combination of organizational options (e.g., organize content items by year and month).

In various implementations, the classification system 106 provides a folder automation interface that enables a user to select one or more source folders and/or one or more destination folders. For example, the classification system 106 enables a user to select multiple source folders in a file structure that each detects incoming content items as well as a set of destination folders where the incoming content items should be moved. In some implementations, the destination folders are not subfolders within the one or more of the source folders but located elsewhere in the file structure. For instance, a destination folder can be a folder in the same directory as a source folder. In another instance, a destination folder is located on a separate computing device (e.g., another client device or a network storage device).

Figure 6A:
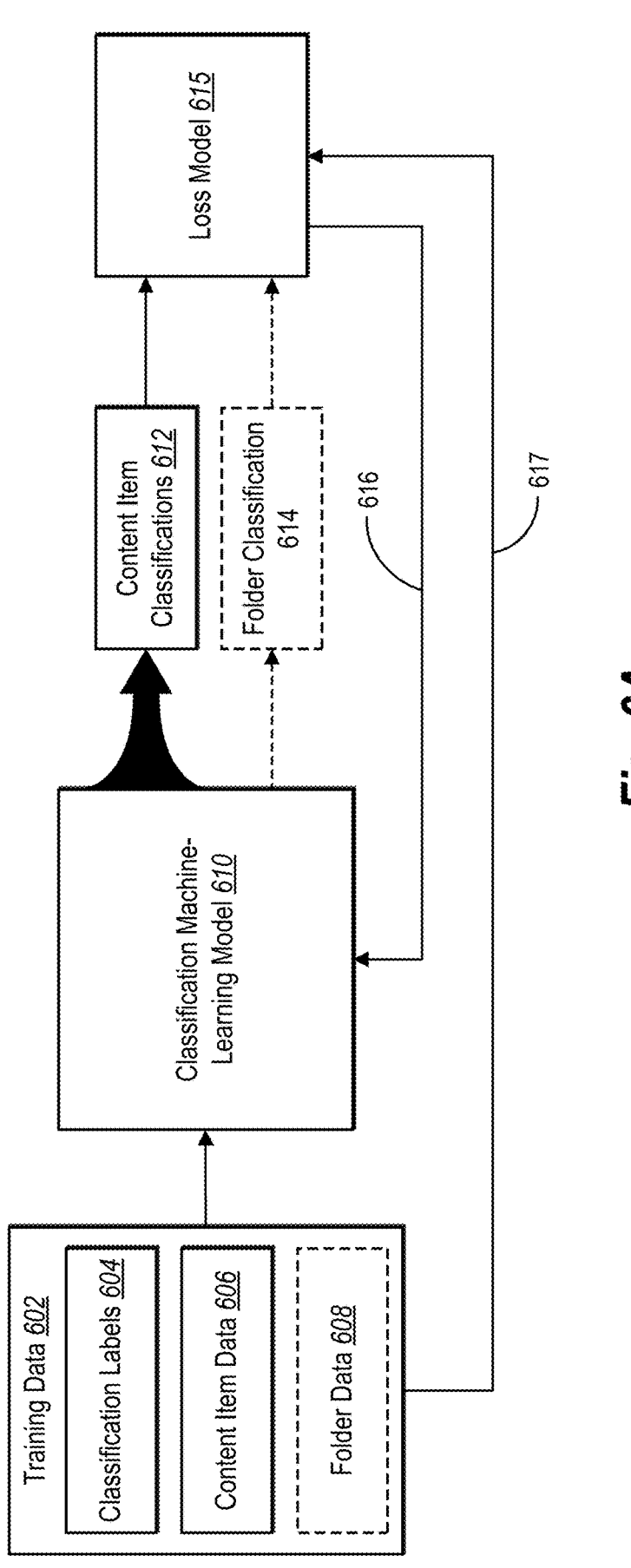
FIGS. 6A-6D illustrate generating and utilizing a content item classification model to classify content items in accordance with one or more embodiments.
Figure 6B:
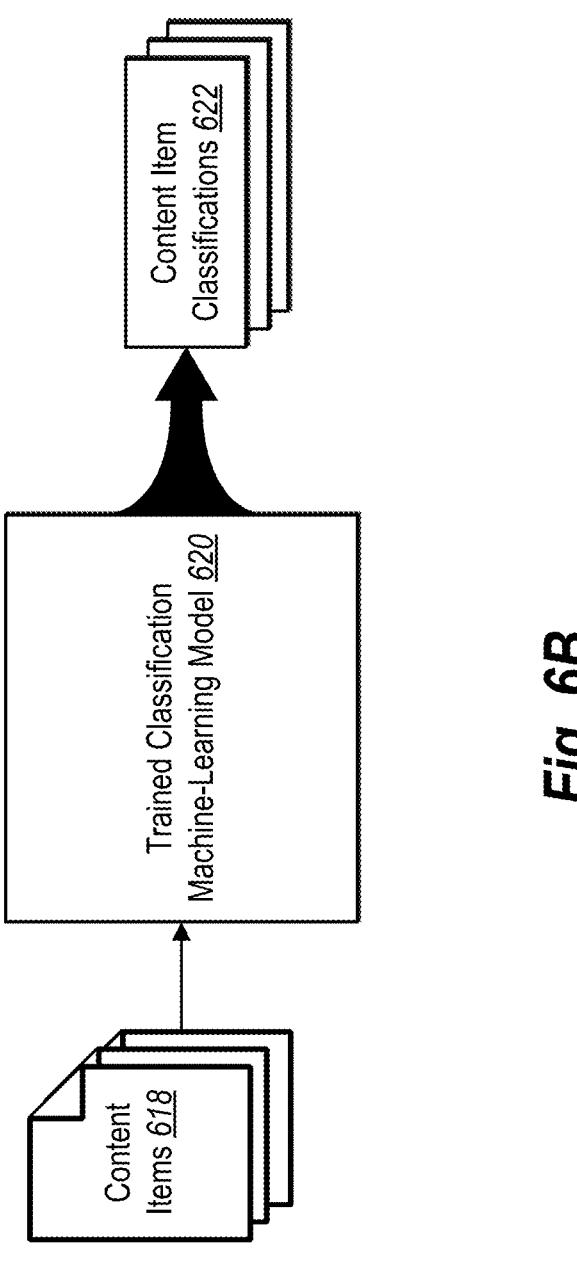
Figure 6C:
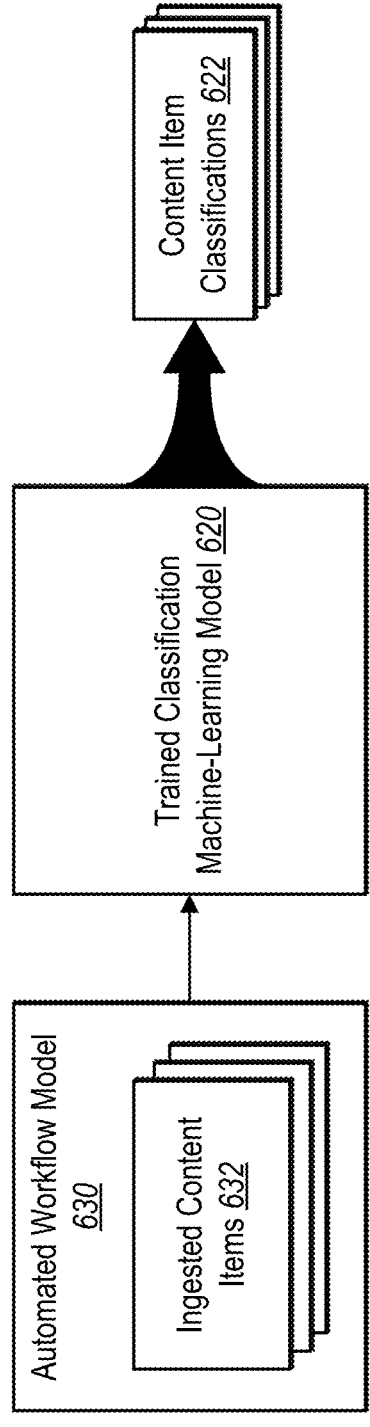
Figure 6D:
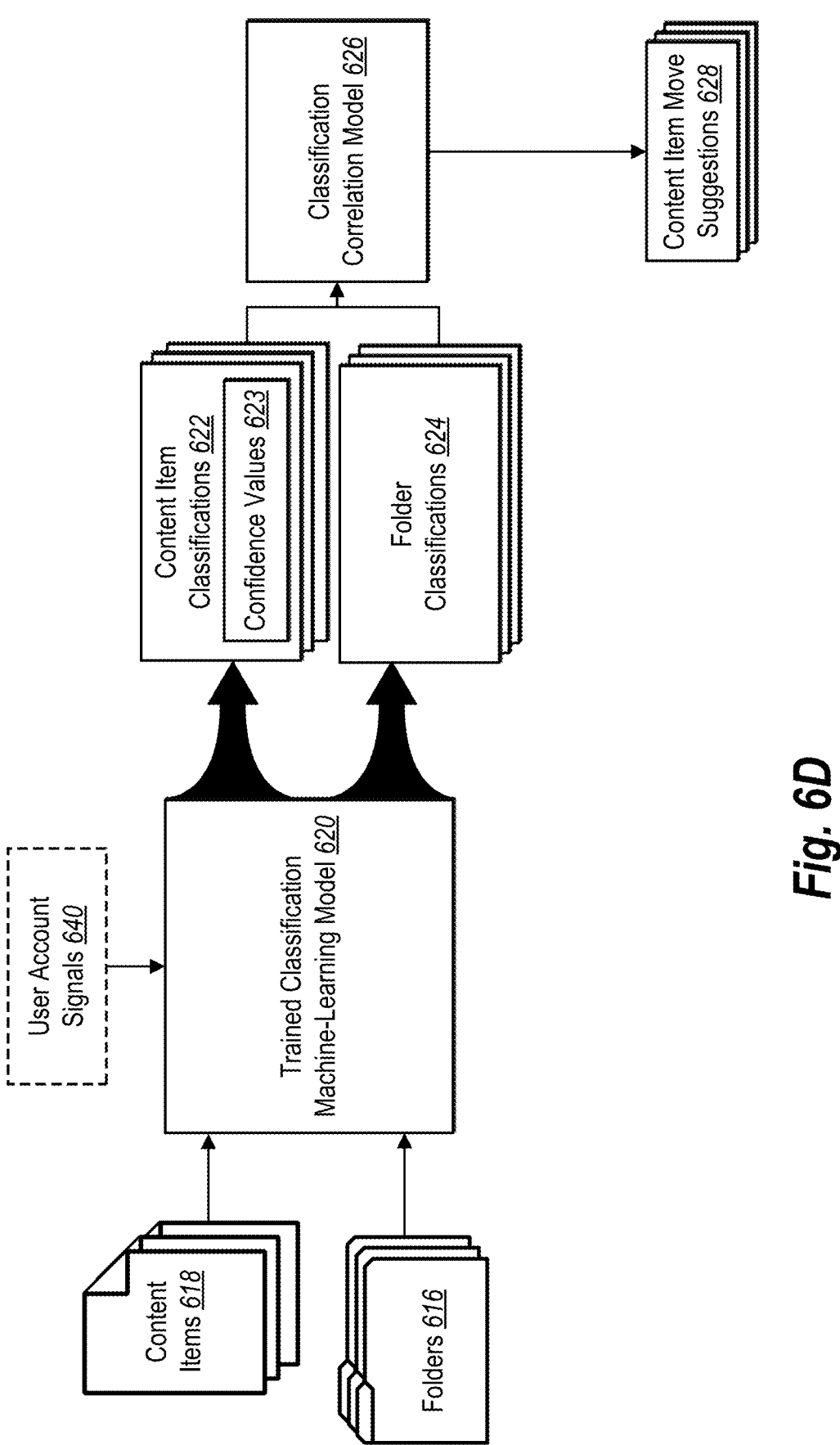

Training and Utilizing Content Item Classification Models of the Classification System Turning now to FIGS. 6A-6D, additional detail is provided with respect to classification models. In particular, FIGS. 6A-6D illustrate generating and utilizing content item classification models to classify content items in accordance with one or more embodiments. To illustrate, FIG. 6A corresponds to training and tuning classification models to classify content items. FIG. 6B corresponds to utilizing trained classification models to determine content item classifications for content items. FIG. 6C corresponds to classifying content items ingested from different sources. FIG. 6D corresponds to utilizing trained classification models to determine folder and content item classifications as well as determine correlations between the classifications to generate move suggestions.

As shown, FIG. 6A includes training data 602, a classification machine-learning model 610, content item classifications 612, and a loss model 615. In addition, the training data 602 includes classification labels 604 (i.e., content item classification labels) and content item data 606. In addition, in some implementations, the training data 602 optionally includes folder data 608 and the classification machine-learning model can optionally generate folder classifications 614. Further, as described above, content item data 606 for a content item can include a content item name (e.g., filename), dates (e.g., creation, modifications, access), author, content item type, size, creation source, file path, and/or tags as well as the content within a content item.

In some implementations, the classification labels 604 are system-based and/or user-based. For example, the classification system 106 determines a finite set of classifications (e.g., a list of classes) based on analyzing content items within a general dataset and/or based on data from several users. In various example, the classification labels 604 are user-generated. For instance, the classification system 106 determines the set of classifications based on existing destination folders in a file structure. Generating both of these types of classifications is further described below with FIG. 8.

In some implementations, the classification labels 604 are group-based. For example, the classification system 106 determines a set of classifications based on organized folders from across one or more groups of user accounts of a content management system. In some implementations, the classification system 106 determines a set of classifications or classification labels 604 from folder names, including naming themes and/or naming topics, of identified organized folders. Generating group-based training data including classification labels 604, content item data 606, and folder data 608 is further described below with FIG. 7.

In various implementations, the classification machine-learning model 610 is a pre-trained machine-learning model, such as a pre-trained transformer machine-learning model. For example, in various implementations, the classification machine-learning model 610 includes an encoder and a decoder similar to a convolutional neural network but uses attention mechanisms in place of recurrent components to facilitate improved parallelization (e.g., compared to CNNs and RNNs). In some implementations, the classification machine-learning model 610 is another type of machine-learning model and/or neural network, such as an NLP neural network or a deep neural network.

In one or more implementations, the classification machine-learning model 610 utilizes an encoder to encode features of a content item from the content item data 606 into content item feature vectors and a decoder to determine a classification based on the encoded content item feature vectors (e.g., using a SoftMax classification or sigmoid function). In addition, the decoder can provide the confidence value for the classification of each content item. In these and other implementations, the classification system 106 re-trains and/or tunes the classification machine-learning model 610 based on the classification labels 604 such that the classification machine-learning model 610 determines content item classifications 612 (or simply "classifications 612") corresponding to the classification labels 604.

To illustrate, in one or more implementations, the classification system 106 provides content item data 606 from one or more content items to the classification machine-learning model 610, which outputs classifications 612 for the content items. The classification system 106 then utilizes the loss model 615 to compare the classifications 612 to classification labels 604 corresponding to the same content items (and corresponding content item data 606). In this manner, the classification labels 604 serve as ground truths for training and tuning the classification machine-learning model 610.

Based on the comparisons at the loss model 615, the classification system 106 determines an error prediction amount of classification loss, which is backpropagated to the classification machine-learning model 610 as error feedback 617 for tuning weights and parameters of the model.

In a similar manner, in various implementations, the classification system 106 encodes features of the folder data 608 into folder feature vectors and decodes the folder feature vectors to determine folder classifications 614. In some implementations, the classification system 106 trains one classification model for content items and a second classification model for folders. In one or more implementations, the classification system 106 trains one classification model that classifies both content items and folders (with shared or separate learned vector spaces). In many implementations, the learned classifications (e.g., classification labels 604) are the same for content items and folders, which allows the classification system 106 to later compare and correlate content items to folders.

As mentioned above, the classification machine-learning model 610 can generate the content item classifications 612 from the content item data 606. For instance, the classification system 106 provides content item data 606 such as a file name, file path, tags, and/or file contents to the classification machine-learning model 610 for classification. For example, in one or more implementations, the classification system 106 first converts a content item in a text-readable structure and provides the text-readable content and/or raw-text (e.g., without layout information) as content item data 606 to the classification machine-learning model 610 for prediction processing. In some implementations, the classification system 106 provides additional or other types of content item data 606 to the classification machine-learning model 610, such as layout data, visual information, tags, or the source (e.g., application, website, email address, phone number, electronic address, physical address, and/or system) that created a content item.

In a similar manner, the classification machine-learning model 610 can generate the folder classifications 614 from the folder data 608. As a simplified example, the classification system 106 provides a folder name to the classification machine-learning model 610 and, in response, the classification machine-learning model 610 learns to determine one or more classifications for the folder. In addition, the classification system 106 can provide content item features from content items stored within a folder to the classification machine-learning model 610 to determine one or more classifications to associate with the folder.

In certain implementations, the classification system 106 also utilizes user feedback to further train and improve the classification machine-learning model 610. For example, a user provides feedback either explicitly or implicitly (e.g., when a user moves a content item to another destination folder), which is further described below in connection with FIGS. 9 & 10. In response, the classification system 106 utilizes the feedback to further tune and refine the classification machine-learning model 610 to improve classification accuracy.

Once trained, the classification system 106 can utilize the classification model to classify content items and/or folders. For example, FIG. 6B shows the classification system 106 determining content item classifications 622 (or simply "classifications 622") for content items 618 utilizing a trained classification machine-learning model 620. In various implementations, the trained classification machine-learning model 620 is a trained (or re-trained) transformer machine-learning model or another type of machine-learning model described above.

In various implementations, the classification system 106 utilizes the trained classification machine-learning model 620 upon detecting the addition of a content item to a smart folder (e.g., an automated folder or smart folder), as described above. For example, for each of the content items 618 added to a smart folder, the classification system 106 classifies the content item utilizing the trained classification machine-learning model 620.

To illustrate, in some implementations, the classification system 106 utilizes a content item from a newly added content item as an input signal to classify the content item via the trained classification model (i.e., the trained classification machine-learning model 620). For example, the classification model determines classifications 622 for content items 618 based on their file name, file contents (e.g., text and/or images), layout, font styles (e.g., font family, font size, bolded, italics, capitalizations), and/or other content item data (e.g., often the same content item data used to train the classification model). Indeed, because receipts often follow one family of layout styles while resumes follow another family of layout styles, the trained classification machine-learning model 620 can learn based on these visual features.

As another example, the classification system 106 determines a content item classification for a content item based on user activity with the content item, such as access patterns. For instance, if the classification system 106 determines that an unclassified content item is accessed near the same time as other content items having a given classification, the classification system 106 can determine that the unclassified content item has the same or a related classification. To illustrate, the classification system 106 can classify a content item opened with other receipts as a receipt (or at least move heavily weight the receipt classification).

In some implementations, the classification system 106 determines a classification score between a content item and each of the classification labels. In example implementations, the scores for all the classifications sum to 1 (or another value) (e.g., a sigmoid function). In alternative implementations, each of the classifications is assigned a score between 0-1 (or another range of values) (e.g., a SoftMax classification function).

In one or more implementations, the classification system 106 classifies (e.g., assigns a classification label to) a content item based on the classification that receives the highest score. In certain implementations, the classification system 106 assigns multiple classifications to a content item (e.g., ranked by score), such as assigning a content item to each classification having a score above a minimum classification score threshold. Further, in various implementations, the classification system 106 can determine classifications and sub-classifications for a content item, as described below. As noted above, if none of the classifications satisfy a minimum classification score threshold, the classification system 106 may assign the content item as "unknown," "other," or prompt a user for the classification.

Upon classifying a content item, the classification system 106 can move the content item to a corresponding destination folder (e.g., a generated or existing destination folder) matching the classification, as detailed above. In some implementations, the classification system 106 can move a content item to multiple destination folders. For example, if the classification model classifies a content item to multiple classifications, the classification system 106 may move the content item to each destination folder that corresponds to one of the classifications 622. In some instances, the classification system 106 moves the content item to a first destination folder (e.g., the destination folder with the highest classification confidence) and placeholder versions of the content item to the other destination folders.

In some implementations, the classification system 106 performs one or more actions upon classifying a content item. For example, for content items classified to a particular content item classification, the classification system 106 moves the content item to the corresponding content item classification, as described above. In addition, the classification system 106 executes a workflow, such as sharing a copy of the content item with a recipient or system. For example, for content items classified as business receipts (or for all content items in a receipts folder), the classification system 106 uploads the receipts to a financial manager and/or a finance tracking system. In some implementations, the classification system 106 protects and/or redacts sensitive (e.g., personal, financial, confidential) information in content items before sending or providing access to the content items to other parties.

As mentioned above, the classification system 106 can move a classified content item to a destination folder. In some implementations, the classification system 106 moves a classified content item to a target destination folder nested within another destination folder. For example, the classification system 106 moves a content item classified as "receipts—july" to a destination folder of "July Receipts" that is located within another destination folder of "Receipts." In one or more implementations, the classification system 106 can tune the classification model to classify content items to destination folders regardless of their hierarchical position within the file structure 404. In various implementations, the classification system 106 considers file paths and hierarchical relationships when classifying content items. For example, for certain classifications, the classification system 106 further classifies the content item to determine one or more sub-classifications, which can correspond to destination subfolders.

In alternative implementations, the classification system 106 utilizes multiple classification models and/or an iterative process when classifying content items within a hierarchical file structure. For example, for a smart folder having multiple subfolders (e.g., child nodes), the classification system 106 classifies incoming content items using a first classification model tuned to the child node subfolders and moves the classified content items to corresponding child node subfolders. Then, for one or more of the subfolders having their own subfolders (e.g., grandchild nodes), the classification system 106 treats the subfolder (e.g., child node) as another smart folder by classing the newly added content items using a second classification model tuned to the grandchild node subfolders and moves the classified content items to corresponding grandchild node subfolders. In this manner, the classification system 106 applies a customized classification model at each level of the hierarchical file structure to more accurately organize the content items.

In several implementations, the classification system 106 detects a content item being added to a smart folder based on user input. For instance, the classification system 106 detects incoming content items based on a user moving or copying one or more files into a smart folder (e.g., an automated folder). In other implementations, the classification system 106 content items are added to a smart folder from automated processes. To illustrate, FIG. 6C shows an automated workflow model 630 providing ingested content items 632 to the trained classification machine-learning model 620 to generate content item classifications 622 for the ingested content items 632. In some implementations, the classification system 106 implements an automated workflow model 630. In alternative implementations, the automated workflow model 630 is implemented by a third-party system.

To elaborate, in one or more implementations, the automated workflow model 630 is an email workflow that automatically copies or otherwise moves attachments from incoming emails to a smart folder, which the classification system 106 then classifies and organizes, as described above. For example, an email ingestion application or model detects emails from particular recipients and/or having a particular subject. In response, the email ingestion application provides attachments from the emails from which the classification system 106 automatically organizes into destination folders, as detailed above. In some implementations, the email ingestion application also provides the content of the emails as additional content item data for the provided attachments.

As another example, a camera upload ingestion application or model provides captured images to a smart folder that is connected to particular destination folders. In these implementations, the classification system 106 moves the uploaded image to the particular destination folders based on detecting the images being added to the smart folder. For instance, in some implementations, the classification system 106 utilizes the classification model to match visual features within the uploaded image to learned classification labels and/or destination folders having similar content items. In some implementations, the classification system 106 scans an image from a camera upload to detect a document within the image, which the classification system 106 can also classify.

In some implementations, the automated workflow model 630 is a third-party application that automatically pushes content items into the file structure of the content management system. As with other examples, the classification system 106 can detect when these content items are added to a smart folder and accurately re-locate these content items to appropriate destination folders. In some implementations, knowing the third-party application that pushed a content item into the file structure can assist the trained classification machine-learning model 620 to correctly classify the content item. For example, the third-party application is a tax preparation application, which suggests a classification of "taxes."

In FIG. 6D, the classification system 106 utilizes a trained classification machine-learning model 620 to classify both content items and folders. Further, based on the classifications, the classification system 106 can determine content item move suggestions 628 (or simply "move suggestions 628"), which are introduced above. As shown, FIG. 6D includes folders 616, the content items 618, the trained classification machine-learning model 620, the content item classifications 622 having confidence values 623, folder classifications 624, a classification correlation model 626 (or simply "correlation model 626"), and move suggestions 628. Also, while FIG. 6D includes a single trained classification machine-learning model 620, in some implementations, the classification system 106 utilizes multiple trained classification models (e.g., separate classification models for the content item and folders), as provided above.

In one or more implementations, the trained classification machine-learning model 620 is the same or similar to the trained classification model described above in connection with FIGS. 6B & 6C. In alternative implementations, the classification system 106 trains the trained classification machine-learning model 620 differently (e.g., different number of inputs and/or outputs). For example, the trained classification machine-learning model 620 is trained from group-based training data, where names of the organized folders serve as classification labels and content items within the organized folders serve as the content item data.

In various implementations, the classification system 106 utilizes the trained classification machine-learning model 620 upon detecting a user request to organize a source folder (e.g., an existing folder or subfolder), as described above. For example, the classification system 106 can identify the content items 618 and the folders 616 in the source folder. Additionally, the classification system 106 utilizes the trained classification machine-learning model 620 to determine content item classifications 622 for the content items 618 and folder classifications 624 for the folders 616.

To illustrate, in some implementations, the classification system 106 utilizes content item data from the content items 618 to generate the content item classifications 622 utilizing the trained classification machine-learning model 620, as described above. In addition, for each of the content item classifications 622, the trained classification machine-learning model 620 can also provide a confidence value that an input content item correlates to the determined classification (e.g., the highest-ranked classification labels from the set of learned classification labels).

In addition, in one or more implementations, the classification system 106 utilizes folder data (e.g., the folder name) from the folders 616 to generate the folder classifications 624 utilizing the trained classification machine-learning model 620, in a similar manner as described above. Indeed, in some implementations, the classification system 106 classifies the folders 616 by determining confidence values (e.g., classification scores) for each folder with respect to each classification label (e.g., each of the classifications learned by the classification model). Additionally, the classification system 106 can select the classification label with the highest confidence value as the folder classification for the corresponding folder. Further, as described above, the classification system 106 can designate each folder with a folder classification as a destination folder in the source folder.

In various implementations, the classification system 106 can determine, assign, and/or associate multiple classification labels for a folder. For example, for each classification label having a score or confidence value above a minimum correlation threshold (e.g., within a threshold distance within classification vector space), the classification system 106 associates that classification label with the folder. For instance, a subfolder named "Photos & Videos" is associated with both content items of digital images and digital videos. In this manner, more generalized folders and/or folders corresponding to multiple classifications are associated with the classifications.

In some implementations, the classification system 106 ensures that a classification label is not assigned to multiple folders (e.g., subfolders) within the source folder. For example, the classification system 106 associates a first folder to a classification label based on the first folder having the highest confidence value for the classification label across all subfolders in the source folder. Accordingly, in these implementations, the classification system 106 verifies that no other folder has a higher confidence value for the same classification label. If so, the classification system 106 can assign the first folder to the classification label having the next highest confidence value (or no label if other classification labels have confidence value below a destination folder threshold). In this manner, the classification system 106 can reduce the possibility of suggesting that a content item be moved to multiple destination folders. In alternative implementations, the classification system 106 recommends moving a content item (e.g., copies of the content item or placeholder versions) to multiple destination folders if each destination folder satisfies a destination folder threshold.

In some implementations, the trained classification machine-learning model 620 does not determine a folder classification for a subfolder. For example, the subfolder has low confidence values for each of the learned classification labels and, thus, does not correlate to any of the known classification labels. For instance, the folder embedding for the folder is located beyond a maximum distance threshold to classification label embeddings in vector space. In these implementations, the classification system 106 does not assign and folder classification to the folder or assigns it with a classification of "unknown" or "unclassified." Further, in these implementations, the classification system 106 does not assign the folder as a destination folder within the source folder.

As shown, FIG. 6D includes the classification correlation model 626. In various implementations, the classification correlation model 626 determines correspondences between the content items 618 and the loss model 615 based on their classifications. To elaborate, the classification system 106 suggests moving content items to destination folders within a source folder (e.g., an existing folder). For each of the folders 616 that is assigned as a destination folder, the classification system 106 is able to suggest moving content items into it. Indeed, based on the folder classifications 624, the classification system 106 identifies which of the classification labels from the set of learned classification system 106 are available within the existing folder 506 for content item moves.

To illustrate, for each of the content items 618, the classification system 106 utilizes the classification correlation model 626 to determine whether a corresponding destination folder exists in the source folder (e.g., a subfolder having a matching classification). When a match is identified, the classification system 106 can pair or otherwise associate the content item with the folder. Further, the classification system 106 can generate a content item move suggestion that suggests moving the content item to the folder.

In some implementations, the classification system 106 does not determine a classification match for a content item with a folder. In these implementations, the classification system 106 can determine if the content item is similar to other folders. For example, the classification system 106 compares the distance in vector space between the embedded content item and the embedded folder to determine if the two are within a correlation threshold distance. If so, the classification system 106 can pair or otherwise associate the content item with the folder. Otherwise, the classification system 106 determines that no content item-folder pairing currently exists within the source folder.

As shown, the classification correlation model 626 generates the content item move suggestions 628. As noted above, a content item move suggestion (or simply "move suggestion") includes a content item and a folder (e.g., destination folder) to where the content item can be moved to organize the source folder. In some implementations, a move suggestion includes multiple folders ranked based on their classification correlation strength to the content item.

In this manner, the classification system 106 can utilize the move suggestion to suggest to a user how to organize a source folder, as described above.

Additionally, in various implementations, a move suggestion can also include the confidence values 623 for the content item. For example, the move suggestion indicates whether the confidence value of a content item to its classification is high, medium, or low. Then, as described above, the classification system 106 can determine how to recommend moving the content item to the folder included in the move suggestion (e.g., the move suggestion type and/or in which move suggestion section the content item should be placed). In some embodiments, a content item is automatically moved based on the confidence value meeting or exceeding a threshold.

In some implementations, the classification system 106 utilizes user account signals 640 to tailor the content item classifications 622 and/or the folder classifications 624 generated by the trained classification machine-learning model 620 to a user account. In some instances, the user account signals 640 include user preferences ranging from a preference for higher accuracy in move suggestions to a preference for a larger volume of move suggestions (but perhaps at a lower confidence or accuracy). For example, the user may set a preference indicating that the classification system 106 automatically performs move suggestions for content items with high confidence values, such that user confirmation of these content items is not needed.

Other user account signals 640 may include the number of content items compared to the number of folders (e.g., source folders) within a source folder, how active a user account has been in the past organizing content items (e.g., via the interactive interface or within the file structure itself), and/or how often a user account runs automatically content item organization. In this manner, by incorporating user account signals 640 at the time of inference (and learned in training), the classification system 106 can utilize a common trained classification model provided to a large number of user accounts while also tailoring the model to individual user accounts. Additionally, in some implementations, the user account signals 640 can correspond to a group of user accounts, such as users accounts within the same organization, workplace, team, or group.

Figure 7:
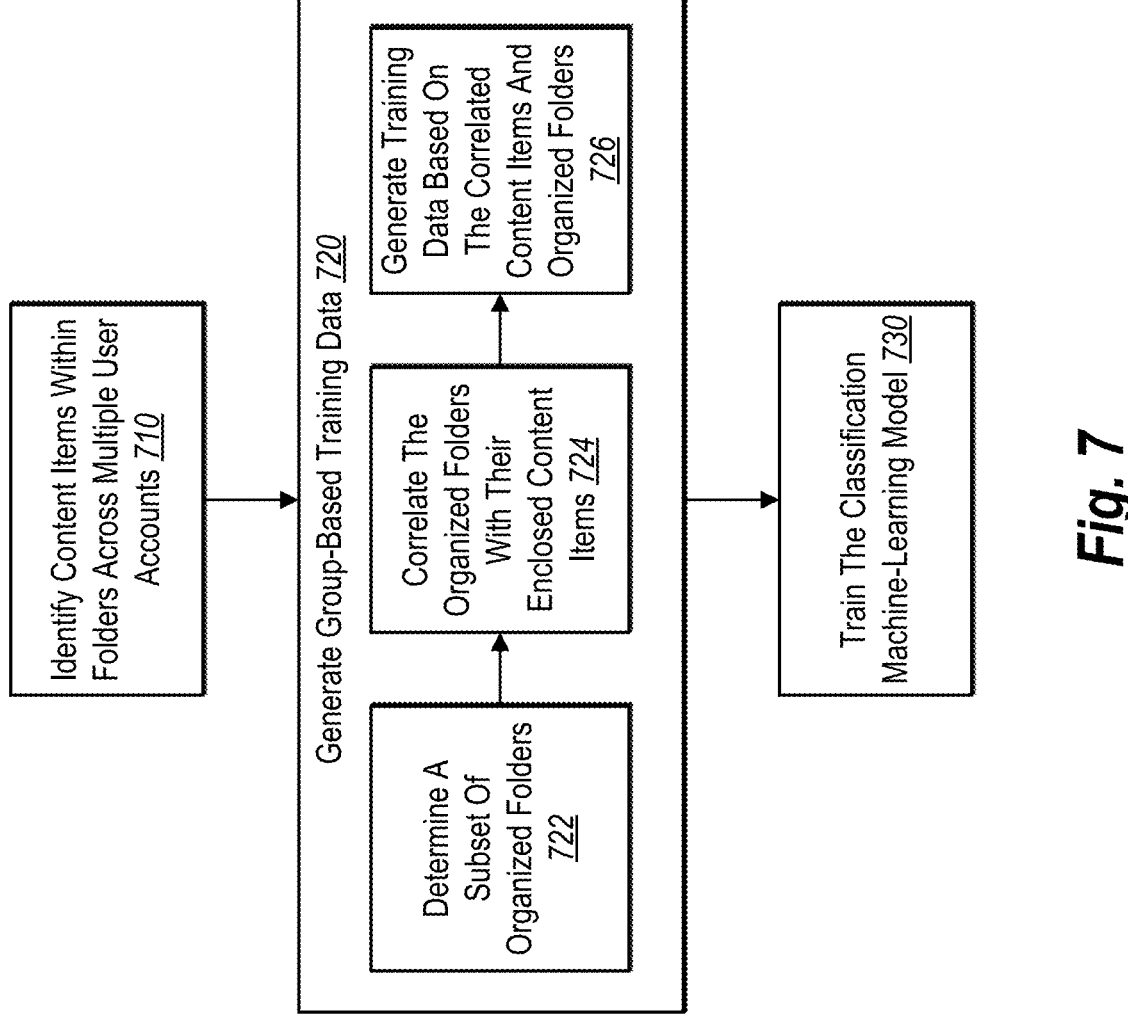
FIG. 7 illustrates generating group-based training data for training a content item classification model in accordance with one or more embodiments.

As mentioned above, FIG. 7 provides detail regarding generating group-based training data. In particular, FIG. 7 illustrates generating group-based training data for training a content item classification model in accordance with one or more embodiments. In many implementations, group-based training data is training data generated from multiple user accounts of a content management system or other file management system. As shown, FIG. 7 includes the classification system 106 performing a series of acts 700.

The series of acts 700 includes an act 710 of identifying content items within folders across multiple user accounts. For example, in one or more implementations, the classification system 106 can access file structures belonging to a set of user accounts for a content management system (or from another file management or file storage system). In particular, the classification system 106 accesses folders, subfolders, and content items within the file structure of the set of user accounts based on the user accounts granting permission to the classification system 106. Indeed, the classification system 106 can identify sets of folders and corresponding sets of content items residing in the folders (e.g., sets of content items enclosed in the sets of folders).

In addition, the series of acts 700 includes an act 720 of generating group-based training data (i.e., referred herein as "group-based classifications" and "group-based classification labels"). For instance, in various implementations, the classification system 106 generates the group-based training data from the content item and folders of the multiple user accounts. As shown in FIG. 7, the act 720 includes multiple sub-acts.

To illustrate, the act 720 includes a sub-act 722 of determining a subset of organized folders. In one or more implementations, the classification system 106 filters out the organized folders from the sets of folders. To elaborate, the sets of folders from the multiple user accounts do not have any label indicating whether a folder has been organized by a user account. Accordingly, in various implementations, based on determining which folders are organized folders, the classification system 106 selects and filters these folders from among the sets of folders to determine the subset of organized folders.

The classification system 106 can utilize one or more folder filtering metrics or signals to filter (i.e., identify and select) the organized folders from the sets of folders. To illustrate, in one or more implementations, the classification system 106 utilizes string or text matching to identify the organized folders. For instance, the classification system 106 identifies folders having names that match a list of keywords for organized folder names (e.g., taxes, receipts, planning, meeting, photos, family, personal, etc.). Indeed, in some instances, the classification system 106 can determine which of the folders in the sets of folders are organized based on their folder names.

In some implementations, the classification system 106 utilizes folder activity to distinguish organized folders from non-organized folders. For example, the classification system 106 analyzes folder activity to determine whether a user account actively adds content items, modifies content items, and/or manually sorts content items within subfolders of the folder. As another example, the classification system 106 identifies how often a user account accesses the folder and/or enclosed content items to identify folders frequently accessed by user accounts.

In various implementations, the classification system 106 determines organized folders from the sets of folders based on the content items and/or subfolders within a folder. For example, the classification system 106 discovers a high correlation between subfolders that reside in a folder. As another example, the classification system 106 utilizes a document classification model (e.g., machine-learning model or neural network) to determine the context of each content item (e.g., homework, journal entries, projects, receipts, billing, home improvement, vacation, planning, etc.). Then, based on correlating similar contexts across content items, the classification system 106 can determine whether the folder holding the content items is organized for the context. Further, in various implementations, the classification system 106 can determine the percentage of content items that share a similar context (e.g., 85% of the content items relate to Topic A) as part of identifying if a folder is organized.

As a further example, the classification system 106 identifies subfolder patterns within a folder. For instance, a folder with subfolders corresponding to the months of the year may signal an organized folder. Likewise, a folder with no content items and multiple subfolders that themselves have content items could signal an organized folder (e.g., the folder is organized with respect to the content items nested within its subfolders).

As another example, the classification system 106 determines the number of content item types (e.g., file types and/or file extensions) in a folder where a larger number of content item types could infer a non-organized folder (or vice versa). Additionally, in some cases, the classification system 106 determines the ratio of content items to subfolders, where a high ratio of content items to subfolders may signal an unorganized folder (or vice versa).

As an additional example, the classification system 106 compares folders across multiple user accounts to determine common or reoccurring folders (e.g., by name, theme, scheme, content, context, etc.). In these instances, the classification system 106 can determine organized folders as well as strong signals of how user accounts prefer to create and manage folder organization (or vice versa). Similarly, in various implementations, the classification system 106 can filter out non-organized folders, such as folders organized by a machine or a non-refined system. For instance, folders with gibberish names, code or long numbers within their names, hexadecimal values in their names, or multiple folders with sequential numbering are most likely not user-created and maintained folders. Accordingly, the classification system 106 can exclude these folders from the subset of organized folders.

In one or more implementations, the classification system 106 can apply one or more of the above approaches to determine which folders in the sets of folders across the user accounts are organized folders. For example, the classification system 106 creates and/or utilizes an organized folder model that receives one or more of the above signals and outputs a score indicating the probability that a folder is an organized folder. The classification system 106 can group folders having an organized folder score satisfying an organized folders threshold to the subset of organized folders.

Returning to FIG. 7, as shown, the act 720 includes a sub-act 724 of correlating organized folders with their enclosed content items. For example, in various implementations, the classification system 106 collects, copies, or otherwise accesses each of the organized folders along with their enclosed content items. In some implementations, accessing an organized folder may include accessing a subfolder and their contents within the folder (e.g., going down one level, a predetermined number of levels, or all layers). In alternative implementations, the classification system 106 accesses the content items within an organized folder without considering and/or accessing the enclosed subfolders.

In one or more implementations, the classification system 106 generates a table or database that links organized folders to enclosed content items (and/or subfolders). In some implementations, the classification system 106 only extracts a portion of the content items. For example, the classification system 106 extracts some or all of the content item data from a content item (e.g., name, activity, keywords, and/or a content embedding of the content item) without copying the entire content item. In various implementations, the classification system 106 runs a sensitive information filter model to redact, remove, hide, and/or replace personal or otherwise sensitive information in the content items.

As also shown, the act 720 includes a sub-act 726 of generating training data (e.g., group-based training data) based on the correlated content items and organized folders. For example, in some implementations, the classification system 106 utilizes organized folders and correlated content items (or content item data) to generate one or more sets of training data. For instance, given an organized folder and various correlated content items, the classification system 106 can extract or otherwise determine a classification label from the organized folder (e.g., user the name or context of the organized folder). In these and other implementations, the list of classification labels extracted from the organized folders can define which classification labels a classification model learns and predicts for content items and/or folders input inferenced by the trained classification model.

Further, in example implementations, the classification system 106 can generate, designate, and/or store content item data from one or more of the content items that are linked to the classification label associated with the organized folder. Additionally, the classification system 106 can also include folder data in the training data. For example, in various implementations, the classification system 106 can generate, designate, and/or store folder data from the organized folder as described above as well as link the folder data with the classification label associated with the organized folder.

As shown in FIG. 7, the series of acts 700 can include an act 730 of training the classification machine-learning model. For instance, in various implementations, the classification system 106 utilizes the training data generated in the act 720 (e.g., group-based training data) to train a classification model to classify content items and/or folders. As a simplified example of training a classification model, the classification system 106 randomly removes a content item from an organized folder and trains the classification model to place the content item back into the correct folder from among multiple folders. Indeed, the classification system 106 trains the classification model to classify the content item to the classification label associated with the organized folder, where the classification label serves as the classification label ground truth. Additional detail regarding training a classification model is provided above in connection with FIG. 6A.

Figure 8:
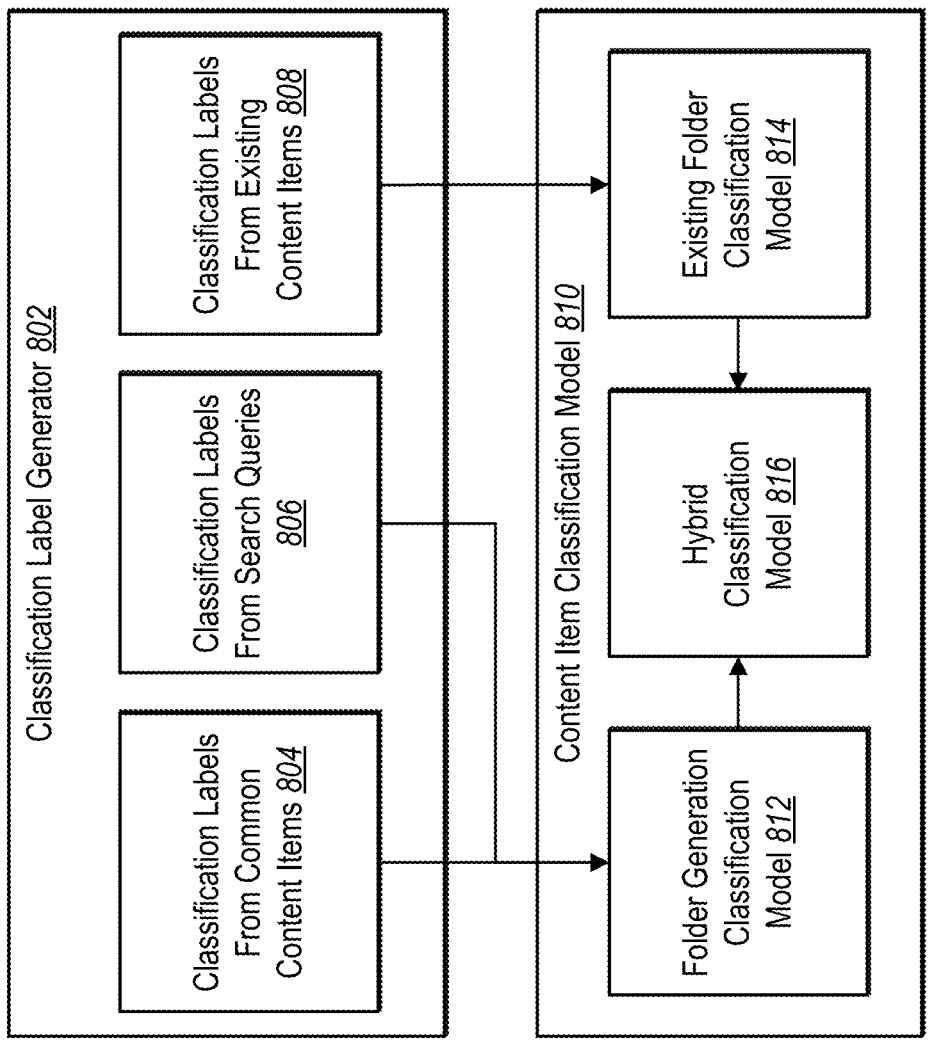
FIG. 8 illustrates various approaches for generating content item classification labels for training various versions of a content item classification model in accordance with one or more embodiments.

Turning to FIG. 8, additional detail will now be provided regarding generating classification labels for classification models. In particular, FIG. 8 illustrates various approaches for generating content item classification labels for training various versions of a content item classification model in accordance with one or more embodiments. As shown, FIG. 8 includes a classification label generator 802 and a content item classification model 810. In various implementations, the content item classification model 810 represents one or more implementations of the classification models described above (e.g., the classification machine-learning model 610 and/or the trained classification machine-learning model 620).

As shown, the classification label generator 802 generates different sets of classification labels. In particular, the classification label generator 802 generates classification labels from common content items 804, search queries 806, and existing content items 808. As described above, in various implementations, the classification system 106 utilizes the classification labels along with corresponding content items from which the classification labels are determined as training data to train and/or tune one or more classification models. In this manner, while the classification system 106 can employ the same training method, the classification system 106 generates specific and/or customized versions of a classification model by training with different training data sets.

To elaborate, in one or more implementations, the classification system 106 analyzes a corpus or collection of content items from multiple users to determine a set of classification labels as well as corresponding content items. For instance, the classification system 106 utilizes clustering or another grouping technique to group similar content items, then extract classification labels from the groups. To illustrate, the classification system 106 generates embeddings for content items based on their contents (i.e., content item data), then utilizes a clustering algorithm to form clusters of similar content items. Next, the classification system 106 can determine a common subject, topic, key term, or name from a cluster as the classification label.

In some implementations, the classification system 106 determines classification labels from the collection of content items based on analyzing file names, file paths, comments, tags, and/or creation sources of content items. For example, the classification system 106 groups content items by their file name and/or file path. Then, when the number of content items that share some or all of a similar file name (e.g., "itinerary") or a shared folder name within their file path (e.g., "portfolio") meet a threshold, the classification system 106 generates a classification label based on the shared label and associates the label with the content items. As another example, the classification system 106 can determine that content items are created or accessible by a particular source or application (e.g., a tax application). As yet another example, the classification system 106 utilizes a zero-shot model to determine classification labels from a set of content items and/or an initial set of classification labels.

In various implementations, as the list of classification labels from common content items 804 increases (or after analyzing a predetermined number of content items), the classification system 106 can verify uniqueness among the labels. For example, the classification system 106 performs a deduplication process for removing and/or combining similar classification labels. In some implementations, the classification system 106 determines similarities between classification labels in an embedding space (e.g., combined all classification labels within a similarity threshold distance in embedding space).

As shown in FIG. 8, the classification label generator 802 generates classification labels from search queries 806. For example, the classification system 106 identifies search logs (e.g., for searches conducted within or without a content management system) that indicate which content items were selected as a result of a given search query (e.g., search term). By pairing a search query with selected content items, the classification system 106 can build training data that includes classification labels determined from the search queries and corresponding content item data from the selected content items. Indeed, in example implementations, the classification system 106 automatically generates a set of classification labels from the top n search queries.

In many implementations, the search logs are limited to a particular set of users. For example, the classification system 106 identifies search logs from users belonging to a group, organization, or community. In this manner, the classification system 106 can generate classification labels to train a classification model customized to the group, organization, or community. Similarly, the classification system 106 can generate classification labels and classification models for particular specialty groups and/or languages.

In one or more implementations, the classification system 106 receives input refining or curating the classification labels from common content items 804 and/or from search queries 806 (i.e., referred herein as "system-based classifications" and "system-based classification labels"). For example, the classification system 106 displays the set of classification labels from common content items 804 within a user interface that enables a user to verify, add, remove, and/or edit classification labels. In these implementations, upon receiving updates to the set of classification labels, the classification system 106 can re-evaluate associations between the classification labels and corresponding content items from the collection of content items.

As also shown, the classification label generator 802 generates classification labels from existing content items 808. For instance, the classification system 106 generates classification labels based on existing folders and files within the file structure of a user (i.e., referred herein as "system-based classifications" and "system-based classification labels"). To illustrate, in one or more implementations, the classification system 106 generates training data for a classification model by generating the classification labels from existing folder names and the corresponding file data (i.e., content item data) from the existing files within each folder. In these implementations, the classification system 106 can generate a customized, user-based list of classification labels in response to a user requesting that an existing file structure be converted into an automated directory, as described above.

In one or more implementations, upon obtaining a set of content item classifications, the classification system 106 can build and/or grow the training data. For example, utilizing an initial list of classification labels and/or a set of classification labels generated by the classification label generator 802, the classification system 106 can identify content items that correspond to the classification labels. For example, for a classification label of "receipt," the classification system 106 identifies corresponding content items, which the classification system 106 uses to build the training data utilized to train the classification model, as described above.

As mentioned above, FIG. 8 also includes the content item classification model 810 (or simply "classification model 810"). As shown, the classification model 810 includes a folder generation classification model 812, an existing folder classification model 814, and a hybrid classification model 816. As noted above, each of these models can be implementations of the content item classification machine-learning models described above in connection with FIGS. 6A-6C (e.g., the classification machine-learning model 610 and the trained classification machine-learning model 620).

In various implementations, the folder generation classification model 812 corresponds to a classification model that operates in connection with new and/or empty smart folders. For example, the folder generation classification model 812 classifies content items from system-based classification labels. To illustrate, FIG. 8 shows the classification system 106 utilizing classification labels from the common content items 804 and/or classification labels from the search queries 806 to generate the folder generation classification model 812. Indeed, in many implementations, the system-based classification labels refer to a set of classification labels generated by the classification system before the user requests an automated folder and/or based on content items from multiple users of a content management system (as described above).

By utilizing system-based classification labels to generate a classification model, the classification system 106 enables users to easily use automated folders (e.g., smart folders) to automatically organize content items. Indeed, in these implementations, the classification system 106 provides a multi-user, turn-key classification model that classifies the majority of content items that may be added. Further, in these implementations, the classification system 106 reduces clutter and confusion by only generating destination folders that include corresponding content items rather than having empty folders and subfolders, as described above. Indeed, the classification system 106 provides a classification model that efficiently and accurately classifies and moves newly added content items automatically from a source folder to multiple destination folders, as described above.

The classification model 810 also includes the existing folder classification model 814. As noted above, in one or more implementations, an existing folder classification model 814 may be similar to a folder generation classification model 812 except for the classification labels used to train the models. Accordingly, while the classification system 106 can train a folder generation classification model 812 ahead-of-time and/or for multiple users, an existing folder classification model 814 is often generated in response to a user requesting to convert an existing file structure to an automated folder and customized to a user's file structure.

To further illustrate, in one or more implementations, the classification system 106 generates an existing folder classification model 814 as a classification model customized to a user. As described above, the classification system 106 can generate classification labels from existing content items 808 based on a user requesting that an existing file structure be converted to an automated folder (e.g., a smart folder). Accordingly, along with generating the classification labels from existing content items 808, the classification system 106 can also train a classification model (e.g., re-train or tune a pre-trained classification machine-learning model) based on the existing content items and the classification labels from existing content items 808. In this manner, the classification system 106 trains the classification model to classify newly added content items to match the existing folders (e.g., based on the existing content items within the existing folders).

Additionally, upon detecting new files (e.g., added manually, via a workflow, and/or via a third-party), the classification system 106 utilizes the existing folder classification model 814 to classify the content items. For example, the existing folder classification model 814 correlates embeddings of the newly added content items to embeddings of existing content items (e.g., utilizing nearest neighbor, cosine similarity, centroid matching, etc.) to classify the content items. After, the classification system 106 moves the classified content item to the corresponding folder or subfolder, as described above.

To further illustrate, suppose a user has previously organized digital images (i.e., content items) in an image folder into folders and subfolders. Upon selecting an option to convert the image folder into a smart folder, the classification system 106 generates an existing folder classification model 814 based on the existing folders (i.e., classification labels) and digital images (e.g., content item data) in the image folder. Then, as new digital images (or other content items) are added to the image folder (e.g., the smart folder), the classification system 106 utilizes the existing folder classification model 814 to correctly classify and relocate the digital image.

In various implementations, the classification system 106 also organizes existing content items (e.g., content items that are not newly added but that were previously added). For example, the classification system 106 detects unclassified content items within a smart folder and automatically classifies and/or relocates the content items. In additional implementations, the classification system 106 provides a user interface that requests user confirmation before relocating the content items and/or notifying the user of the move.

Similarly, in some implementations, the classification system 106 will classify and move content items in a smart folder based on triggers other than detecting the addition of new content items. For example, based on content items being removed and/or edited, the classification system 106 classifies and/or re-classifies content items in the file structure. In various implementations, the classification system 106 classifies and/or re-classifies content items in the file structure at a scheduled time and/or when user access is added or removed.

As shown in FIG. 8, the classification model 810 also includes the hybrid classification model 816. For instance, as shown, the existing folder classification model 814 includes the folder generation classification model 812 and the existing folder classification model 814. For example, in one or more implementations, the hybrid classification model 816 is a classification model that combines the folder generation classification model 812 and the existing folder classification model 814. In alternative implementations, the hybrid classification model 816 utilizes the folder generation classification model 812 and the existing folder classification model 814 in sequence or in parallel.

To illustrate, in some implementations, the classification system 106 trains the hybrid classification model 816 based on training data generated for both the folder generation classification model 812 and the existing folder classification model 814. For instance, the classification system 106 utilizes classification labels from common content items 804, search queries 806, and/or existing content items 808 and their corresponding content items (i.e., content item data) to train a classification machine-learning model. In these implementations, upon classifying a previously unclassified content item, the classification system 106 determines whether a destination folder exists that corresponds to the classification (e.g., an existing folder). If so, the classification system 106 moves the classification content item to the destination folder. Otherwise, the classification system 106 dynamically generates a new destination folder corresponding to the classification and moves the classification content item to the newly generated destination folder. In certain implementations, the classification system 106 prompts a user for confirmation before generating a new destination folder (or for input as to where in the file structure to locate the new destination folder or if the classification should be modified).

In one or more implementations, the classification system 106 executes both the folder generation classification model 812 and the existing folder classification model 814 and selects the most confident output (e.g., based on classification scores). In some implementations, the classification system 106 uses default rules, such as executing one of the classification models first, then using the output of the first classification model as input to the second classification model. For example, the classification system 106 uses the output of the folder generation classification model 812 as input to the existing folder classification model 814.

Further, in some implementations, the classification system 106 utilizes a folder generation classification model 812 to initially organize one or more batches of incoming content items. After, the classification system 106 detects a user changing the location of content items within the file structure. For example, the classification system 106 detects a user manually adding new content items, moving content items, editing content items, adding folders or subfolders, removing folders or subfolders, etc. In response, the classification system 106 generates an existing folder classification model 814 to replace (or supplement) the folder generation classification model 812. Then, as additional files are added, the classification system 106 ensures that the content items are sorted among the existing folders of the file structure.

In various implementations, the classification system 106 provides the user with options to further customize a content item classification model 810. For example, the classification system 106 enables a user to modify the training of a classification model to trade-off between accuracy and volume with respect to classification and sorting. Additionally, in some implementations, the classification system 106 enables a user to search through content items the file structure based on the classifications and/or sub-classifications.

Moreover, in one or more implementations, as part of moving or relocating a classification content item to a corresponding destination folder, the classification system 106 can perform additional actions. For example, in some implementations, the classification system 106 renames a content item to better align with the classification of the content item. For instance, if the classification system 106 determines that a file has a generic or non-descriptive file name, the classification system 106 can rename the file based on its classification, date (e.g., creation, modification, or access), and/or other file data.

Figure 9:
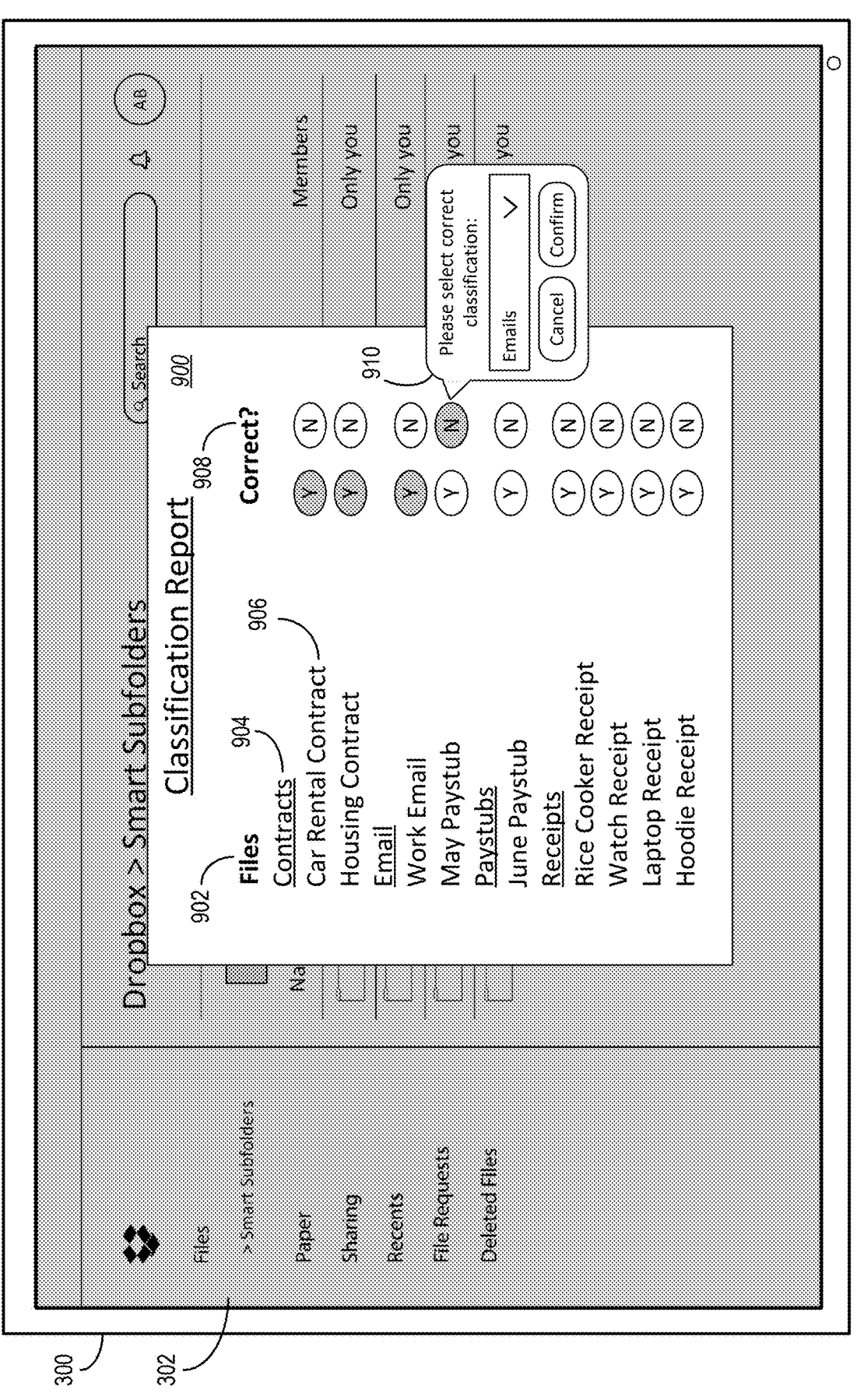
FIG. 9 illustrates providing and utilizing feedback to improve a classification model in accordance with one or more embodiments.

Turning to FIG. 9, additional detail is provided regarding improving a classification model based on user feedback. In particular, FIG. 9 illustrates the classification system 106 (i.e., the content item classification system) providing and utilizing feedback to improve a classification model in accordance with one or more embodiments. As shown, FIG. 9 includes the client device 300 introduced above displaying the GUI 302. In particular, the GUI 302 shows a classification report 900.

As shown, the classification report 900 includes a file list 902 (e.g., content items) that includes multiple file classifications 904 (and corresponding file locations) along with files 906 assigned to and/or stored within each of the multiple file classifications 904. In various implementations, the classification report 900 is a continuation of the GUI 302 displayed in FIG. 3F. For example, the classification system 106 provides the classification report 900 to a user to enable the user to quickly ascertain how the classification system 106 has classified the newly added content items as well as to where the content items have been moved. In some implementations, the classification system 106 stores the information presented in the classification report 900 in a table or database on the client device 300 and/or a server device of the content management system.

In one or more implementations, the classification system 106 can utilize the classification report 900 to receive user feedback to improve the classification model. To illustrate, the classification report 900 includes confirmation elements 908 (e.g., the column on the right) that enable a user to indicate whether a file was correctly classified. As shown, the user confirms (e.g., selecting "Y") the classification of the first three files 906 before indicating a negative classification (e.g., selecting "N") for the fourth file.

As also shown, the classification report 900 includes a popup interface 910 that enables further feedback. For example, in one or more implementations, upon detecting a negative file classification selection of a file, the classification system 106 displays the popup interface 910. As illustrated, the popup interface 910 enables the user to reclassify the incorrectly classified file. For instance, the user selects the correct classification from a dropdown or another menu type. In various implementations, the classification system 106 enables the user to select the "other" or "miscellaneous"

file classification, enter in a new classification, or remove classifications (e.g., delete a destination folder). In response, the classification system 106 can relocate the content item accordingly.

While the user can provide explicit feedback, as described above. In some implementations, the classification system 106 detects implicit feedback. For example, if a user manually moves one or more content items from one destination folder to another destination folder, the classification system 106 detects the change and reclassifies the content items. For instance, the classification system 106 detects a user moving a content item from the "Other" destination folder to a "Bills" destination folder. In response, the classification system 106 can utilize the updated classification of the content item to improve the classification model.

In some implementations, the classification system 106 detects a user modifying the file structure and/or hierarchy of the file structure. For example, the user adds, renames, combines, and/or removes folders or subfolders within the folder structure of an automated folder. For instance, the classification system 106 detects that the user moves a content item from the "Other" destination folder to a newly created destination folder of "Vacation." Accordingly, based on detecting user modifications (both explicit and implicit), the classification system 106 can obtain further feedback for improving one or more classification models. Moreover, the classification system 106 can continue this feedback loop of continually improving classification models based on detecting user feedback (both implicit and explication).

To further illustrate, for changes that reclassify a content item, the classification system 106 can retain the classification model to improve content item classifications. Similarly, as destination folders are added, moved, renamed, or removed, the classification system 106 can update the set of classification labels and further tune the classification model based on the updated set of labels. In certain implementations, the classification system 106 can re-organize content items in the file structure based on the improved classification model including moving a content item that was classified and moved to an incorrect destination folder to its correct destination folder. In example implementations, the classification system 106 provides the user with a notification when changes to content items and/or the classification model are made.

Additionally, the classification system 106 can update the classification model based on one or more events. For example, the classification system 106 re-trains a classification model (e.g., a folder generation classification model) as new training data arrives and/or is updated. In another example, the classification system 106 re-trains another classification model (e.g., an existing folder classification model) as the number of content items and/or destination folders increases. In this manner, as training data (e.g., classification labels and/or content item data) increases, the classification system 106 can continue to improve the classification model tailored specifically to the user's method of file organization.

As another example of improving a classification model based on user feedback, FIG. 10 illustrates utilizing modified content item move suggestions as feedback to improve a classification model in accordance with one or more embodiments. As shown, FIG. 10 includes a series of acts 1000, which the classification system 106 can perform.

As shown, the series of acts 1000 includes an act 1002 of training a classification machine-learning model ("classification model"). For example, in various implementations, the classification system 106 utilizes group-based training data to train and tune a classification model to accurately classify content items and/or folders to a list of classification labels learned in training. Additional detail regarding training a classification model is provided above in connection with FIG. 6A

As also shown, the series of acts 1000 includes an act 1004 of determining content items move suggestions ("move suggestions") utilizing the classification machine-learning model. For example, as noted above, in one or more implementations, the classification system 106 may detect a request to intelligently and/or automatically organize an existing folder (e.g., a source folder). In response, the classification system 106 identifies and provides content items and/or subfolders in the source folder to the classification model for processing. In these implementations, the classification system 106 can utilize the trained classification model to determine classifications for the content items and/or subfolders in the source folder. From these classifications, the classification system 106 can determine which of the subfolders quality as destination folders as well as generate move suggestions for moving content items into destination folders. Additional information regarding generating move suggestions is provided above in connection with FIGS. 5A-5E and FIG. 6D.

FIG. 10 also shows that the series of acts 1000 includes an act 1006 of identifying corrected classification feedback based on modified move suggestions. As described above, in various implementations, the classification system 106 provides an interactive user interface ("interactive interface") to a client device that includes move suggestions. Each of the additions, removals, and/or modifications to a move suggestion (as well as other user modifications to content items within the interactive interface) provides the classification system 106 with corrected classification feedback. Below are various examples of user actions and corresponding feedback received by the classification system 106.

In some instances, the classification system 106 receives user input confirming the move suggestions (e.g., selecting a confirmation element). Here, the classification system 106 receives feedback that the provided move suggestion was correct. In certain instances, the classification system 106 receives user input activating a move suggestion (e.g., checking the checkbox for a content item having a suggested destination folder), which confirms to the classification system 106 that a move suggestion for a content item having a medium confidence value was correct.

Also, in some instances, the classification system 106 receives user input modifying one or more move suggestions. For example, a user changes the suggested destination folder to another destination folder for a content item (or to no destination folder). Here, the classification system 106 receives feedback that a content item was misclassified and/or is better correlated to another classification label.

Additionally, in some instances, the classification system 106 receives user input modifying content items within the interactive interface for which a move suggested was not provided (or the move suggestion indicates the need for user input). For example, the user selects a destination folder for a content item that did not have one suggested by the classification system 106 (e.g., the correlation between the content item and any of the destination folders was too weak to generate a move suggestion). Here, the classification system 106 receives feedback linking the content item to a destination folder and, thus, a classification label.

In one or more implementations, a user selects an option to create a new destination folder for a content item. In these instances, the classification system 106 can determine a classification label for the new destination folder to determine if the destination folder corresponds to a known classification label. If so, the classification system 106 receives feedback linking the content item to the content item. Otherwise, if the new destination folder does not correspond to a known classification label, the classification system 106 receives feedback of a new potential classification label.

As shown, the series of acts 1000 includes an act 1008 of re-training the classification machine-learning model. For example, upon receiving the corrected classification feedback (e.g., from the act 1006), the classification system 106 can further the classification model (e.g., from the act 1002). In various implementations, the classification system 106 utilizes the re-trained classification model to determine improved move suggestions (e.g., the act 1004).

In various implementations, the classification system 106 re-trains the classification model upon meeting one or more conditions. For example, the classification system 106 re-trains the classification model following a regular schedule. As another example, the classification system 106 waits until at least a predetermined amount of feedback data is received (e.g., 100 or 1,000 corrected classifications)

Figure 11:
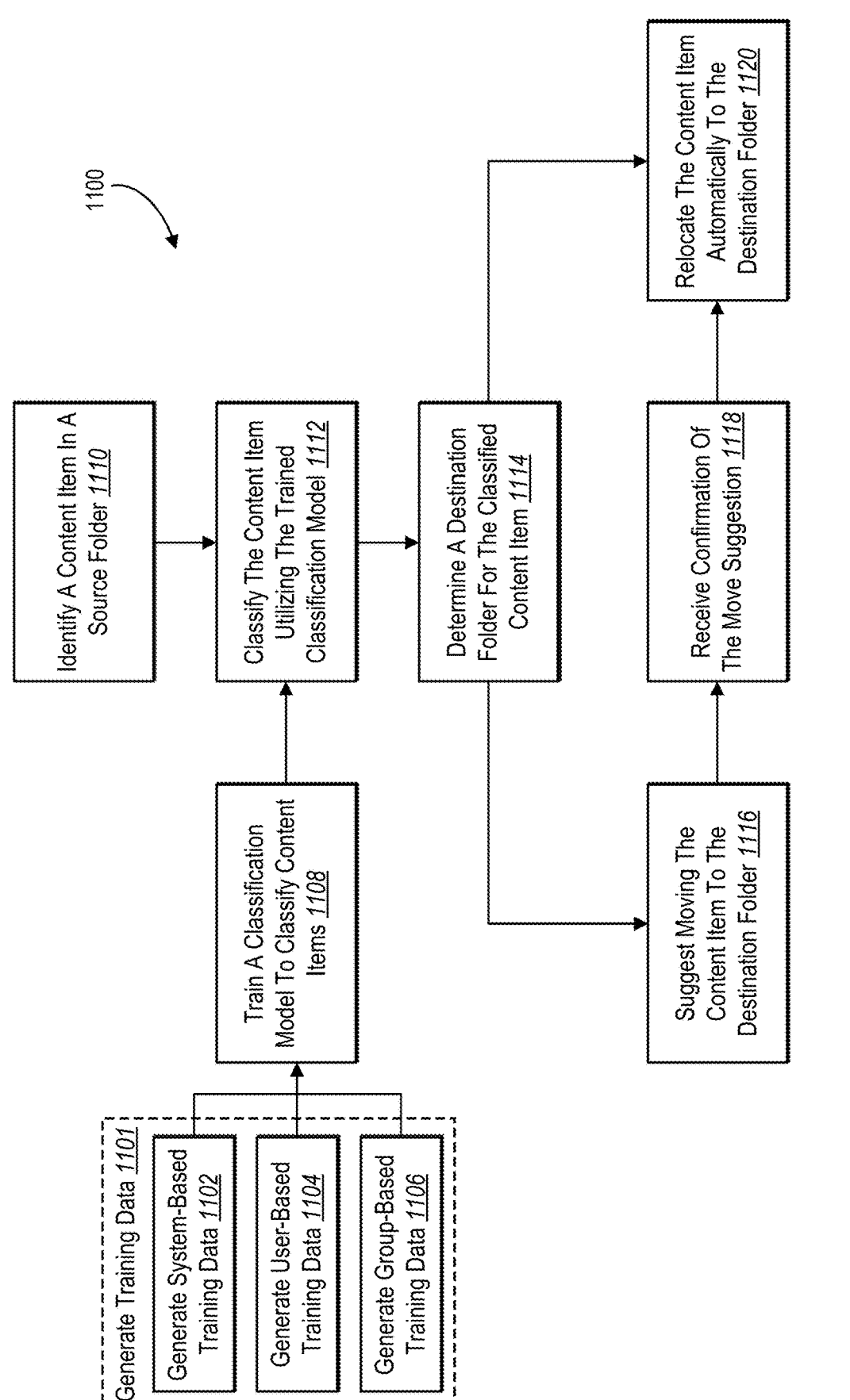
FIG. 11 illustrates dynamically relocating and organizing content items into destination folders utilizing a trained classification model in accordance with one or more embodiments.

Automatically Organizing Content Items Utilizing Trained Classification Models As mentioned above, the classification system 106 can utilize various approaches to train a classification model (e.g., a classification machine-learning model or classification neural network) and utilize the trained classification model to dynamically, accurately, and intelligently relocate content items in a source folder to corresponding destination folders. Indeed, the classification system 106 can combine many of the implementations provided above to automatically organize the source folder by accurately moving (e.g., automatically and/or with minimal user input) content items to appropriate destination folders. To illustrate, FIG. 11 shows the classification system 106 dynamically relocating and organizing content items into destination folders utilizing a trained classification model in accordance with one or more embodiments. In particular, FIG. 11 shows a series of acts 1100, which the classification system 106 may perform.

As shown, the series of acts includes an act 1101 of the classification system 106 generating training data. As described above, in various implementations, the classification system 106 utilizes different approaches to generate different types of training data, which the classification system 106 utilizes to train different versions of a classification model (or a hybrid classification model). As described herein, each of the different versions of the classification model provides systematic advantages over existing systems by intelligently streamlining the organization and retrieval of content items, reducing user navigation and visual clutter of existing systems, as well as reducing computing resources and power consumption.

To illustrate, the act 1101 includes various sub-acts, such as a first sub-act 1102 of the classification system 106 generating system-based training data. As provided above, in various implementations, the classification system 106 generates system-based training data that includes a set of classification labels and corresponding content items. For example, in some implementations, the classification system 106 accesses content items from a corpus or collection of content items (e.g., common content items). Further, in one or more implementations, the classification system 106 analyzes the content items to discover classification labels.

In some implementations, the classification system 106 utilizes search queries to identify content items and corresponding classification labels. Additional detail regarding generating system-based training data is provided above in connection with FIG. 8 (e.g., 802-806).

As noted above, a classification model trained with system-based training data can dynamically organize cluttered folders as well as provide new automated folders (e.g., generate new smart folders or convert existing folders into smart folders). For example, the classification system 106 can utilize a classification model trained with system-based training data to automatically sort a source folder having or receiving unorganized content items into appropriate destination folders. Indeed, as provided above, the classification system 106 can generate and add new destination folders to the source folder (or nested within a subfolder of the source folder) to further improve the accuracy and efficiency of the file structure. In this manner, the classification system 106 can automate folder organization by providing a specialized organizational framework that selectively adds key destination folders that will optimally organize content items within a source folder (while preventing the addition of unimportant or less-important destination folders that would add clutter and unnecessary excess data to the client devices of users).

As shown, the act 1101 includes a second sub-act 1104 of the classification system 106 generating user-based training data. As provided above, in one or more implementations, the classification system 106 generates user-based data to include content items within subfolders of a source folder. For example, in various implementations, the classification system 106 identifies, for a user (or a team of users), subfolders within a source folder as well as the content items or nested subfolders (e.g., subfolders of the subfolders) in each subfolder. In various implementations, the classification system 106 generates the user-based training data by generating classification labels from subfolders (e.g., subfolder names or concepts) as well as by correlating content items residing in the subfolders with the subfolder in which the content items reside. Additional detail regarding generating user-based training data is provided above in connection with FIG. 8 (e.g., 804).

One of the unique benefits of utilizing a classification model trained with user-based training data is that the classification system 106 automatically organizes a source folder for users by learning and applying the organizational framework the users have created (e.g., a personalized framework). Indeed, in various implementations, the classification system 106 learns how to automatically organize content items following the file structure and hierarchical system established by each user. In this manner, the classification system 106 can intelligently automate folder organization for users by continually sorting and maintaining content item organization of source folders for users according to their framework as new content items are added to the source folders.

As also shown, the act 1101 includes a third sub-act 1106 of the classification system 106 generating group-based training data. As provided above, in some implementations, the classification system 106 generates group-based training data that includes a set of organized folders and corresponding enclosed content items. For example, in various implementations, the classification system 106 determines that one or more sets of folders include organized folders, for example, by searching for the organized folders within user accounts of a content management system. In some instances, the classification system 106 utilizes folder filtering metrics to identify organized folders from the sets of folders. Additional detail regarding generating group-based training data is provided above in connection with FIG. 7 (e.g., 720).

In many instances, by utilizing a classification model trained with group-based training data, the classification system 106 can efficiently organize content items within a source folder based on intelligently correlating the existing organizational frameworks of individual users with a specialized organizational framework. Indeed, in many implementations, the classification system 106 dynamically organizes content items into the organizational framework of users (e.g., their existing subfolders) while utilizing a classification model trained based on a specialized organizational framework. In these implementations, the classification system 106 provides personalized content item organization to users while benefiting from the efficiencies of a specialized organizational framework (i.e., the group-based training data).

Moreover, in each of the above embodiments, by accurately and efficiently improving the organization of a file structure, the classification system 106 facilitates improved (e.g., faster) computer response times both when relocating content items to their proper destination folders as well as when retrieving content items. Indeed, in many instances, the classification system 106 reduces the number of steps a user takes to search, identify, and/or navigate to a destination folder as well as the actions of moving a content item through one or more folder interfaces to relocate or access a content item in its proper destination folder.

As shown, the series of acts 1100 includes an act 1108 of training a classification model to classify content items. In various implementations, the classification system 106 can train a classification model based on the training data, as described above in connection with FIG. 6A. For example, in one or more implementations, the classification system 106 trains a classification neural network (e.g., a content item classification neural network) to determine classifications for content items based on a set of learned classifications (i.e., classification labels). As noted above, the different types of training data (e.g., different sets of classification labels) enable the classification system 106 to achieve different organizational outcomes for users based on the organizational goals of users for a source folder and/or a file structure.

In additional implementations, the classification system 106 can retrain a classification model based on detected user interactions between content items and destination folders. For example, in some implementations, the classification system 106 monitors user interactions with content items and destination folders, such as when users manually move content items between destination folders, which can provide feedback signaling a potential classification error. In various implementations, the classification system 106 detects when users add new subfolders to a source folder, which can provide feedback signaling new potential classification labels. Further, in one or more implementations, the classification system 106 identifies feedback based on providing one or more interactive user interfaces to users and allowing users to modify associates between content items and destination folders, move suggestions, and/or define new correlations between content items and destination folders. Additional examples of tuning classification models based on detected feedback are provided above in connection with FIGS. 9-10.

As also shown, the series of acts 1100 includes an act 1110 of the classification system 106 identifying a content item in a source folder. As described above, in one or more implementations, the classification system 106 can detect when content items are added to a newly created or existing source folder that actively organizes ingested content items (e.g., newly added content items), such as described above in connection with FIG. 3D and FIG. 4C. In some implementations, the classification system 106 classifies content items found in a source folder having unorganized content items among existing subfolders, such as described above in connection with FIG. 5A.

FIG. 11 also shows that the series of acts 1100 includes an act 1112 of the classification system 106 classifying the content item utilizing the trained classification model. As described above, in some implementations, the classification system 106 classifies content items utilizing a classification neural network trained based on system-based training data. For example, the classification system 106 utilizes the trained classification model to classify content items utilizing a specialized organizational framework, as described above in connection with FIGS. 6B-6C.

In particular implementations, the classification system 106 classifies content items located in or added to an automated folder having subfolders with their own sets of content items. For instance, the classification system 106 utilizes a classification neural network trained based on user-based training data to classify content items under a personalized organizational framework, as described above in connection with FIGS. 6B-6C.

Further, in various implementations, the classification system 106 classifies content items found in an existing source folder having unorganized content items as well as subfolders. For example, the classification system 106 classifies content items utilizing a classification neural network trained based on group-based training data, which facilitates the classification system 106 to classify content items utilizing a hybrid organizational framework (e.g., blending existing organizational frameworks of individual users with a specialized organizational framework), as described above in connection with FIG. 6D.

As shown, the series of acts 1100 includes an act 1114 of the classification system 106 determining a destination folder for the classified content item. Based on the type of organization framework utilized, the classification system 106 can generate new destination folders based on content item classifications (e.g., see FIGS. 3A-3G), convert existing subfolders to destination folders (e.g., see FIGS. 4A-4D), and/or select destination folders from among existing subfolders. As explained previously, each framework provides specific advantages that improve storage accuracy and efficiency while also reducing navigational steps on client devices resulting from the optimized organization of content items.

In addition, in various implementations, the classification system 106 determines correlations between classified content items and destination folders. As described above, the classification system 106 associates destination folders with content item classifications (e.g., classification labels) determined by the trained classification model (e.g., the act 1112). As explained above, the classification system 106 can utilize multiple approaches to determine that the classified content items share the same or similar classifications (e.g., classification labels) as destination folders. By utilizing the classification model neural network and classified content items to determine destination folders, the classification system 106 streamlines the organization process at the device or system level by only considering relevant destination folders while ignoring and not generating destination folders not relevant to the current content items needing to be organized.

As shown, the series of acts 1100 includes an act 1116 of the classification system 106 suggesting moving the content item to a destination folder. As described above, in various implementations, upon determining a correlation between content items and destination folders, the classification system 106 provides an interactive user interface indicating these correlations (e.g., via content item move suggestions). In many implementations, the user minimally interacts with the interactive user interface to accept the relocation of content items to destination folders while also maintaining control of where their content items are organized. For example, the series of acts 1100 includes an act 1118 of the classification system 106 receiving confirmation of a move suggestion, such as included in an interactive user interface.

In some implementations where the classification system 106 provides the interactive user interface to users, the classification system 106 detects modifications to content items and/or move suggestions. Even in these implementations, while users engage in the process of organizing one or more content items, the interactive user interface provides an efficient and streamlined environment that enables users to move content items to destination folders with significantly fewer actions and navigational jumps than existing systems. For example, in one or more implementations, the interactive user interface enables users to move multiple content items to multiple levels of the file structure in a single user interface. Further, within the interactive user interface, the classification system 106 can provide backup move suggestions (e.g., recommending alternative destination folders that correspond to content items) that also reduce the computing resources to accurately organize content items. Additional details regarding moving suggestions, the interactive user interface, and detecting confirmations are provided above in connection with FIGS. 5B-5D.

As shown, the series of acts 1100 includes an act 1120 of the classification system 106 relocating the content item automatically to the destination folder. For instance, in various implementations, the classification system 106 automatically moves content items to their corresponding destination folders with no or minimal user involvement, such as described above in connection with FIGS. 3A-3G and FIGS. 4A-4C. In some implementations, upon receiving an indication confirming move suggestions (e.g., performing the act 1118), the classification system 106 automatically relocates content items to their corresponding destination folder, such as described above in connection with FIGS. 5A-5G.

As provided above, by organizing content items from a source folder into destination folders, the classification system 106 improves the functions of computing devices. For instance, the classification system 106 reduces the number of navigational steps needed to organize a source folder. Additionally, once organized, the classification system 106 also reduces the number of navigational steps needed to access organized contact items. In particular, by organizing content items into their proper destinations folders, the speed and response time of retrieving content items is improved due to content items being optimally organized (rather than having to re-sort a jumbled mess of unorganized content items). As a result, computing devices and systems utilize less computational resources used when searching for, looking up, and accessing specific contact items.

Components of the Classification System

Figure 12:
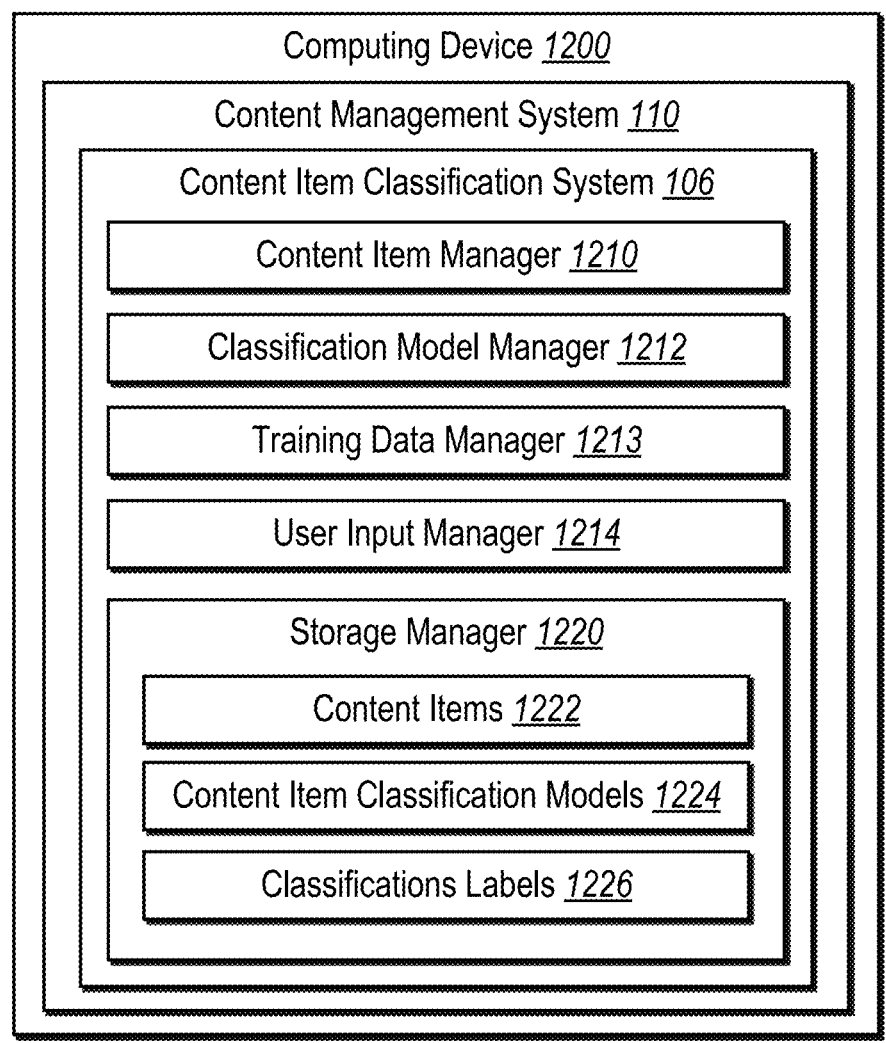
FIG. 12 illustrates an example schematic diagram of a content item classification system in accordance with one or more embodiments.

Turning to FIG. 12, additional detail will now be provided regarding various components and capabilities of the content item classification system 106. In particular, FIG. 12 illustrates an example schematic diagram of the classification system 106 on a computing device 1200 (e.g., one or more of the client devices 102, 300, and the server device 108) in accordance with one or more embodiments of the present disclosure. In some implementations, the computing device 1200 refers to a distributed computing system where different managers are located on different devices, as described above.

As shown, the computing device 1200 includes the content management system 110 and the content item classification system 106 (or simply "classification system 106"). As also shown, the classification system 106 includes a content item manager 1210, a classification model manager 1212, a training data manager 1213, a user input manager 1214, and a storage manager 1220. Further, the storage manager 1220 includes content item 1222, content item classification models 1224, and classification labels 1226.

As shown, the classification system 106 includes the content item manager 1210. In various implementations, the content item manager 1210 facilitates identifying, accessing, receiving, obtaining, detecting, generating, importing, exporting, copying, modifying, removing, providing, and/or organizing content items 1222. For example, the content item manager 1210 detects when one or more content items are added to a folder or file structure, as described above. As another example, the content item manager 1210 detects when a third-party application or system pushes content items into the content management system 110. In some implementations, the content item manager 1210 communicates with the storage manager 1220 to store and retrieve the content items 1222.

As shown, the classification system 106 includes the classification model manager 1212. In various implementations, the classification model manager 1212 manages, maintains, generates, determines, identifies, extracts, trains, re-trains, tunes, and/or utilizes one or more machine-learning models and/or neural networks. For instance, as described herein, the classification model manager 1212 generates classification labels 1226, as described above, to train (e.g., tune or re-train) a classification model. Further, the classification model manager 1212 utilizes one or more of the (trained) content item classification models 1224 to classify content items in a file structure (e.g., incoming or ingested content items).

As provided above, the content item classification models 1224 can include a classification machine-learning model 610, a trained classification machine-learning model 620, a folder generation classification model 812, an existing folder classification model 814, and/or a hybrid classification model 816. Further, based on classifying content items, the classification model manager 1212 can relocate or move content items from a smart folder to destination folders, and/or organize content items to destination folders, which also correspond to classification labels 1226, as described above.

FIG. 12 also shows that the classification system 106 includes the training data manager 1213. In various implementations, the training data manager 1213 identifies, gathers, analyzes, filters, correlates, and/or otherwise manages training data utilized to train one or more content item classification models 1224. As described above, training data can include classification labels 1226, content items 1222 (e.g., content item data), folders (e.g., folder data), and/or other data. In some implementations, training data includes system-based training data, user-based training data, and/or group-based training data.

As shown, the classification system 106 includes the user input manager 1214. In various embodiments, the user input manager 1214 can detect, receive, and/or facilitate user input on the computing device 1200 in any suitable manner. In some instances, the user input manager 1214 detects one or more user interactions (e.g., a single interaction, or a combination of interactions) with respect to a user interface. For example, the user input manager 1214 detects a user adding content items to an automated folder (e.g., smart folder) of a file structure and/or a user moving classified content items between destination folders. As another example, the user input manager 1214 detects implicit or explicit feedback regarding classified content items and/or one or more content item classification models 1224.

As also shown, the classification system 106 includes the storage manager 1220. In various implementations, the storage manager 1220 maintains data for the content item classification system 106. The storage manager 1220 (e.g., via one or more memory devices) can maintain data of any type, size, or kind, as necessary to perform the functions of the content item classification system 106. For example, the storage manager 1220 includes the content items 1222, the content item classification models 1224, and the classification labels 1226, as shown.

Each of the components of the computing device 1200 can include software, hardware, or both. For example, the components of the computing device 1200 can include one or more instructions stored on a computer-readable storage medium and executable by processors of one or more computing devices, such as a client device or server device. When executed by the one or more processors, the computer-executable instructions of the content item classification system 106 can cause the computing device(s) (e.g., the computing device 1200) to perform the methods described herein. Alternatively, the components of the computing device 1200 can include hardware, such as a special-purpose processing device to perform a certain function or group of functions. Alternatively, the components of the computing device 1200 can include a combination of computer-executable instructions and hardware.

Furthermore, the components of the computing device 1200 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 1200 may be implemented as a stand-alone application, such as a desktop or mobile application. Furthermore, the components of the computing device 1200 may be implemented as one or more web-based applications hosted on a remote server.

Figure 15:
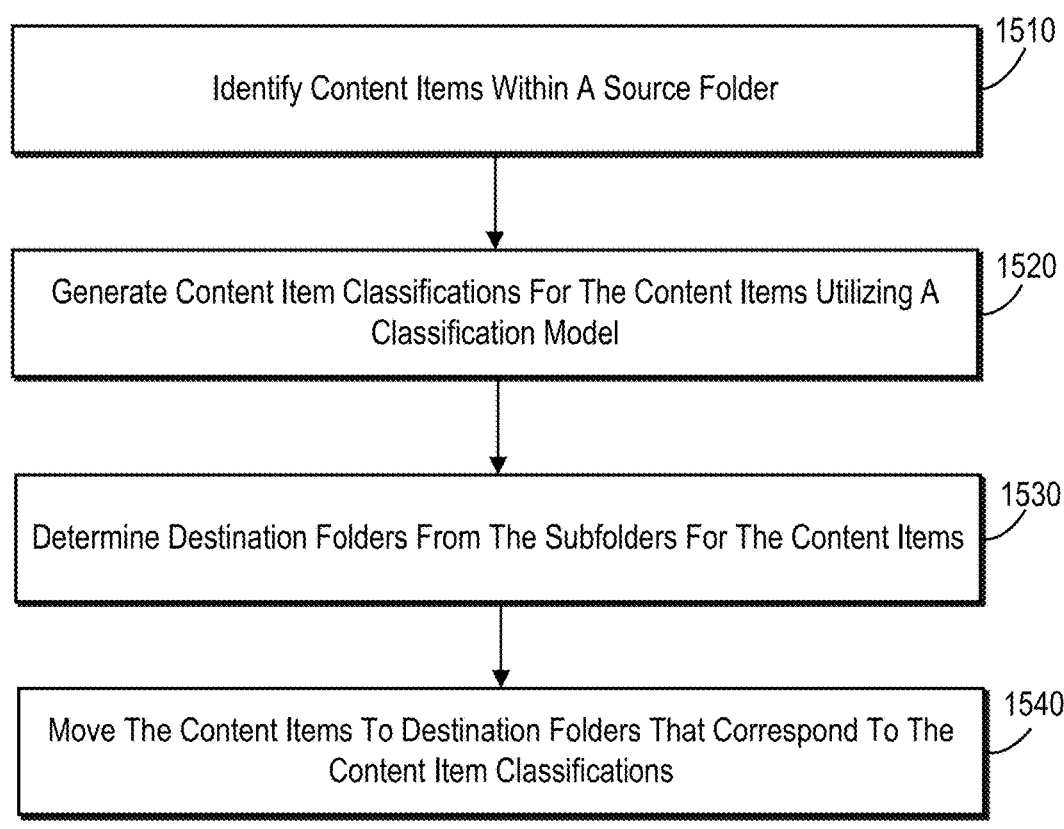
FIG. 15 illustrates a flowchart of a series of acts for relocating content items into one or more destination folders utilizing a trained classification model in accordance with one or more embodiments.

The preceding figures, the corresponding text, and the examples provide several different systems, methods, techniques, components, and/or devices of the content item classification system 106 in accordance with one or more embodiments. In addition to the above description, one or more embodiments can also be described in terms of flowcharts including acts for accomplishing a particular result. For example, FIGS. 13-15 illustrate flowcharts corresponding to the one or more implementations of the classification system 106 described above. Moreover, the outlined acts in FIGS. 13-15 are only provided as examples, and some of the acts may be optional, combined into fewer acts, or expanded into additional acts without detracting from the essence of the disclosed embodiments. Further, the acts described herein may be repeated or performed in parallel with one another or in parallel with different instances of the same or similar acts.

Additionally, the content item classification system 106 may perform one or more acts of the series of acts in addition to or alternatively to one or more acts described in conjunction with other figures. While FIGS. 13-15 each illustrates acts according to one embodiment, alternative embodiments may omit, add to, reorder, and/or modify any of the acts shown. Further, each of the acts of FIGS. 13-15 can be performed as part of a method. Alternatively, a non-transitory computer-readable medium can comprise instructions that, when executed by one or more processors, cause a computing device to perform the acts of FIGS. 13-15. In some embodiments, a system can perform the acts of FIGS. 13-15.

To illustrate, FIG. 13 includes a series of acts 1300 for automatically classifying and organizing content items within a file structure utilizing a content item classification model in accordance with one or more embodiments. As shown, the series of acts 1300 includes an act 1310 of generating a content item classification model for classifying content items. In one or more implementations, the act 1310 includes generating a classification machine-learning model and/or a classification neural network as the classification model. In some implementations, the classification model is a transformer machine-learning model. In various implementations, the act 1310 includes generating the classification model as a classification machine-learning model based on correlating file data from existing content items to the plurality of classifications.

In certain implementations, the act 1310 includes determining and/or generating the plurality of classifications (e.g., classification labels) for the content item classification model. For example, the act 1310 includes automatically generating the plurality of classifications based on analyzing a plurality of content items (e.g., existing or forming a common collection). As another example, the act 1310 includes automatically generating the plurality of classifications based on search queries of a plurality of content items. As yet another example, the act 1310 includes generating the plurality of classifications for a classification machine-learning model based on the subfolders within the first folder (e.g., by analyzing content item data of the existing content items in the subfolders and correlating content item data with the subfolders).

The series of acts 1300 further includes an act 1320 of detecting a content item being added to a smart folder. In one or more implementations, the act 1320 includes detecting content items being added to the first folder (e.g., a smart folder) based on a user importing or moving the content item into the first folder. In some implementations, the act 1320 includes adding the content item to the first folder based on receiving the content item via a camera upload. In certain implementations, the act 1320 includes adding the content item to the first folder based on receiving the content item via an electronic message (e.g., email, text, post, or another electronic message). In various implementations, the act 1320 includes adding the content item to the first folder based on receiving the content item from an automated workflow.

In addition, the series of acts 1300 includes an act 1330 of classifying the content item utilizing the content item classification model. For instance, the act 1320 can include classifying the content item to a first classification from a plurality of classifications based on the addition of the content item to the first folder. In one or more implementations, the act 1330 includes classifying the content item to the first classification utilizing a classification machine-learning model. In some implementations, the classification machine-learning model classifies the content item to the first classification by analyzing text-readable content item data of the content item.

In various implementations, the classification machine-learning model classifies the content item to the first classification by correlating the content item to one or more existing content items within the second folder. In some implementations, the act 1330 includes classifying the content item to a first classification from a set of user-based classifications that correspond to the plurality of subfolders.

As shown, the series of acts 1300 also includes an act 1340 of moving the content item from the smart folder to a target folder based on the target folder being associated with the content item classification. For instance, the act 1340 can include moving the content item from the first folder to a second folder associated with the first classification based on classifying the content item to the first classification. In one or more implementations, the act 1340 includes moving the content item to a first subfolder of the plurality of subfolders corresponding to the first subfolder based on the content item corresponding to the first classification.

In various implementations, the act 1340 includes generating, based on determining that a folder corresponding to the first classification does not exist, a second folder to associate with the first classification. Similarly, the act 1340 can include determining that a folder corresponding to the first classification does not yet exist based on classifying the content item to the first classification utilizing a classification machine-learning model and generating the second folder to correspond to the first classification based on determining that the folder corresponding to the first classification does not exist. In some implementations, the second folder is a subfolder of the first folder. In alternative implementations, the second folder is not a subfolder of the first folder but located elsewhere in a file structure and monitored by a content management system.

As an example of an additional act not shown in FIG. 13, the series of acts 1300 may include acts of detecting an addition of an additional content item to the first folder, classifying the additional content item to a second classification from the plurality of classifications utilizing a classification machine-learning model, and moving the additional content item from the first folder to a third folder associated with the second classification based on classifying the additional content item to the second classification.

As another example of an additional act not shown in FIG. 13, the series of acts 1300 may include providing, for display at a client device, a graphical user interface that enables selection designating, indicating, or signaling the first folder and the plurality of subfolders. Additionally, the series of acts 1300 may include an act of generating a classification machine-learning model utilized to classify the content item by re-training a pre-trained classification machine-learning model based on correlating the set of user-based classifications with existing content items within the plurality of subfolders.

FIG. 14 illustrates a series of acts 1400 for organizing content items within a file structure based on an interactive user interface that utilizes a content item classification model in accordance with one or more embodiments. As shown, the series of acts 1400 includes an act 1410 of identifying content items and destination folders within a folder based on receiving a folder organization selection. For instance, the act 1410 can include identifying content items and destination folders within a source folder based on receiving a selection indication of a folder organization option for the source folder. Indeed, in one or more implementations, the act 1410 includes identifying a plurality of content items and a plurality of destination folders within a source folder.

As shown, the series of acts 1400 also includes an act 1420 of determining classifications for a first and second content item along with corresponding confidence values. For instance, the act 1420 can include determining a first classification for a first content item of the content items where the first content item has a first confidence value and determining a second classification for a second content item of the content items where the second content item having a second confidence value.

In one or more implementations, the act 1420 can include determining that a first content item of the plurality of content items corresponds to a first classification and/or determining that a first destination folder of the plurality of destination folders corresponds to the first classification. In some implementations, the act 1420 includes utilizing a classification machine-learning model (e.g., content item classification neural network) to generate classifications for the plurality of content items and the plurality of destination folders within the source folder.

In various implementations, the act 1420 can include generating a first confidence value that the first content item corresponds to the first classification utilizing a classification machine-learning model as well as generating a second confidence value when classifying a second content item of the plurality of content items to a second classification utilizing the classification machine-learning model.

As also shown, the series of acts 1400 also includes an act 1430 of providing a first selectable option within an interactive interface that suggests moving the first content item to a first destination folder based on the confidence value of the first content item. For instance, the act 1430 can include providing, for display within an interactive user interface, a first selectable option that automatically suggests moving the first content item to a first destination folder of the destination folders based on the first confidence value of the first content item. In one or more implementations, the act 1430 can include providing, for display within an interactive user interface, a first selectable option to move the first content item to the first destination folder based on the first content item and the first destination folder corresponding to the first classification. In example implementations, the act 1430 can include receiving an indication of a user interaction with the first selectable option and, based on receiving the indication of the user interaction with the first selectable option, displaying each of the plurality of destination folders as a selectable destination folder for the first content item within the first selectable option.

In some implementations, the act 1430 includes providing a first selectable element that activates the first selectable option when selected and causing the first selectable element to be selected based on determining that the first confidence value of the first content item satisfies a first confidence threshold. In various implementations, the act 1430 can include providing the first selectable option to move the first content item to the first destination folder further based on determining that the first confidence value of the first content item satisfies a first confidence threshold. In additional implementations, the act 1430 can include providing a first selectable element that activates the first selectable option when selected and causing the first selectable element to be selected based on determining that the first confidence value satisfies a second confidence threshold that is higher than the first confidence threshold. In some implementations, the act 1430 can include providing a first selectable element that activates the first selectable option when selected and causing the first selectable element to be unselected based on determining that the first confidence value does not satisfy a second confidence threshold that is higher than the first confidence threshold.

As further shown, the series of acts 1400 also includes an act 1440 of providing a second selectable option within the interactive interface to select a destination folder for the second content item based on the confidence value of the second content item. For instance, the act 1440 can include providing, for display within the interactive user interface, a second selectable option to select a destination folder to which to move the second content item based on the second confidence value of the second content item. In some implementations, the act 1440 includes providing a second selectable element that activates the second selectable option when selected and causing the second selectable element to be unselected based on determining that the second confidence value of the second content item does not satisfy the first confidence threshold.

In example implementations, the act 1440 includes receiving a modification indication of user input modifying the second selectable option to move the second content item to a second destination folder of the destination folders and automatically selecting the second selectable element to activate the second selectable option based on receiving the modification indication of user input. In various implementations, the act 1440 can include determining that the second confidence value of the second content item does not satisfy the first confidence threshold and providing, for display within the interactive user interface, a second selectable option that includes an option to select a second destination folder to which to move the second content item within the source folder based on determining that the second confidence value does not satisfy the first confidence threshold.

As additionally shown, the series of acts 1400 also includes an act 1450 of moving the first content item to the first destination folder based on receiving a confirmation. For instance, the act 1450 can include moving the first content item to the first destination folder based on receiving an indication of user confirmation. In one or more implementations, the act 1450 can include moving the first content item to the first destination folder based on receiving an indication of user confirmation.

In some implementations, the act 1450 includes receiving a selection indication of a confirmation element within the interactive user interface, moving the first content item from the source folder to the first destination folder based on the first selectable element being selected upon receiving the selection indication of the confirmation element and leaving the second content item in the source folder based on the second selectable element being unselected upon receiving the selection indication of the confirmation element.

The series of acts 1400 may include additional acts not shown in FIG. 14. As an example, the series of acts 1400 may include acts of training a classification machine-learning model to classify the content items and the destination folders according to a set of learned classifications and re-train the classification machine-learning model based on receiving the modification indication of user input. In addition, the series of acts 1400 may include an act of updating the classification machine-learning model based on receiving an indication of a user interaction within the interactive user interface modifying the first selectable option from moving the first content item to the first destination folder to moving the first content item to a second destination folder of the plurality of destination folders.

As another example of an additional act not shown in FIG. 14, the series of acts 1400 may include identifying, from user accounts of a content management system, sets of content items residing in folders; filtering the folders based on one or more folder filtering metrics to determine a subset of organized folders; and generate the classification machine-learning model utilizing the subset of organized folders and content items from the sets of content items that reside in the subset of organized folders. In addition, the series of acts 1400 may include acts of generating, utilizing the classification machine-learning model, a first classification for a first organized folder from the subset of organized folders; generating, utilizing the classification machine-learning model, classifications for a first set of content items that reside in the subset of organized folder; and tuning the classification machine-learning model to classify the first set of content items to correlate to the first classification of the first organized folder. Further, the series of acts 1400 may include an act of filtering the folders based on correlating folder names of the folders to a list of keywords for organized folder names. Additionally, or in the alternative, the series of acts 1400 may include an act of filtering the folders based on content item features of content items from the sets of content items residing in the folders, the content item features determined utilizing a document classification model.

As another example of additional acts not shown in FIG. 14, the series of acts 1400 may include providing a prompt to classify additional content items within the source folder based on detecting a period of inactivity with respect to moving content items within the source folder; in response to receiving an indication of user input approving the prompt, pairing one or more additional content items with one or more destination folders of the plurality of destination folders in the source folder based on classifying the additional content items and the plurality of destination folders; and moving one or more additional content items to the one or more destination folders based on the pairings.

FIG. 15 illustrates a series of acts 1500 for relocating content items into one or more destination folders utilizing a trained classification model in accordance with one or more embodiments. As shown, the series of acts 1500 includes an act 1510 of identifying content items within a source folder. For instance, the act 1510 can include identifying a plurality of content items within a source folder including a plurality of subfolders. In some implementations, the act 1510 includes receiving an indication requesting automatic organization of a source folder. In one or more implementations, the act 1510 includes receiving a request to automatically relocate content items added to the source folder into the set of destination folders. In various implementations, the act 1510 includes receiving a request to automatically organize one or more content items currently in the source folder into subfolders within the source folder. Further, in example implementations, the act 1510 includes detecting a content item within the source folder to be moved from the source folder based on receiving the indication requesting automatic organization of a source folder.

As shown, the series of acts 1500 also includes an act 1520 of generating content item classifications for the content items utilizing a classification model. For instance, the act 1520 can include generating content item classifications for the plurality of content items utilizing a content item classification model. In one or more implementations, the act 1520 includes generating the content item classifications for the plurality of content items utilizing a content item classification neural network by encoding content item data from the plurality of content items into content item feature vectors and decoding the content item feature vectors to determine the content item classifications from a set of content item classifications.

In some implementations, the act 1520 includes generating the content item classifications for the plurality of content items utilizing a content item classification machine-learning model trained from detected user interactions between content items and destination folders. In one or more implementations, the act 1520 includes detecting the detected user interactions between content items and destination folders based on monitoring user interactions with content items and the set of destination folders. In example implementations, the act 1520 includes detecting the detected user interactions between content items and destination folders by detecting the content item being moved from the destination folder to an additional destination folder within the source folder.

In various implementations, the act 1520 includes providing, for display on a client device, a classification report indicating that the content item was automatically moved to the destination folder, identifying the detected user interactions between content items and destination folders based on receiving a confirmation indication of the classification report that confirms moving the content item to the destination folder, and/or identifying the detected user interactions between content items and destination folders based on receiving a modification within the classification report moving the content item to an additional destination folder. In example implementations, the act 1520 includes providing, for display on a client device, an interactive user interface having a selectable option associated with the content item that suggests moving the content item to the destination folder and identifying the detected user interactions between content items and destination folders based on receiving a modification within the interactive user interface to move the content item to an additional destination folder.

In one or more implementations, the act 1520 includes generating the content item classification neural network to learn the set of content item classifications from system-based training data including a set of classification labels and corresponding content items. In various implementations, the act 1520 includes generating the content item classification neural network to classify the content item into the set of content item classifications by re-training a pre-trained classification machine-learning model to learn the set of content item classifications based on user-based training data including content items residing in subfolders within the source folder.

As shown, the series of acts 1500 also includes an act 1530 of determining destination folders from the subfolders for the content items. For instance, the act 1530 can include determining, from the plurality of subfolders, one or more destination folders that correspond to the content item classifications. In one or more implementations, the act 1530 includes determining a destination folder that corresponds to the content item classification from a set of destination folders corresponding to the set of content item classifications.

In addition, the series of acts 1500 includes an act 1540 of moving the content items to destination folders that correspond to the content item classifications. For instance, the act 1540 can include moving the plurality of content items from the source folder to the one or more destination folders that correspond to the content item classifications of the plurality of content items. In one or more implementations, the act 1540 includes relocating the content item from the source folder to the destination folder that corresponds to the content item classification. In certain implementations, the act 1540 includes detecting an addition of the content item to the source folder and, in response to detecting the addition of the content item to the source folder, automatically relocating the content item to the destination folder without user intervention. In example implementations, the destination folder is located within a subfolder of the source folder (e.g., a grandchild node, greatgrandchild node, etc.).

In some implementations, the act 1540 includes providing, for display on a client device associated with a user, an interactive user interface including a selectable option that suggests moving the content item to the destination folder; receiving a selection indication of a confirmation element within the interactive user interface; and in response to receiving the selection indication of the confirmation element, automatically relocating the content item to the destination folder.

The series of acts 1500 may include additional acts not shown in FIG. 15. As an example, the series of acts 1500 may include acts of providing, for display on a client device, an interactive user interface that suggests moving the plurality of content items to the one or more destination folders; detecting a user interaction to move to a content item of the plurality of content items to a new destination folder not currently in the source folder; and based on detecting the user interaction to move the content item to a new destination folder, generating the new destination folder in the source folder as well as moving the content item into the new destination folder.

As another example of an additional act not shown in FIG. 15, the series of acts 1500 may include determining that a plurality of folders includes a set of organized folders and generating the content item classification neural network to learn the set of content item classifications from group-based training data including the set of organized folders and corresponding enclosed content items. In addition, the series of acts 1500 may include searching for organized folder sets within user accounts of a content management system by filtering folders based on one or more organized folder filtering metrics.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links that can be used to carry desired program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 16:
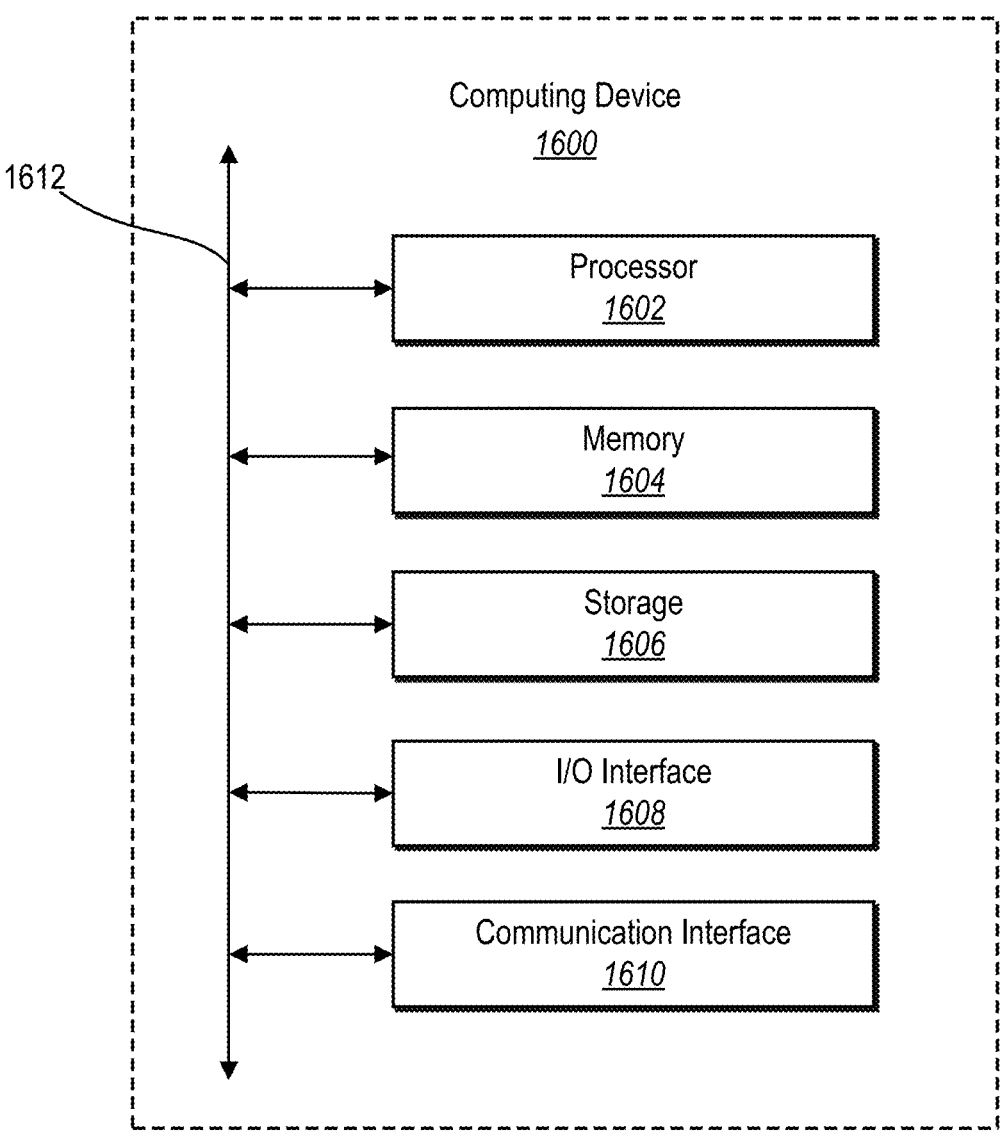
FIG. 16 illustrates a block diagram of an example computing device for implementing one or more embodiments.

FIG. 16 illustrates a block diagram of computing device 1600 that may be configured to perform one or more of the processes described above. One will appreciate that the client devices and/or server devices described herein may comprise one or more computing devices such as computing device 1600. As shown by FIG. 16, the computing device 1600 can comprise a processor 1602, memory 1604, a storage device 1606, an I/O interface 1608, and a communication interface 1610, which may be communicatively coupled by way of communication infrastructure 1612. While the computing device 1600 is shown in FIG. 16, the components illustrated in FIG. 16 are not intended to be limiting. Additional or alternative components may be used in other embodiments. Furthermore, in certain embodiments, the computing device 1600 can include fewer components than those shown in FIG. 16. Components of the computing device 1600 shown in FIG. 16 will now be described in additional detail.

In particular embodiments, processor 1602 includes hardware for executing instructions, such as those making up a computer program. As an example, and not by way of limitation, to execute instructions, processor 1602 may retrieve (or fetch) the instructions from an internal register, an internal cache, memory 1604, or storage device 1606 and decode and execute them. In particular embodiments, processor 1602 may include one or more internal caches for data, instructions, or addresses. As an example and not by way of limitation, processor 1602 may include one or more instruction caches, one or more data caches, and one or more translation lookaside buffers (TLBs). Instructions in the instruction caches may be copies of instructions in memory 1604 or the storage device 1606. Additionally, processor 1602 can include or represent one or more processors or processor cores.

Memory 1604 may be used for storing data, metadata, and programs for execution by the processor(s). Memory 1604 may include one or more of volatile and non-volatile memories, such as Random Access Memory ("RAM"), Read-Only Memory ("ROM"), a solid-state disk ("SSD"), Flash, Phase Change Memory ("PCM"), or other types of data storage. Memory 1604 may be internal or distributed memory.

Storage device 1606 includes storage for storing data or instructions. As an example and not by way of limitation, storage device 1606 can comprise a non-transitory storage medium described above. Storage device 1606 may include a hard disk drive (HDD), a floppy disk drive, flash memory, an optical disc, a magneto-optical disc, magnetic tape, or a Universal Serial Bus (USB) drive or a combination of two or more of these. Storage device 1606 may include removable or non-removable (or fixed) media, where appropriate. Storage device 1606 may be internal or external to computing device 1600. In particular embodiments, storage device 1606 is non-volatile, solid-state memory. In other embodiments, Storage device 1606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1608 allows a user to provide input to, receive output from, and otherwise transfer data to and receive data from computing device 1600. I/O interface 1608 may include a mouse, a keypad or a keyboard, a touch screen, a camera, an optical scanner, network interface, modem, other known I/O devices, or a combination of such I/O interfaces. I/O interface 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1608 is configured to provide graphical data to a display for presentation to a user. The graphical data may be representative of one or more graphical user interfaces and/or any other graphical content as may serve a particular implementation.

Communication interface 1610 can include hardware, software, or both. In any event, communication interface 1610 can provide one or more interfaces for communication (such as, for example, packet-based communication) between computing device 1600 and one or more other computing devices or networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1610 may facilitate communications using various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1612 may include hardware, software, or both that couples components of the computing device 1600 to each other. As an example and not by way of limitation, the communication infrastructure 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 17:
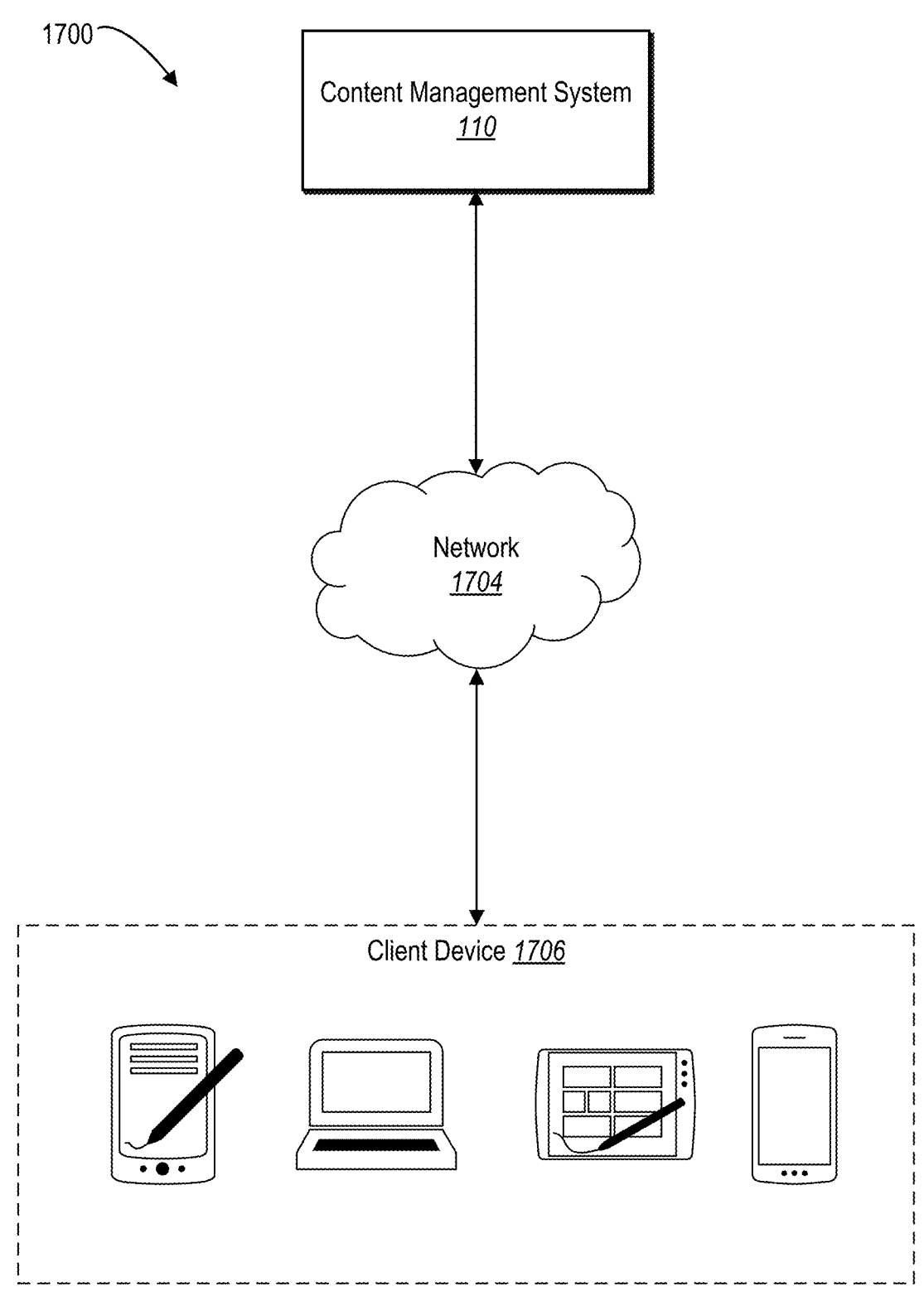
FIG. 17 illustrates a network environment of a content management system in accordance with one or more embodiments.

FIG. 17 is a schematic diagram illustrating an environment 1700 within which one or more embodiments of the content management system 110 can be implemented. For example, as shown in FIG. 17, the content management system 110 may generate, store, manage, receive, and send digital content (such as digital documents and other content items). For example, the content management system 110 may send and receive digital content to and from the client device 1706 by way of a network 1704. In particular, the content management system 110 can store and manage a collection of digital content. The content management system 110 can manage the sharing of digital content between computing devices associated with a plurality of users. For instance, the content management system 110 can facilitate a user sharing digital content with another user of the content management system 110.

In particular, the content management system 110 can manage synchronizing digital content across multiple client devices associated with one or more users. For example, a user may edit digital content using the client device 1706. The content management system 110 can cause the client device 1706 to send the edited digital content to the content management system 110. The content management system 110 then synchronizes the edited digital content on one or more additional computing devices.

In addition to synchronizing digital content across multiple devices, one or more embodiments of the content management system 110 can provide an efficient storage option for users that have large collections of digital content. For example, the content management system 110 can store a collection of digital content on the content management system 110, while the client device 1706 only stores reduced-sized versions of the digital content. A user can navigate and browse the reduced-sized versions (e.g., a thumbnail of a digital image) of the digital content on the client device 1706. In particular, one way in which a user can experience digital content is to browse the reduced-sized versions of the digital content on the client device 1706.

Another way in which a user can experience digital content is to select a reduced-size version of digital content to request the full- or high-resolution version of digital content from the content management system 110. In particular, upon a user selecting a reduced-sized version of digital content, the client device 1706 sends a request to the content management system 110 requesting the digital content associated with the reduced-sized version of the digital content. The content management system 110 can respond to the request by sending the digital content to the client device 1706. The client device 1706, upon receiving the digital content, can then present the digital content to the user. In this way, a user can have access to large collections of digital content while minimizing the number of resources used on the client device 1706.

The client device 1706 may be a desktop computer, a laptop computer, a tablet computer, a personal digital assistant (PDA), an in- or out-of-car navigation system, a smart TV, a virtual reality (VR) or augmented reality (AR) device, a handheld device, a wearable device, a smartphone or other cellular or mobile phone, or a mobile gaming device, another mobile device, or other suitable computing devices. The client device 1706 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over the network 1704.

The network 1704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the client device 1706 may access the content management system 110.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, by training with hybrid training data comprising existing folder training data comprising existing classification labels for existing content items stored in set of existing destination folders associated with a source folder and folder generation training data comprising a set of classification labels, a hybrid classification neural network to generate content item classifications for content items associated with the source folder;

determining that a content item within the source folder is an unclassified content item;

based on determining that the content item within the source folder is the unclassified content item, generating a content item classification for the content item by utilizing the hybrid classification neural network to generate a content item classification associated with the hybrid training data based on content item data from the content item; and relocating the content item to a destination folder based on determining the destination folder for the content item by:

selecting an existing destination folder from the set of existing destination folders as the destination folder based on determining that the content item classification for the content item corresponds to an existing classification label for the existing destination folder; or generating a new folder as the destination folder based on determining that the content item classification does not correspond to existing classification labels for existing folders from the set of existing destination folders.

2. The computer-implemented method of claim 1, further comprising:

detecting an addition of the content item to the source folder; and generating the hybrid content item classification for the content item based on detecting the addition of the content item to the source folder.

3. The computer-implemented method of claim 1, further comprising receiving a request to automatically relocate content items added to the source folder into the destination folder based on content item classifications for the content items.

4. The computer-implemented method of claim 1, further comprising generating the hybrid classification neural network by training the hybrid classification neural network to learn a set of content item classifications from the folder generation training data comprising:

the set of classification labels comprising classification labels from common content items and classification labels from search queries; and the existing classification labels from existing content items stored in the set of existing destination folders.

5. The computer-implemented method of claim 1, wherein generating the new folder as the destination folder further comprises:

determining that the content item classification corresponds to a content item label of the set of classification labels;

based on determining that the content item classification corresponds to a content item label of the set of classification labels, generating the new folder as the destination folder; and relocating, without user interaction, the content item to the new folder.

6. The computer-implemented method of claim 1, wherein generating the new folder as the destination folder further comprises generating the new folder as a subfolder of the source folder.

7. The computer-implemented method of claim 1, further comprising:

providing, for display on a client device associated with a user, an interactive user interface comprising a selectable option that suggests moving the content item to the destination folder;

receiving a selection indication of a confirmation element within the interactive user interface; and in response to receiving the selection indication of the confirmation element, automatically relocating the content item to the destination folder.

8. The computer-implemented method of claim 1, further comprising receiving a request to automatically organize one or more content items currently in the source folder into subfolders within the source folder.

9. The computer-implemented method of claim 1, further comprising:

determining that a plurality of folders comprises a set of organized folders; and generating the hybrid classification neural network to generate content item classifications by training with group-based training data comprising the set of organized folders and corresponding enclosed content items.

10. The computer-implemented method of claim 9, further comprising searching for organized folder sets within user accounts of a content management system by filtering folders based on string or text matching.

11. A system comprising:

at least one processor; and a non-transitory computer memory comprising instructions that, when executed by the at least one processor, cause the system to:

generate, by training with hybrid training data comprising existing folder training data comprising existing classification labels for existing content items stored in set of existing destination folders associated with a source folder and folder generation training data comprising a set of classification labels, a hybrid classification machine-learning model to generate content item classifications for content items associated with the source folder;

receive an indication requesting automatic organization of the source folder;

based on receiving the indication, detect a content item within the source folder to be moved from the source folder;

based on detecting the content item within the source folder to be moved from the source folder, generate a content item classification for the content item by utilizing the hybrid classification machine-learning model to generate a content item classification associated with the hybrid training data; and relocate the content item to a destination folder based on determining the destination folder for the content item by:

selecting an existing destination folder as the destination folder based on determining that the content item classification for the content item corresponds to an existing classification label for the existing destination folder from the set of existing destination folders; or generating a new folder as the destination folder based on determining that the content item classification does not correspond to existing classification labels for existing folders from the set of existing destination folders.

12. The system of claim 11, further comprising instructions that cause the system to;

monitor user interactions with content items and a set of destination folders; and generate the hybrid classification machine-learning model to generate the content item classifications based on the user interactions between the content items and the set of destination folders.

13. The system of claim 11, further comprising instructions that cause the system to:

determine an additional source folder comprising a plurality of content items; and provide a prompt to automatically relocate one or more content items of the plurality of content items within the additional source folder to one or more destination folders utilizing the hybrid classification machine-learning model.

14. The system of claim 11, further comprising instructions that cause the system to:

provide, for display on a client device, a classification report indicating that the content item was automatically moved to the destination folder; and receive a confirmation indication of the classification report that confirms moving the content item to the destination folder.

15. The system of claim 11, further comprising instructions that cause the system to:

provide, for display on a client device, a classification report indicating that the content item was automatically moved to the destination folder;

receiving a modification within the classification report moving the content item to an additional destination folder; and update parameters of the hybrid classification machine-learning model based on receiving modification within the classification report moving the content item to an additional destination folder.

16. The system of claim 11, further comprising instructions that cause the system to:

provide, for display on a client device, an interactive user interface having a selectable option associated with the content item that suggests moving the content item to the destination folder;

receive a modification within the interactive user interface to move the content item to an additional destination folder; and update parameters of the hybrid classification machine-learning model based on receiving the modification within the interactive user interface to move the content item to the additional destination folder.

17. A non-transitory computer-readable storage medium comprising instructions that, when executed by at least one processor, cause a computer system to:

generate, by training with hybrid training data comprising existing folder training data comprising existing classification labels for existing content items stored in set of existing destination folders associated with a source folder and folder generation training data comprising a set of classification labels, a hybrid classification neural network to generate content item classifications for content items associated with a source folder;

determine that a plurality of content items within the source folder are a plurality of unclassified content items;

based on determining that the plurality of content items within the source folder are the plurality of unclassified content items, generate content item classifications for the plurality of content items by utilizing the hybrid classification neural network to generate content item classifications associated with the hybrid training data; and relocate the plurality of content items based on determining a destination folder for the plurality of content items by:

selecting an existing destination folder from the set of existing destination folders as the destination folder based on determining that the content item classifications for the plurality of content items corresponds to an existing classification label for the existing destination folder from the set of existing destination folders; or generating a new folder as the destination folder based on determining that the content item classifications for the plurality of content items do not correspond to existing classification labels for existing folders from the set of existing destination folders.

18. The non-transitory computer-readable storage medium of claim 17, further comprising instructions that cause the computer system to:

provide, for display on a client device, an interactive user interface that suggests moving the plurality of content items to the one or more destination folders;

detect a user interaction to move to a content item of the plurality of content items to the new folder;

based on detecting the user interaction to move the content item to the new folder:

generate the new folder in the source folder; and move the content item into the new folder; and updating parameters of the hybrid classification neural network based on the user interaction to move the content item to the new folder.

19. The non-transitory computer-readable storage medium of claim 17, further comprising instructions that cause the computer system to generate the content item classifications for the plurality of content items by utilizing the hybrid classification neural network by:

encoding content item data from the plurality of content items into content item feature vectors; and decoding the content item feature vectors to determine the content item classifications from a set of content item classifications.

20. The non-transitory computer-readable storage medium of claim 17, further comprising instructions that cause the computer system to generate the hybrid classification neural network by training with additional training data comprising indications of user interactions between content items and destination folders.

\* \* \* \* \*